United States Patent
Shimizu

(10) Patent No.: US 12,450,093 B2
(45) Date of Patent: Oct. 21, 2025

(54) PROCESS EXECUTION SYSTEM INCLUDING PROCESS NETWORK GENERATION UNIT, PROCESS NETWORK STATE MANAGEMENT UNIT, AND PROCESS NETWORK EXECUTION UNIT, DATA STRUCTURE, AND PROCESS EXECUTION PROGRAM

(71) Applicants: IBC, Tokyo (JP); Yoshihiro Shimizu, Tokyo (JP)

(72) Inventor: Yoshihiro Shimizu, Tokyo (JP)

(73) Assignees: IBC, Tokyo (JP); Yoshihiro Shimizu, Tokyo (JP)

( * ) Notice: Subject to any disclaimer, the term of this patent is extended or adjusted under 35 U.S.C. 154(b) by 0 days.

(21) Appl. No.: 18/724,179

(22) PCT Filed: Feb. 9, 2023

(86) PCT No.: PCT/JP2023/004459
§ 371 (c)(1),
(2) Date: Jun. 25, 2024

(87) PCT Pub. No.: WO2023/153491
PCT Pub. Date: Aug. 17, 2023

(65) Prior Publication Data
US 2024/0419488 A1    Dec. 19, 2024

(30) Foreign Application Priority Data
Feb. 10, 2022  (JP) .................. 2022-019673

(51) Int. Cl.
*G06F 9/48* (2006.01)
*H04L 41/12* (2022.01)

(52) U.S. Cl.
CPC ............ *G06F 9/4881* (2013.01); *H04L 41/12* (2013.01)

(58) Field of Classification Search
None
See application file for complete search history.

(56) References Cited

U.S. PATENT DOCUMENTS 10,783,532 B2 *   9/2020  Lustyk .................. G06Q 40/04
2007/0239498 A1   10/2007 Shukla
(Continued)

FOREIGN PATENT DOCUMENTS

| JP | 2009-532759 A | 9/2009 |
| JP | 2010-026695 A | 2/2010 |
| JP | 2012-203702 A | 10/2012 |

OTHER PUBLICATIONS

International Search Report mailed Apr. 25, 2023 for the corresponding patent application No. PCT/JP2023/004459, with English translation, 6 pages.
(Continued)

*Primary Examiner* — Eric C Wai
(74) *Attorney, Agent, or Firm* — LUCAS & MERCANTI, LLP

(57) ABSTRACT

A process execution system contains: generating a process network, including a plurality of process nodes, from a process network model that includes a plurality of process master nodes having process generation information and representing relationships between the process nodes generated by the plurality of process master nodes; making a specific process node executable based on the state of the process nodes included in the process network and predetermined process state transition rules; and executing the process defined by the process definition information of the executable process node by sending an execution request for an action, based on the information related to actions included in the process definition information, to an action execution system that executes predetermined actions upon request.

12 Claims, 44 Drawing Sheets

(56) References Cited

U.S. PATENT DOCUMENTS

| | | |
|---|---|---|
| 2007/0266377 A1 | 11/2007 | Ivanov |
| 2013/0238384 A1 | 9/2013 | Caesar et al. |
| 2021/0200758 A1 | 7/2021 | Scheepens |

OTHER PUBLICATIONS

Howard Smith, Peter Fingar, "Business Process Management: The Third Wave", Meghan Kiffer Pr, 2022, 11 pages.

David W. Enstrom, "A Simplified Approach to IT Architecture with Bpmn: A Coherent Methodology for Modeling Every Level of the Enterprise", iUniverse, 2016, 22 pages.

Bruce Silver, "BPMN Method and Style, Second Edition, with BPMN Implementer's Guide", Cody-Cassidy Press, 2017, 3 pages.

Arthur H. M. ter Hofstede, Wil M. P. van der Aalst, Michael Adams, Nick Russell (eds), "Modern Business Process Automation: YAWL and its Support Environment", Springer, 2009, 16 pages.

Bernd Ruecker, "Practical Process Automation: Orchestration and Integration in Microservices and Cloud Native Architectures", O'Reilly Media, 2021, 32 pages.

Jakob Freund, Bernd Rucker, "Real-Life BPMN (4th edition): Includes an introduction to DMN", Camunda, 2019, 6 pages.

Stolterman E., Fors A.C. (2004) Information Technology and the Good Life. In: Kaplan B., Truex D.P., Wastell D., Wood-Harper A.T., DeGross J.I. (eds) Information Systems Research. IFIP International Federation for Information Processing, vol. 143. Springer, Boston, MA., 6 pages.

JPO, Japanese Office Action issued on Sep. 12, 2023 for the related Japanese application No. 2023-530183, with English Machine translation, 4 pages.

International Preliminary Report on Patentability, dated Aug. 22, 2024 for the corresponding International Application No. PCT/JP2023/004459, with English Translation.

Examination Report No. 1 for Standard Patent Application, dated Aug. 22, 2024 for the corresponding Australian Application No. 2023218154.

Notice of First Examination Opinion, dated Apr. 12, 2025, issued for the corresponding Chinese Patent Application No. 202380016969.5, 14 pages, with English machine translation.

Invitation to Respond to Written Opinion, dated Apr. 14, 2025, issued for the corresponding Singaporean Patent Application No. 11202404357T.

Extended European Search Report, dated Jan. 21, 2025, issued for the corresponding European Patent Application No. 23752953.2, 12 pages.

Office Action, dated Feb. 10, 2025, issued for the corresponding Australian Patent Application No. 2023218154, 4 pages.

* cited by examiner

| | | DM15: Process Generation Information ||| |
|---|---|---|---|---|
| DM11 | DM12 | DM151 | DM152 | DM153 |
| Process Master Node Identifier | Parent Process Master Node Identifier | Process Number Master | Process Name Master | Action Information Master |
| 1 | | 100 | Root Process | \<String\> |
| 2 | 1 | 100 | Process Name L11 | \<String\> |
| 3 | 1 | 200 | Process Name L12 | \<String\> |
| 4 | 1 | 300 | Process Name L13 | \<String\> |
| 5 | 2 | 100 | Process Name L21 | \<String\> |
| 6 | 2 | 200 | Process Name L22 | \<String\> |
| 7 | 3 | 100 | Process Name L23 | \<String\> |

Fig. 7

| Process Node Identifier | Parent Process Node Identifier | Process State | D15: Process Definition Information ||| 
| | | | Process Number | Process Name | Action Information |
| --- | --- | --- | --- | --- | --- |
| D11 | D12 | D13 | D151 | D152 | D153 |
| 1 | | | 100 | Root Process | <String> |
| 2 | 1 | | 100 | Process Name L11 | <String> |
| 3 | 1 | | 200 | Process Name L12 | <String> |
| 4 | 1 | | 300 | Process Name L13 | <String> |
| 5 | 2 | Completed | 100 | Process Name L21 | <String> |
| 6 | 2 | Executable | 200 | Process Name L22 | <String> |
| 7 | 3 | | 100 | Process Name L23 | <String> |

Fig. 8

|  | L01 | L11 | L12 | L13 | L21 | L22 | L23 | L24 | L25 |
|---|---|---|---|---|---|---|---|---|---|
| State Transition Process 1 |  |  |  |  | R |  |  | R |  |
| Execution Process 1 |  |  |  |  | F |  |  | F |  |
| State Transition Process 2 |  |  |  |  | F | R |  | F | R |
| Execution Process 2 |  |  |  |  | F | F |  | F | F |
| State Transition Process 3 |  |  | F |  | F | F | R | F | F |
| Execution Process 3 |  |  | F |  | F | F | F | F | F |
| State Transition Process 4 |  | F | F |  | F | F | F | F | F |
| State Transition Process 5 |  | F | F | R | F | F | F | F | F |
| Execution Process 4 |  | F | F | F | F | F | F | F | F |
| State Transition Process 6 | F | F | F | F | F | F | F | F | F |

R: Executable State
F: Completed State

DM25: Process Generation Information

| DM21 | DM22 | DM251 | DM252 | DM253 | DM254 | DM255 |
|---|---|---|---|---|---|---|
| Process Master Node Identifier | Parent Process Master Node Identifier | Process Number Master | Process Name Master | Action Information Master | Asynchronous Flag Master | Auto-Start Flag Master |
| 1 |  | 100 | Root Process | <String> | FALSE | TRUE |
| 2 | 1 | 100 | Process Name L11 | <String> | FALSE | TRUE |
| 3 | 1 | 200 | Process Name L12 | <String> | FALSE | TRUE |
| 4 | 1 | 300 | Process Name L13 | <String> | FALSE | TRUE |
| 5 | 2 | 100 | Process Name L21 | <String> | FALSE | TRUE |
| 6 | 2 | 200 | Process Name L22 | <String> | TRUE | TRUE |
| 7 | 3 | 100 | Process Name L23 | <String> | FALSE | FALSE |

Fig. 24

| Process Node Identifier | Parent Process Node Identifier | Process State | D25: Process Definition Information | | | | |
|---|---|---|---|---|---|---|---|
| D21 | D22 | D23 | Process Number (D251) | Process Name (D252) | Action Information (D253) | Asynchronous Flag (D254) | Auto-Start Flag (D255) |
| 1 | | | 100 | Root Process | <String> | FALSE | FALSE |
| 2 | 1 | | 100 | Process Name L11 | <String> | FALSE | TRUE |
| 3 | 1 | | 200 | Process Name L12 | <String> | FALSE | TRUE |
| 4 | 1 | | 300 | Process Name L13 | <String> | FALSE | TRUE |
| 5 | 2 | Completed | 100 | Process Name L21 | <String> | FALSE | TRUE |
| 6 | 2 | Executable | 200 | Process Name L22 | <String> | TRUE | TRUE |
| 7 | 3 | | 100 | Process Name L23 | <String> | FALSE | FALSE |

Fig. 25

CDT

CD: Case Data

| Record ID | Case Data A | Case Data B | ... | Case Data Z |
|---|---|---|---|---|
| 1 | Data 1A | Data 1B | ... | Data 1Z |
| 2 | Data 2A | Data 2B | ... | Data 2Z |
| ⋮ | ⋮ | ⋮ | ⋮ | ⋮ |
| 123 | Data 123A | Data 123B | ... | Data 123Z |
| ⋮ | ⋮ | ⋮ | ⋮ | ⋮ |

CxT

CxD: Context Data

CID: Case ID — CID1, CID2, CID3

| Process Node Identifier | Application Name | Table Name | Record ID | Context Data | ... |
|---|---|---|---|---|---|
| 1 | App1 | Table1 | 123 | Data Aa | ... |
| 2 | App1 | Table1 | 123 | Data Aa | ... |
| ⋮ | ⋮ | ⋮ | ⋮ | ⋮ | ⋮ |
| 8 | App1 | Table1 | 789 | Data Ab | ... |
| ⋮ | ⋮ | ⋮ | ⋮ | ⋮ | ⋮ |

```
<Selection Process Tag> ::= <Main Selection Block>, [{<Sub-Selection Block>}],
                            [<Default Selection Block>], <Selection Process Tag End Symbol>
<Main Selection Block> ::= <Main Selection Block Start Symbol>, <Selection Condition>,
                           <Transcription Process Tag End Symbol>, <Selection Block>
<Main Selection Block Start Symbol> ::= <Transcription Process Tag Start Symbol>, "if"
<Transcription Process Tag Start Symbol> ::= "{%"
<Selection Condition> ::= <Logical Expression>, [<Logical Operator>, <Logical Expression>]
<Logical Expression> ::= <Formula>, <Logical Operator>, <Formula>
<Formula> ::= <Value> | <Transcription Factor Model Tag> | "(", <Logical Expression>, ")"
<Value> ::= <String>
<Transcription Process Tag End Symbol> ::= "%}"
<Sub-Selection Block> ::= <Sub-Selection Block Start Symbol>, <Selection Condition>,
                          <Transcription Process Tag End Symbol>, <Selection Block>
<Sub-Selection Block Start Symbol> ::= <Transcription Process Tag Start Symbol>, "elif"
<Default Selection Block> ::= <Default Selection Block Start Symbol>,
                              <Transcription Process Tag End Symbol>, <Selection Block>
<Default Selection Block Start Symbol> ::= <Transcription Process Tag Start Symbol>, "else"
<Selection Block> ::= {[<String>], [<Transcription Process Tag>]}
<Selection Process Tag End Symbol> ::= <Transcription Process Tag Start Symbol>, "endif",
                                       <Transcription Process Tag End Symbol>
```

Fig. 35

```
<Iteration Process Tag> ::= <Iteration Condition Block>, <Iteration Block>,
                            <Iteration Process Tag End Symbol>
<Iteration Condition Block> ::= <Iteration Condition Block Start Symbol>, <Iteration Condition>,
                                <Transcription Process Tag End Symbol>
<Iteration Condition Block Start Symbol> ::= <Transcription Process Tag Start Symbol>, "for"
<Iteration Condition> ::= <Loop Variable> "in" <Loop Variable Array>
<Loop Variable> ::= <String>
<Loop Variable Array> ::= <Loop Variable Array Constant> | <Transcription Factor Model Tag>
<Loop Variable Array Constant> ::= "[", {[","], <String>}, "]"
<Iteration Block> ::= {[<String>], ["{{", <Loop Variable>, "}}"], [<Transcription Process Tag>]}
<Iteration Process Tag End Symbol> ::= <Transcription Process Tag Start Symbol>, "endfor",
                                       <Transcription Process Tag End Symbol>
```

Fig. 36

```
<Replacement Process Tag> ::= <Transcription Factor Model Tag>
```

```
<Transcription Factor Model Tag> ::= <Transcription Factor Model Tag Start Symbol>, <Transcription Factor Model>,
                [<Evaluation Result Selector Group>], <Transcription Factor Model Tag End Symbol>
<Transcription Factor Model Tag Start Symbol> ::= "<<<"
<Transcription Factor Model> ::= <Model ID>, [<Input Data Group>]
<Model ID> ::= [<Model Group Name>, "."], <Model Name>
<Model Group Name> ::= <String>
<Model Name> ::= <String>
<Input Data Group> ::= "(", <Input Data>, ")"
<Input Data> ::= {[","], <Input Variable>}
<Input Variable> ::= <Input Variable Name>, "=", <Input Variable Value>
<Input Variable Name> ::= <String>
<Input Variable Value> ::= <String> | <Transcription Factor Model Tag>
<Evaluation Result Selector Group> ::= {".", <Evaluation Result Selector>}
<Evaluation Result Selector> ::= <String>
<Transcription Factor Model Tag End Symbol> ::= ">>>"
```

Fig. 38

Dout

```
[
  {
    "Key11": "Value 1A",
    "Key12": [
      {
        "Key21": "Value 21A",
        "Key22": {
          "Key31": "Value 31A",
          "Key32": "Value 32A"
        }
      }
    ]
  },
  {
    "Key11": "Value 1B",
    "Key12": [
      {
        "Key21": "Value 21B",
        "Key22": {
          "Key31": "Value 31B",
          "Key32": "Value 32B"
        }
      }
    ]
  },
  ⋮
]
```

Fig. 37

DM35(Tinfo)

```
<String>
{% if <Transcription Factor Model Tag 11> == "Value 11" %}
    Main Selection Block1
{% elif <Transcription Factor Model Tag 11> == "Value 12" %}
    Sub-Selection Block11
    .
    .
    .
{% elif <Transcription Factor Model Tag 11> == "Value k" %}
    {% if <Transcription Factor Model Tag 21> == "Value 21" %}
        {% if <Transcription Factor Model Tag 31> == "Value 31" %}
            Main Selection Block31
            .
            .
            .
        {% endif %}
    {% elif <Transcription Factor Model Tag 21> == "Value 22" %}
        Sub-Selection Block21
        .
        .
        .
    {% endif %}
    .
    .
    .
{% elif <Transcription Factor Model Tag11> == "Value m" %}
    {% for <Loop Variable> in <Transcription Factor Model Tag 22> %}
        <String>: {{<Loop Variable>}}
    {% endfor %}
    .
    .
    .
{% elif <Transcription Factor Model Tag11> == "Value 1N" %}
    Sub-Selection Block 1N-1
{% else %}
    Default Selection Block 1
{% endif %}
<Transcription Factor Model Tag 01>
<String>
```

- PTs1 brackets the outer if/elif/else block
- PTs2 brackets the inner elif Value 21/Value 22 block
- PTs3 brackets the innermost if Value 31 block
- PTi brackets the for-loop block
- PTr marks the final Transcription Factor Model Tag 01 / String

Fig. 45

```
                                                              Tinfo
       <String>
       {% for <Loop Variable> in <Transcription Factor Model Tag 22> %}
PTi ─┤   <String>: {{<Loop Variable>}}
       {% endfor %}
       <Evaluation Result 01>
       <String>
```

Fig. 46

```
       <String>                                              D35(Tinfo)
          <String>: <Evaluation Result 221>
          <String>: <Evaluation Result 222>
          <String>: <Evaluation Result 223>
       <Evaluation Result 01>
       <String>
```

Fig. 47

<<<SelfProcess.ProcessNodeIdentifier>>>

Fig. 48

<<<AppVa.ContextTable(
 ProcessNodeIdentifier=<<<SelfProcess.ProcessNodeIdentifier>>>
).CaseID>>>

Fig. 49

<<<AppWa.TableWt(
 ColumnCp1=<<<AppVa.ContextTable(
   ProcessNodeIdentifier=<<<SelfProcess.ProcessNodeIdentifier>>>
 ).CaseID>>>,
 ColumnCp2=ColumnCp2Value
).ColumnWs>>>

Fig. 50

<<<Script(
 ScriptCode=<<<AppXa.ScriptTable(
   ScriptID=ScriptIDValue
 ).ScriptCode>>>,
 ScriptType=Python,
 InputVariableDp1=<<<AppVa.ContextTable(
   ProcessNodeIdentifier=<<<SelfProcess.ProcessNodeIdentifier>>>
 ).CaseID>>>,
 InputVariableDp2=InputVariableDp2Value
).EvaluationResultSelectorDs1.EvaluationResultSelectorDs2>>>

Fig. 51

```
<<<MachineLearningModel(
  MachineLearningModelData=<<<AppYa.MachineLearningModelTable(
    MachineLearningModelID=MachineLearningModelIDValue
  ).ModelData>>>,
  ModelFramework=PyTorch,
  InputVariableEp1=<<<AppVa.ContextTable(
    ProcessNodeIdentifier=<<<SelfProcess.ProcessNodeIdentifier>>>
  ).CaseID>>>,
  InputVariableEp2=InputVariableEp2Value
).EvaluationResultSelectorEs1>>>
```

Fig. 52

```
<<<API(
  APIAddress=<<<AppZa.APITable(
    APIID=APIIDValue
  ).API Address>>>,
  KeyGp1=<<<AppVa.ContextTable(
    ProcessNodeIdentifier=<<<SelfProcess.ProcessNodeIdentifier>>>
  ).CaseID>>>,
  KeyGp2=KeyGp2Value
).EvaluationResultSelectorGs1.EvaluationResultSelectorGs2.EvaluationResultSelectorGs3>>>
```

Fig. 53

```
{
    "Action Information": [
        {                                                              DM353
            "Action Item Number": "1",
    ┌── {% if <Transcription Factor Model Tag A> == "Value 1" %}
    │       "API Address": "API Address 1",
    │       "API Data": {
    │          "Field 11": "<String 1><Transcription Factor Model Tag B>",
    │          "Field 12": "<Transcription Factor Model Tag C>",
    │          "Field 13": "<String 2>"
    │       }
PTs─┤    {% else %}
    │       "API Address": "API Address 2",
    │       "API Data": {
    │          "Field 21": "<String 1><Transcription Factor Model Tag D>",
    │          "Field 22": "<Transcription Factor Model Tag C>"
    │       }
    └── {% endif %}
        }
    ]
}
```

Fig. 54

```
{                                                                  D353
    "Action Information": [
        {
            "Action Item Number": "1",
            "API Address": "API Address2",
            "API Data": {
                "Field 21": "<String1><Evaluation Result D>",
                "Field 22": "<Evaluation Result C>"
            }
        }
    ]
}
```

Fig. 55

```
{                                                    DM353
    "Action Information": [
     ⎧ {% for <Loop Variable> in <Transcription Factor Model Tag A> %}
     ⎪  {
     ⎪      "Action Item Number": "1",
     ⎪      "API Address": "<API Address>",
PTi ⎨      "API Data": {
     ⎪          "Field 11": "{{<Loop Variable>}}",
     ⎪          "Field 12": "<Transcription Factor Model Tag B>",
     ⎪          "Field 13": "<String>"
     ⎪       }
     ⎪   },
     ⎩ {% endfor %}
    ]
}
```

Fig. 56

```
{                                                    D353
    "Action Information": [
      {
          "Action Item Number": "1",
          "API Address": "<API Address>",
          "API Data": {
              "Field 11": "<Evaluation Result A1>",
              "Field 12": "<Evaluation Result B>",
              "Field 13": "<String>"
          }
      },
      {
          "Action Item Number": "1",
          "API Address": "<API Address>",
          "API Data": {
              "Field 11": "<Evaluation Result A2>",
              "Field 12": "<Evaluation Result B>",
              "Field 13": "<String>"
          }
      },
    ]
}
```

Fig. 57

| D31 | D32 | D33 | D351 | D352 | D353 | D354 | D355 | D356 |
|---|---|---|---|---|---|---|---|---|
| Process Node Identifier | Parent Process Node Identifier | Process State | Process Number | Process Name | Action Information | Asynchronous Flag | Auto-Start Flag | Active Flag |
| 1 | | | 100 | Root Process | <String> | FALSE | TRUE | TRUE |
| 2 | 1 | | 100 | Process Name L11 | <String> | FALSE | TRUE | TRUE |
| 3 | 1 | | 200 | Process Name L12 | <String> | FALSE | TRUE | TRUE |
| 4 | 1 | | 300 | Process Name L13 | <String> | FALSE | TRUE | TRUE |
| 5 | 2 | Completed | 100 | Process Name L21 | <String> | FALSE | TRUE | TRUE |
| 6 | 2 | Executable | 200 | Process Name L22 | <String> | TRUE | TRUE | TRUE |
| 7 | 3 | | 100 | Process Name L23 | <String> | FALSE | FALSE | FALSE |

D35: Process Definition Information

Fig. 58

| DM31 | DM32 | DM351 | DM352 | DM353 | DM354 | DM355 | DM356 |
|---|---|---|---|---|---|---|---|
| | | | DM35: Process Generation Information | | | | |
| Process Master Node Identifier | Parent Process Master Node Identifier | Process Number Master | Process Name Master | Action Information Master | Asynchronous Flag Master | Auto-Start Flag Master | Active Flag Master |
| 1 | | 100 | Root Process | <String> | <String> | <String> | <String> |
| 2 | 1 | 100 | Process Name L11 | <String> | <String> | <String> | <String> |
| 3 | 1 | 200 | Process Name L12 | <String> | <String> | <String> | <String> |
| 4 | 1 | 300 | Process Name L13 | <String> | <String> | <String> | <String> |
| 5 | 2 | 100 | Process Name L21 | <String> | <String> | <String> | <String> |
| 6 | 2 | 200 | Process Name L22 | <String> | <String> | <String> | <String> |
| 7 | 3 | 100 | Process Name L23 | <String> | <String> | <String> | <String> |

Fig.59

```
{
    "Process Master Node Identifier": "4",
    "Parent Process Master Node Identifier": "1",
    "Process Number Master": "300",
    "Process Master Name": "Process Name L13",
    "Action Information Master": [
        ...
    ],
    "Asynchronous Flag Master": "False",
    "Auto-Start Flag Master": "True",
    "Active Flag Master": "
        {% if <Transcription Factor Model Tag> == "Value1" %}
            True
        {% else %}
            False
        {% endif %}
    "
}
```

DM30

DM356 { ... }   MT(MDinfo)   PDinfo

Fig. 60

```
{
    "Process Node Identifier": "4",
    "Parent Process Node Identifier": "1",
    "Process Number": "300",
    "Process Name": "Process Name L13",
    "Action Information": [
        ...
    ],
    "Asynchronous Flag": "False",
    "Auto-Start Flag": "True",
    "Active Flag": "False"
}
```

D30

D356 { "Active Flag": "False"

Fig. 61

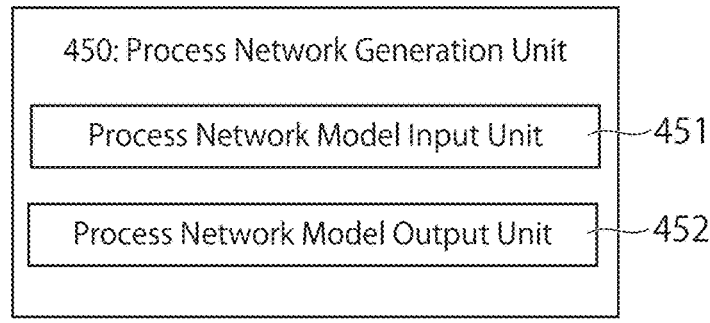

Fig. 62

```
{                                                      MDout
    "Process Generation Information": {
        "Process Number Master": 100,
        "Process Name Master": "Root Process",
        "Action Information Master": "<String>"
    },
    "Child Process Master Node Group": [
        {
            "Process Number Master": 100,
            "Process Name Master": "Process Name L11",
            "Action Information Master": "<String>",
            "Child Process Master Node Group": [
                {
                    "Process Number Master": 100,
                    "Process Name Master": "Process Name L21",
                    "Action Information Master": "<String>",
                    "Child Process Master Node Group": []
                },
                {
                    "Process Number Master": 200,
                    "Process Name Master": "Process Name L22",
                    "Action Information Master": "<String>",
                    "Child Process Master Node Group": []
                }
            ]
        },
        {
            "Process Number Master": 200,
            "Process Name Master": "Process Name L12",
            "Action Information Master": "<String>",
            "Child Process Master Group": [
                {
                    "Process Number Master": 100,
                    "Process Name Master": "Process Name L23",
                    "Action Information Master": "<String>",
                    "Child Process Master Node Group": []
                }
            ]
        },
        {
            "Process Number Master": 300,
            "Process Name Master": "Process Name L13",
            "Action Information Master": "<String>",
            "Child Process Master Node Group": [
            ]
        }
    ]
}
```

Fig. 63

PROCESS EXECUTION SYSTEM INCLUDING PROCESS NETWORK GENERATION UNIT, PROCESS NETWORK STATE MANAGEMENT UNIT, AND PROCESS NETWORK EXECUTION UNIT, DATA STRUCTURE, AND PROCESS EXECUTION PROGRAM

CROSS REFERENCE TO RELATED APPLICATION

This Application is a 371 of PCT/JP2023/004459 filed on Feb. 9, 2023, which, in turn, claimed the priority of Japanese Patent Application No. 2022-019673 filed on Feb. 10, 2022, which is incorporated herein by reference.

TECHNICAL FIELD

The present invention relates to a process execution system, a data structure, and a process execution program.

BACKGROUND ART

In recent years, the automation of business operations using digital technology has been sought to improve business productivity. The automation of business operations is primarily achieved by developing business systems. Generally, the development of business systems proceeds by the following methods. That is, the targeted business operations are modeled as business process models. Then, based on these business process models, the necessary requirements for systematization are extracted, and the business system is developed. As a method for describing a business process model, for example, there is BPMN (Business Process Modeling Notation) (see Patent Literature 1, Non Patent Literature 1, Non Patent Literature 2, and Non Patent Literature 3).

The aforementioned method requires mainly two stages: the stage of creating a business process model and the stage of developing a business system based on the business process model. Therefore, modifications to the system due to changes in business operations often require a significant amount of time and cost. Consequently, business systems developed using the aforementioned method lack plasticity (the property of being easily modifiable) and have the problem of being difficult to adapt flexibly to changes in the business environment.

As a method to solve the above problem, a method of preparing an execution environment capable of executing a business process model described according to a predetermined specification can be considered (see Non Patent Literature 4, Non Patent Literature 5, and Non Patent Literature 6). According to this method, by representing the business operations in a business process model with a predetermined specification, the processes included in the business operations can be executed in the execution environment. Therefore, the stage of developing a business system based on the business process model can be eliminated. In other words, by modifying the business process model executed by the execution environment, it is possible to respond to changes in business operations, thereby improving plasticity.

On the other hand, as Digital Transformation (see Non Patent Literature 7) progresses, society as a whole is becoming more complex, and the speed of changes in the business environment is increasing. To adapt to such rapidly changing business environments, it is desirable for many on-site business personnel, who have knowledge and experience in the operations subject to automation, to be able to create and modify business process models executable in the aforementioned execution environment.

However, business process models executable in the aforementioned execution environment often need to be described according to the unique specifications of each execution environment. Additionally, the introduction of such execution environments often requires significant costs, which makes it accessible primarily to large corporations, and the information available through the Internet and other sources is limited. Therefore, the learning cost required for creating or modifying business process models executable in the aforementioned execution environment is high, and it is not easy for on-site business personnel to create or modify such business process models. Additionally, when the execution environment is changed, it becomes necessary to recreate the business process model that can be executed in the new execution environment. To avoid such work, it may not be easy to switch to another superior execution environment even if it becomes available, which could instead impair plasticity. Therefore, the system that implements the aforementioned method is not widely used in general.

On the other hand, cloud services and applications for RPA (Robotic Process Automation), which can be used for business process automation, are rapidly becoming widespread. By using such RPA cloud services and applications, on-site business personnel are increasingly able to easily automate some of the business processes. As a result, even when business operations change, business personnel can modify the execution content of the business processes themselves by operating the RPA cloud services and applications.

CITATION LIST

Patent Literatures

Patent Literature 1: JP 2012-203702 A

Non Patent Literatures

Non Patent Literature 1: Howard Smith, Peter Fingar, "Business Process Management: The Third Wave", Meghan-Kiffer Press, 2002

Non Patent Literature 2: David W. Enstrom, "A Simplified Approach to IT Architecture with BPMN: A Coherent Methodology for Modeling Every Level of the Enterprise," iUniverse, 2016

Non Patent Literature 3: Bruce Silver, "BPMN Method and Style, Second Edition, with BPMN Implementer's Guide," Cody-Cassidy Press, 2017

Non Patent Literature 4: Arthur H. M. ter Hofstede, Wil M. P. van der Aalst, Michael Adams, Nick Russell (eds), "Modern Business Process Automation: YAWL and its Support Environment", Springer, 2009

Non Patent Literature 5: Bernd Ruecker, "Practical Process Automation: Orchestration and Integration in Microservices and Cloud Native Architectures", O'Reilly Media, 2021

Non Patent Literature 6: Jakob Freund, Bernd Rucker, "Real-Life BPMN (4th edition): Includes an introduction to DMN", Camunda, 2019

Non Patent Literature 7: Stolterman E., Fors A. C. (2004) Information Technology and the Good Life. In: Kaplan B., Truex D. P., Wastell D., Wood-Harper A. T., DeGross J. I. (eds) Information Systems Research. IFIP International Federation for Information Processing, vol 143. Springer, Boston, MA.

SUMMARY OF INVENTION

However, it is difficult to understand the relationship between the processes automated by RPA and other processes within the business operations that constitute the operations, and there are issues in maintaining stable operations, such as the processes executed by RPA having unexpected impacts on other processes. There are also cases where the existence and content of processes automated by RPA are not known to personnel other than those responsible for those processes, making it difficult for the entire organization to monitor and maintain the processes executed by RPA. These issues become more pronounced as the relationship between the processes automated by RPA and other processes becomes more complex, potentially hindering stable business operations.

The present invention has been made in view of the above issues, and aims to provide a process execution system with high adaptability to rapidly changing business environments by achieving a balance between plasticity and stability.

The above-mentioned objectives of the present invention are achieved by the following means.

(1) A process execution system comprising:
    a process network generation unit configured to generate a process network from a process network model, wherein the process network model includes a plurality of process master nodes having process generation information used to generate process definition information defining content of processes, and represents relationships between a plurality of process nodes generated by the process master nodes, and wherein the process network includes the plurality of process nodes having the process definition information;
    a process network state management unit configured to, based on a state of the process node included in the process network and predetermined process state transition rules, make a specific process node executable; and
    a process network execution unit configured to execute a process defined by the process definition information associated with the executable process node included in the process network,
    wherein the process network generation unit is configured to include a process network model input unit configured to accept an input of the process network model, the process network generation unit being configured to generate the process network from the process network model accepted as input by the process network model input unit,
    wherein the process definition information includes information related to actions necessary to execute the process defined by the process definition information, and
    wherein the process network execution unit is configured to execute the process defined by the process definition information of the executable process node by sending an execution request for an action, based on the information related to actions included in the process definition information, to an action execution system that executes predetermined actions upon request.

(2) The process execution system according to (1), wherein:
    the process network model input unit is configured to accept an input of a hierarchical process network model representing hierarchical relationships between the process nodes generated by the process master nodes, and
    the process network generation unit is configured to generate a hierarchical process network corresponding to the hierarchical process network model accepted as input by the process network model input unit.

(3) The process execution system according to (1) or (2), wherein:
    the process network state management unit is configured to include a process state change request acceptance unit configured to accept a process state change request for changing a state of a specific process node and to change the state of the specific process node included in the process network based on the process state change requests accepted by the process state change request acceptance unit.

(4) The process execution system according to any one of (1) to (3), further comprising:
    a transcription unit configured to execute a transcription process for transcribing the process generation information associated with one process master node into one process node corresponding to the one process master node as the process definition information,
    wherein the process generation information includes at least one piece of transcription process definition information defining the transcription process,
    wherein the transcription process definition information includes at least one piece of transcription factor model definition information defining a transcription factor model, the transcription factor model modeling an influence of an environment with which the process execution system is communicable on the transcription process,
    wherein the transcription unit is configured to include a transcription request acceptance unit configured to accept an execution request for the transcription process, a transcription factor model evaluation unit configured to evaluate the transcription factor model defined by the transcription factor model definition information, and a transcription process execution unit configured to execute the transcription process defined by the transcription process definition information, and
    wherein the transcription process execution unit is configured to control the transcription process based on evaluation results of one or more transcription factor models evaluated by the transcription factor model evaluation unit.

(5) The process execution system according to (4), wherein:
    the process network execution unit is configured to, when executing the process defined by the process definition information, send the execution request for the transcription process to the transcription request acceptance unit, thereby executing the process based on the process definition information updated by the transcription unit transcribing the process generation information used to generate the process definition information.

(6) The process execution system according to (4) or (5), wherein:
the transcription factor model evaluation unit is configured to, when evaluating one transcription factor model, use evaluation results of the other transcription factor models as input data for the one transcription factor model.

(7) The process execution system according to any one of (4) to (6), wherein:
the process definition information includes an active flag indicating whether the process having the process definition information is active or inactive,
the process generation information includes an active flag master used to generate the active flag,
the active flag master includes the transcription process definition information configured to determine the active flag based on evaluation results of the transcription factor models, and
the process network state management unit is configured to ignore process nodes as if they did not exist when the active flag included in the process definition information associated with the process nodes indicates that the process is inactive.

(8) The process execution system according to any one of (1) to (7), wherein:
the process network generation unit is configured to include a process network model output unit configured to output the process network model, and
the process network model output unit is configured to output serialized data of the process network model.

(9) The process execution system according to (8), wherein:
the process network model input unit is configured to accept an input of serialized data of the process network model, and
the process network generation unit is configured to generate the process network using the process network model obtained by deserializing the serialized data of the process network model accepted as input by the process network model input unit.

(10) The process execution system according to (8) or (9), wherein:
the process network model output unit is configured to serialize the process network model based on a rule that the process network model and the serialized data of the process network model have a one-to-one correspondence.

(11) The process execution system according to any one of (8) to (10), wherein:
a data format used by the process network model output unit to output serialized data of the process network model is an array of key-value pairs.

(12) The process execution system according to (11), wherein:
the data format used by the process network model output unit to output serialized data of the process network model is JSON.

(13) The process execution system according to any one of (1) to (12), further comprising:
a process network model display unit configured to display the process network model.

(14) The process execution system according to any one of (1) to (13), further comprising:
a process network display unit configured to display the process network.

(15) A data structure used in a process execution system, comprising:
a process network model used to generate a process network that includes a plurality of process nodes having process definition information defining content of processes,
wherein the process network model includes a plurality of process master nodes having process generation information used to generate the process definition information, and represents relationships between a plurality of process nodes generated by the process master nodes, and
wherein the process definition information includes information related to actions necessary to execute the process defined by the process definition information.

(16) The data structure according to claim (15), wherein:
the process network model is a hierarchical process network model representing hierarchical relationships between the process nodes generated by process master nodes, and is used to generate a hierarchical process network corresponding to the hierarchical process network model.

(17) The data structure according to (15) or (16),
wherein the process generation information includes at least one piece of transcription process definition information defining a transcription process, the transcription process transcribing the process generation information associated with a process master node into a process node corresponding to the process master node as the process definition information,
wherein the transcription process definition information includes at least one piece of transcription factor model definition information defining a transcription factor model, the transcription factor model modeling an influence of an environment with which the process execution system is communicable on the transcription process.

(18) The data structure according to (17), wherein:
one of the transcription factor models is expressed so that evaluation results of other transcription factor models is set as input data for the one transcription factor model.

(19) The data structure according to (17) or (18), wherein:
the process definition information includes an active flag indicating whether the process having the process definition information is active or inactive,
the process generation information includes an active flag master used to generate the active flag,
the active flag master includes the transcription process definition information configured to determine the active flag based on evaluation results of the transcription factor models.

(20) The data structure according to any one of (15) to (19), wherein:
a data format is an array of key-value pairs.

(21) The data structure according to any one of (15) to (20), wherein:
the data format is JSON.

(22) A process execution program for causing a computer to execute:
accepting an input of a process network model that includes a plurality of process master nodes having process generation information used to generate process definition information defining content of processes, and represents relationships between a plurality of process nodes generated by the process master nodes, generating a process network that includes the plurality of process nodes having the process definition information from the process network model accepted as input in the accepting the input of the process network model, performing a state transition process for the process nodes based on a state of the process nodes included in the process network and predetermined process state transition rules, executing an executable process node included in the process network.

(23) The process execution program according to (22), wherein:

in the accepting the input of the process network model, the hierarchical process network model representing hierarchical relationships between process nodes generated by the process master nodes is accepted as input, in the generating the process network, a hierarchical process network corresponding to the hierarchical process network model accepted as input in the accepting the input of the process network model is generated.

(24) The process execution program according to (22) or (23), wherein:

the performing the state transition process for the process nodes includes an accepting a process state change request for changing a state of a specific process node, whereby the state of the specific process node is changed based on the process state change request accepted in the accepting the process state change request.

(25) The process execution program according to any one of (22) to (24), wherein:

the process generation information includes at least one piece of transcription process definition information defining a transcription process, the transcription process transcribing the process generation information associated with a process master node into a process node corresponding to the process master node as the process definition information, wherein the transcription process definition information includes at least one piece of transcription factor model definition information defining a transcription factor model, the transcription factor model modeling an influence of an environment with which the process execution system is communicable on the transcription process, the program causes the computer to further execute:
accepting an execution request for the transcription process,
evaluating the transcription factor models defined by the transcription factor model definition information,
executing the transcription process defined by the transcription process definition information, wherein the executing the transcription process controls the transcription process based on evaluation results of one or more of the transcription factor models evaluated in the evaluating the transcription factor models.

(26) The process execution program according to (25), wherein:

in the executing the executable process node, the process is executed based on the process definition information updated by transcribing the process generation information used to generate the process definition information by sending an execution request for the transcription process.

(27) The process execution program according to (25) or (26), wherein:

in the evaluating the transcription factor models, when evaluating one of the transcription factor models, evaluation results of other transcription factor models are used as input data for the one transcription factor model.

(28) The process execution program according to any one of (25) to (27), wherein:

the process definition information includes an active flag indicating whether the process having the process definition information is active or inactive, the process generation information includes an active flag master used to generate the active flag, the active flag master includes the transcription process definition information configured to define the active flag based on evaluation results of the transcription factor models, and in performing the state transition process for the process nodes, process nodes are neglected as if they did not exist when the active flag included in the process definition information associated with the process nodes indicates the process is inactive.

(29) The process execution program according to any one of (22) to (28), further comprising:

outputting the process network model, and in the outputting the process network model, the serialized data of the process network model is output.

(30) The process execution program according to any one of (22) to (29), the program causing the computer to further execute in the accepting the input of the process network model, the serialized data of the process network model is accepted as input, in the generating the process network, the process network is generated using the process network model obtained by deserializing the serialized data of the process network model accepted in the accepting the input of the process network model.

(31) The process execution program according to any one of (22) to (30), wherein:

in the outputting the process network model, the process network model is serialized based on a rule that the process network model and the serialized data of the process network model correspond one-to-one.

(32) The process execution program according to any one of (22) to (31), wherein:

in the outputting the process network model, the serialized data of the process network model is output in an array of key-value pairs.

(33) The process execution program according to (32), wherein:

in the outputting the process network model, the serialized data of the process network model is output in JSON.

(34) The process execution program according to any one of (22) to (33), further comprising:

displaying the process network model.

(35) The process execution program according to any one of (22) to (34), further comprising:

displaying the process network.

The process execution system of the present invention comprises a process network generation unit configured to generate a process network from a process network model, wherein the process network model includes a plurality of process master nodes having process generation information used to generate process definition information defining content of processes, and represents relationships between a plurality of process nodes generated by the process master nodes, and wherein the process network includes the plurality of process nodes having the process definition information, a process network state management unit configured to, based on a state of the process node included in the process network and predetermined process state transition rules, make a specific process node executable, and a process network execution unit configured to execute a process defined by the process definition information associated with the executable process node included in the process network, wherein the process network generation unit is configured to include a process network model input unit configured to accept an input of the process network model, the process network generation unit being configured to generate the process network from the process network model accepted as input by the process network model input unit, wherein the process definition information includes information related to actions necessary to execute the process defined by the process definition information, and wherein the process network execution unit is configured to execute the process defined by the process definition information of the executable process node by sending an execution request for an action, based on the information related to actions included in the process definition information, to an action execution system that executes predetermined actions upon request. Accordingly, by achieving a balance between plasticity and stability, it becomes possible to provide a process execution system with high adaptability to rapidly changing business environments.

BRIEF DESCRIPTION OF DRAWINGS

FIG. 7 is a schematic diagram illustrating a data structure of a process master node of a process network model accepted as input by the process network model input unit of the process execution system shown in FIG. 1.

FIG. 8 is a schematic diagram illustrating a data structure of a process node in a process network generated by the process network generation unit of the process execution system shown in FIG. 1.

FIG. 24 is a schematic diagram illustrating a data structure of a process master node of a process network model accepted as input by the process network model input unit of the process execution system shown in FIG. 18.

FIG. 25 is a schematic diagram illustrating a data structure of a process node in a process network generated by the process network generation unit of the process execution system shown in FIG. 18.

FIG. 35 is a diagram illustrating the syntax of the selection process tag of the process execution system according to the third embodiment of the present invention.

FIG. 36 is a diagram illustrating the syntax of the iteration process tag in the process execution system according to the third embodiment of the present invention.

FIG. 37 is a diagram illustrating the syntax of the replacement process tag in the process execution system according to the third embodiment of the present invention.

FIG. 38 is a diagram illustrating the syntax of the transcription factor model tag of the process execution system according to the third embodiment of the present invention.

FIG. 39 is a diagram illustrating an output data of a transcription factor model of the process execution system according to the third embodiment of the present invention.

FIG. 45 is a schematic diagram illustrating process generation information used to explain an operation example of the transcription unit of the process execution system according to the third embodiment of the present invention.

FIG. 46 is a schematic diagram illustrating the transcription information used to explain an operation example of the transcription unit of the process execution system according to the third embodiment of the present invention.

FIG. 47 is a schematic diagram illustrating transcription information used to explain an operation example of the transcription unit of the process execution system according to the third embodiment of the present invention.

FIG. 48 is a schematic diagram illustrating a transcription process tag used to explain an operation example of the evaluation process of the evaluation target transcription factor model in the transcription unit of the process execution system according to the third embodiment of the present invention.

FIG. 49 is a schematic diagram illustrating a transcription process tag used to explain an operation example of the evaluation process of the evaluation target transcription factor model in the transcription unit of the process execution system according to the third embodiment of the present invention.

FIG. 50 is a schematic diagram illustrating a transcription process tag used to explain an operation example of the evaluation process of the evaluation target transcription factor model in the transcription unit of the process execution system according to the third embodiment of the present invention.

FIG. 51 is a schematic diagram illustrating a transcription process tag used to explain an operation example of the evaluation process of the evaluation target transcription factor model in the transcription unit of the process execution system according to the third embodiment of the present invention.

FIG. 52 is a schematic diagram illustrating a transcription process tag used to explain an operation example of the evaluation process of the evaluation target transcription factor model in the transcription unit of the process execution system according to the third embodiment of the present invention.

FIG. 53 is a schematic diagram illustrating a transcription process tag used to explain an example of the evaluation process of the evaluation target transcription factor model in the transcription unit of the process execution system according to the third embodiment of the present invention.

FIG. 54 is a schematic diagram illustrating an example of an action information master used to explain an operation example of the transcription unit of the process execution system according to the third embodiment of the present invention.

FIG. 55 is a schematic diagram illustrating an action information used to explain an operation example of the transcription unit of the process execution system according to the third embodiment of the present invention.

FIG. 56 is a schematic diagram illustrating an example of an action information master used to explain an operation example of the transcription unit of the process execution system according to the third embodiment of the present invention.

FIG. 57 is a schematic diagram illustrating the action information used to explain an operation example of the transcription unit of the process execution system according to the third embodiment of the present invention.

FIG. 58 is a schematic diagram illustrating a data structure of a process network generated by the process network generation unit of the process execution system according to the variant of the third embodiment of the present invention.

FIG. 59 is a schematic diagram illustrating a data structure of a process network model accepted as input by the process network model input unit of the process execution system according to the variant of the third embodiment of the present invention.

FIG. 60 is a schematic diagram illustrating a data structure of a process master node of a process network model accepted as input by the process network model input unit of the process execution system according to the variant of the third embodiment of the present invention.

FIG. 61 is a schematic diagram illustrating a data structure of a process node in a process network generated by the process network generation unit of the process execution system according to the variant of the third embodiment of the present invention.

FIG. 62 is a functional block diagram of the process network generation unit of the process execution system according to the fourth embodiment of the present invention.

FIG. 63 is a schematic diagram illustrating data serialized by the process network model output unit of the process execution system according to the fourth embodiment of the present invention.

DESCRIPTION OF EMBODIMENTS

Figure 1:
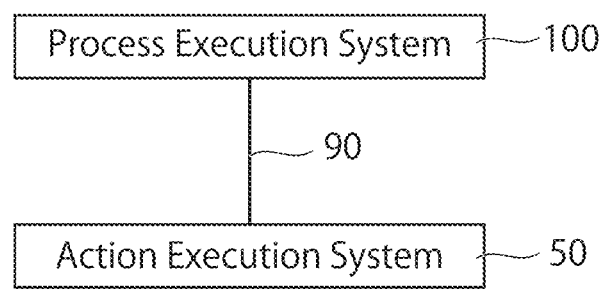
FIG. 1 is a diagram showing the configuration of a process execution system according to the first embodiment of the present invention and an action execution system that communicates with the process execution system.

Before describing the embodiments of the present invention, an overview of the technical significance of the present invention will be outlined. In recent years, as Digital Transformation (see Non Patent Literature 7) progresses, society as a whole is becoming more complex and the speed of change is accelerating (Bruno Latour, "Reassembling the Social: An Introduction to Actor-network-theory", Oxford Univ Pr, 2007). As a result, the speed of changes in the business environment surrounding companies is also becoming faster. To maintain and enhance competitiveness in corporate activities, it is necessary to increase adaptability to rapidly changing business environments. In such an environment, the rapid advancement of digital technology has resulted in the utilization of digital technology significantly influencing the competitiveness of companies. In particular, the automation of business operations using digital technology has become an urgent issue, and there is a growing demand for business systems responsible for automation to improve their adaptability to rapidly changing business environments. The problem to be solved by the process execution system according to the embodiment of the present invention is to provide a process execution system with high adaptability to rapidly changing business environments.

A process execution system that solves the above-mentioned issues must be flexible enough to easily absorb changes in business operations while also ensuring stable business operations. That is, the process execution system that solves the aforementioned issues needs to successfully balance and harmonize the seemingly contradictory relationship between plasticity and stability. In the process execution system according to the embodiment of the present invention, attention is focused on the network that represents the interactions between processes in order to achieve a balance between plasticity and stability. Specifically, the process execution system according to the embodiment of the present invention delegates the execution of actions necessary for the execution of each process to an action execution system, and provides a new execution environment for a business process model using an executable process network (Executable Process Network), particularly an executable business process network (Executable Business Process Network).

Further details on the significance of focusing on the network representing the interactions between processes are provided. Digital Transformation (see Non Patent Literature 7) progresses, the societal environment where everything, including people and machines, interacts through complex networks can be understood as a complex system. Examples of systems that have adapted to environments forming complex systems, particularly those with very high complexity related to interactions among components, prone to unpredictable fluctuations, and with faster rates of change (compared to systems near thermodynamic equilibrium), include biological systems, especially multicellular organisms (Stuart Kauffman, "At Home in the Universe: The Search for Laws of Self-Organization and Complexity," Oxford Univ Pr, 1996; Stuart Kauffman, "A World Beyond Physics: The Emergence and Evolution of Life," Oxford Univ Pr, 2019). Multicellular organisms coordinate various cells by regulating the expression of genes encoded in DNA (Bruce Alberts, et al., "Molecular Biology of the Cell", 6th Edition, Garland Science, 2014). Transcription regulators are involved in the regulation of gene expression, and transcription regulators interact through a complex network (hereinafter referred to as the "Transcription Network") (Uri Alon, "An Introduction to Systems Biology: Design Principles of Biological Circuits", 2nd edition, Chapman and Hall/CRC, 2019). While the types of proteins that constitute multicellular organisms are largely common across different species, the Transcription Network varies between species. The system of multicellular organisms is thought to have an architecture that allows for flexible recombination of modules in response to changes in the external environment Eout by standardizing modules (proteins) while flexibly altering interaction networks such as the Transcription Network. According to this, multicellular organisms are considered to have successfully adapted to environments that form complex systems.

Regarding the process execution system according to the embodiment of the present invention, by analogy with multicellular organisms, the process definition information defining content of the process corresponds to proteins (modules), the process generation information used to generate the process definition information corresponds to genes, the process network expressing the relationships between processes corresponds to the Transcription Network, and the transcription factor model corresponds to transcription regulators. According to the process execution system of the embodiment of the present invention, by standardizing the modules and adjusting the process network that allows the modules to interact with each other, it becomes easier to adapt to environments that form complex systems.

Furthermore, hierarchy has been pointed out as a universal characteristic of systems that adapt to environments forming complex systems (Herbert A. Simon, "The Sciences of the Artificial", MIT Press, 1996). Particularly, the importance of interactions between hierarchies with different time scales has been noted since the philosophy of Henri Bergson (Henri Bergson, "Matter and Memory", Kodansha, 2019), and is also emphasized in research that attempts to elucidate biological systems as dynamical systems using physical methods (Kunihiko Kaneko, "What is Life?—Toward Complex Systems Life Science", University of Tokyo Press, 2009; Kunihiko Kaneko, "Universal Biology: Life Lodged in Physics, Physics Spun by Life", University of Tokyo Press, 2019; Kunihiko Kaneko, Satoshi Sawai, Takumi Takagi, Chikara Furusawa, "Theoretical Biology of Cells: From the Perspective of Dynamics", University of Tokyo Press, 2020). Moreover, the rapidly advancing field of deep learning, which deals with complex systems like spin glasses, for which the Nobel Prize in Physics was awarded in 2021, also possesses hierarchical characteristics as a fundamental aspect (Akifumi Tanaka, Akio Tomiya, Yukio Hashimoto, "Deep Learning and Physics", Kodansha, 2019). The process execution system according to the embodiment of the present invention is capable of generating a hierarchical process network from a hierarchical process network model. Thus, it is considered that the process execution system according to embodiments of the present invention possesses an architecture more easily adaptable to environments that form complex systems.

Furthermore, one of the methods of deep learning, the Graph Neural Network (GNN) which handles data structures represented as graphs, has been rapidly advancing in recent years (Yao Ma, Jiliang Tang, "Deep Learning on Graphs", Cambridge University Press, 2021; Claudio Stamile, Aldo Marzullo, Enrico Deusebio, "Graph Machine Learning: Take graph data to the next level by applying machine learning techniques and algorithms", Packt Publishing, 2021). Networks can be represented as graphs, and both the process network model and the process network according to the embodiment of this invention can be represented as a graph or a bipartite graph. A bipartite graph is also known as a Petri net, and in process mining, which extracts process models from event data, it is common to represent process models using Petri nets (Wil M. P. van der Aalst, "Process Mining: Data Science in Action", Springer, 2016).

By representing business processes as graphs such as process network models or process networks, it becomes easier to apply deep learning techniques such as GNN. For example, it is conceivable to train a GNN to generate a process network model that represents the business processes included in the target operations from the data of the target operations. This could significantly automate the modeling of business processes, which has traditionally been done manually. By generating process network models using GNNs or similar technologies, and inputting the generated process network models into the process execution system according to the embodiment of this invention to produce process networks, and then executing these process networks through the said process execution system, there is potential to automate everything from the modeling of the target operation to the execution of business processes end to end.

Moreover, similar operations exist even among different companies and industries. A process network model that represents a business process within an operation of one company may be applicable to other operations of other companies that are similar to that particular operation. The process execution system according to the embodiment of the present invention functions as an execution environment for the process network model, whereas the substantive content related to the actions necessary for the execution of each process is defined on the action execution system side. That is, the process execution system according to the embodiment of the present invention facilitates the reuse of the above-described process network model because the process execution system and the action execution system are loosely coupled. According to this, the process execution system according to the embodiment of the present invention can promote the distribution of the process model itself, reduce redundant investment related to the creation of the process model, and thereby contribute to the reduction of environmental load.

The embodiments of the present invention will be described below with reference to the accompanying drawings.

First Embodiment

FIG. 1 is a diagram showing the configuration of a process execution system 100 according to the first embodiment of the present invention and an action execution system 50 that communicates with the process execution system 100. As shown in FIG. 1, the process execution system 100 transmits and receives information via communication means 90 with the action execution system 50.

The process execution system 100 according to the present embodiment is configured as a web application operating on a server machine. The process execution system 100 can be configured using a framework for constructing web applications. As a framework for configuring the process execution system 100 as a web application, frameworks such as Django, Flask, and Ruby on Rails can be used. A server machine that executes the process execution system 100 may be an on-premises server machine or a virtual server machine utilizing a commercial cloud service.

The action execution system 50 according to the present embodiment is composed of a web application operating on a server machine, a library called by the process execution system 100, an RPA service provided by a commercial cloud service, or a commercial RPA application and the like.

When configuring the action execution system 50 as a web application operating on a server machine, the action execution system 50 can be configured using a framework for constructing web applications. As a framework for configuring the action execution system 50 as a web application, for example, Django, Flask, and Ruby on Rails can be used. The server machine that executes the action execution system 50 may be an on-premises server machine or a virtual server machine utilizing a commercial cloud service.

When configuring the action execution system 50 as a library called by the process execution system 100, the library may be a part of the libraries that constitute the process execution system 100. If the library constituting the action execution system 50 is a part of the library constituting the process execution system 100, the library constituting the action execution system 50 is executed on the server machine on which the process execution system 100 operates.

When configuring the action execution system 50 using an RPA service provided by a commercial cloud service, the RPA service constituting the action execution system 50 can be, for example, Power Automate provided by Microsoft Corporation.

When configuring the action execution system 50 using a commercial RPA application, the RPA application that constitutes the action execution system 50 can be, for example, Power Automate for desktop provided by Microsoft Corporation. The RPA application can be operated on a client PC.

The communication means 90 can be configured using the Internet or an intranet. Additionally, when the process execution system 100 and the action execution system 50 are executed as different tasks on the operating system (OS) running on the same server machine, the communication means 90 may be the inter-task communication provided by the operating system. Furthermore, when the action execution system 50 is configured as a library called by the process execution system 100, the communication means 90 may be the data transmission and reception means handled by the operating system when calling the library from the process execution system 100.

Figure 2:
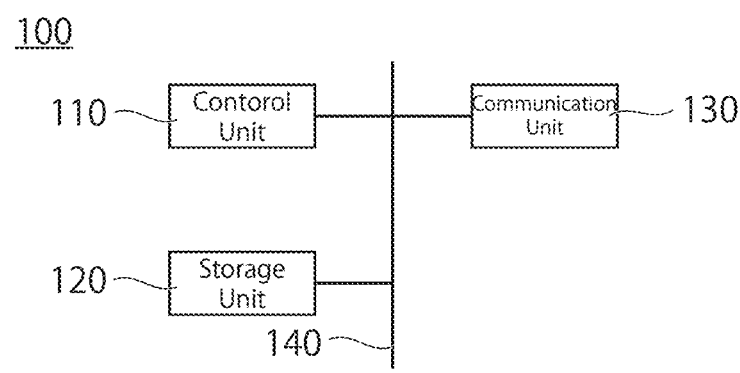
FIG. 2 is a block diagram of a process execution system shown in FIG. 1.

FIG. 2 is a block diagram of the process execution system 100 shown in FIG. 1. As shown in FIG. 2, the process execution system 100 includes a control unit 110, a storage unit 120, and a communication unit 130. These components are connected to each other via the bus 140.

The control unit 110 is composed of a CPU (Central Processing Unit), and memory such as RAM (Random Access Memory) and ROM (Read Only Memory), and it performs control and computation for each part of the process execution system 100 according to a program. Details of the functions of the control unit 110 will be described later.

The storage unit 120 is composed of an HDD (Hard Disc Drive), an SSD (Solid State Drive), and the like, and stores various programs and various data. The storage unit 120 stores data constituting the process network model DM1 and data constituting the process network D1, which will be described later. The storage unit 120 can function as a database server using, for example, PostgreSQL and the like.

The communication unit 130 is an interface circuit (such as a LAN card) for communicating with external devices via a network.

Figure 3:
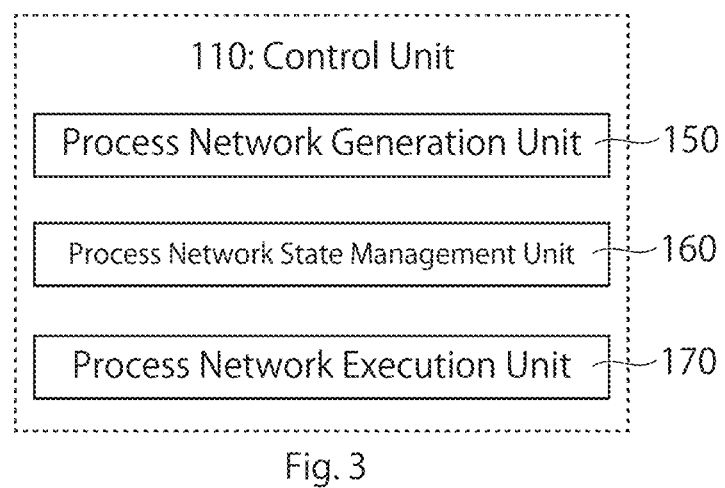
FIG. 3 is a functional block diagram of a control unit of the process execution system shown in FIG. 1.
Figure 4:
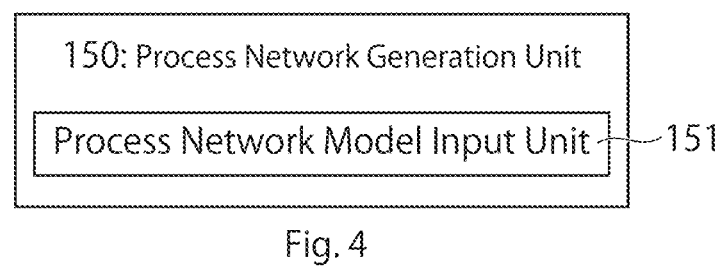
FIG. 4 is a functional block diagram of a process network generation unit of the process execution system shown in FIG. 1.
Figure 5:
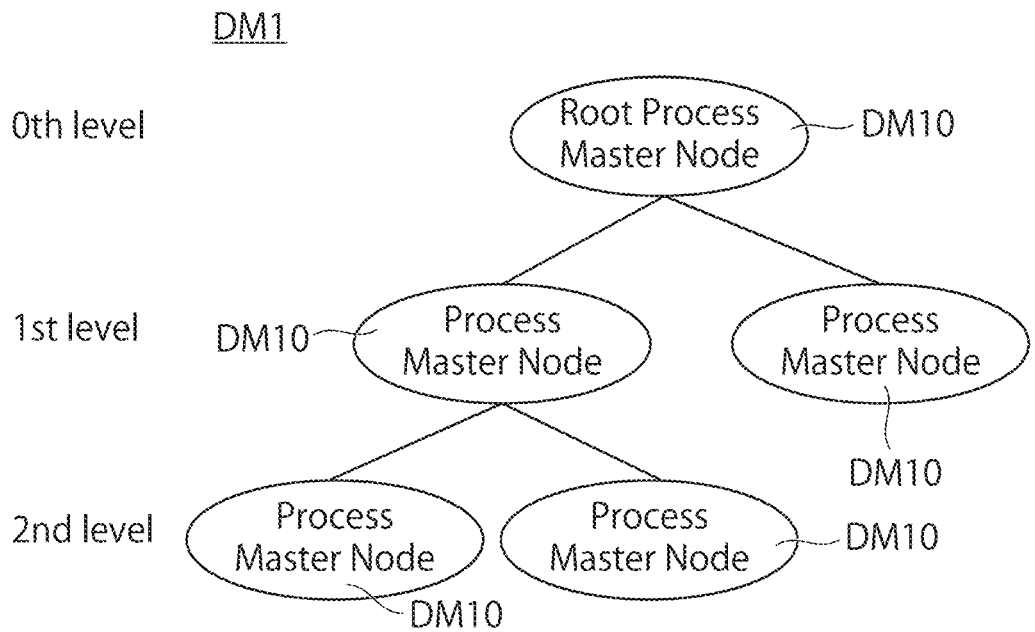
FIG. 5 is a schematic diagram illustrating a data structure of a process network model, which is accepted as input by the process network model input unit of the process execution system shown in FIG. 1.
Figure 6:
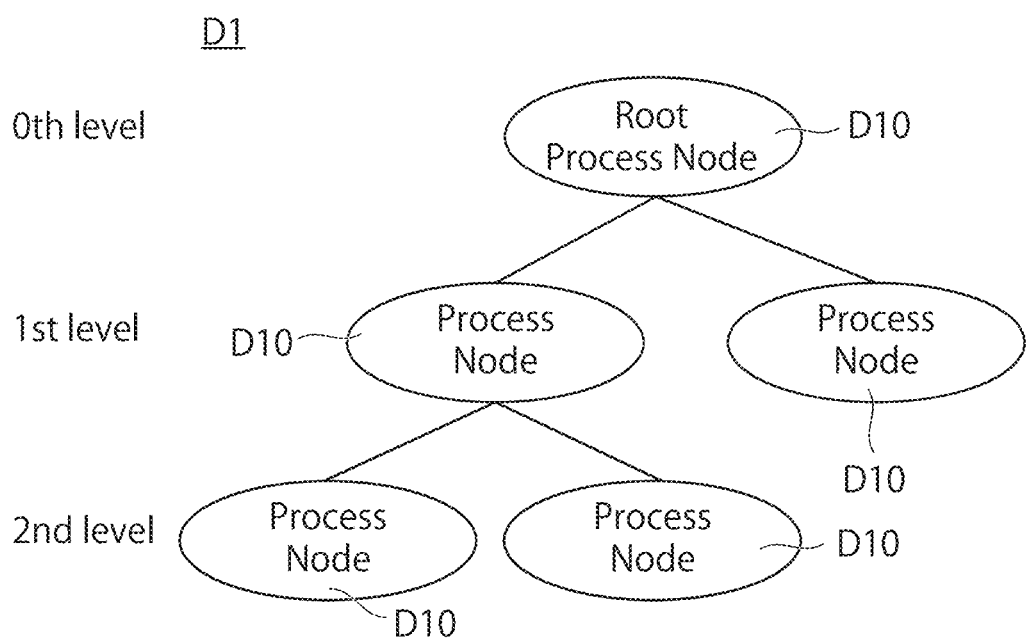
FIG. 6 is a schematic diagram illustrating a data structure of a process network generated by the process network generation unit of the process execution system shown in FIG. 1.
Figure 9:
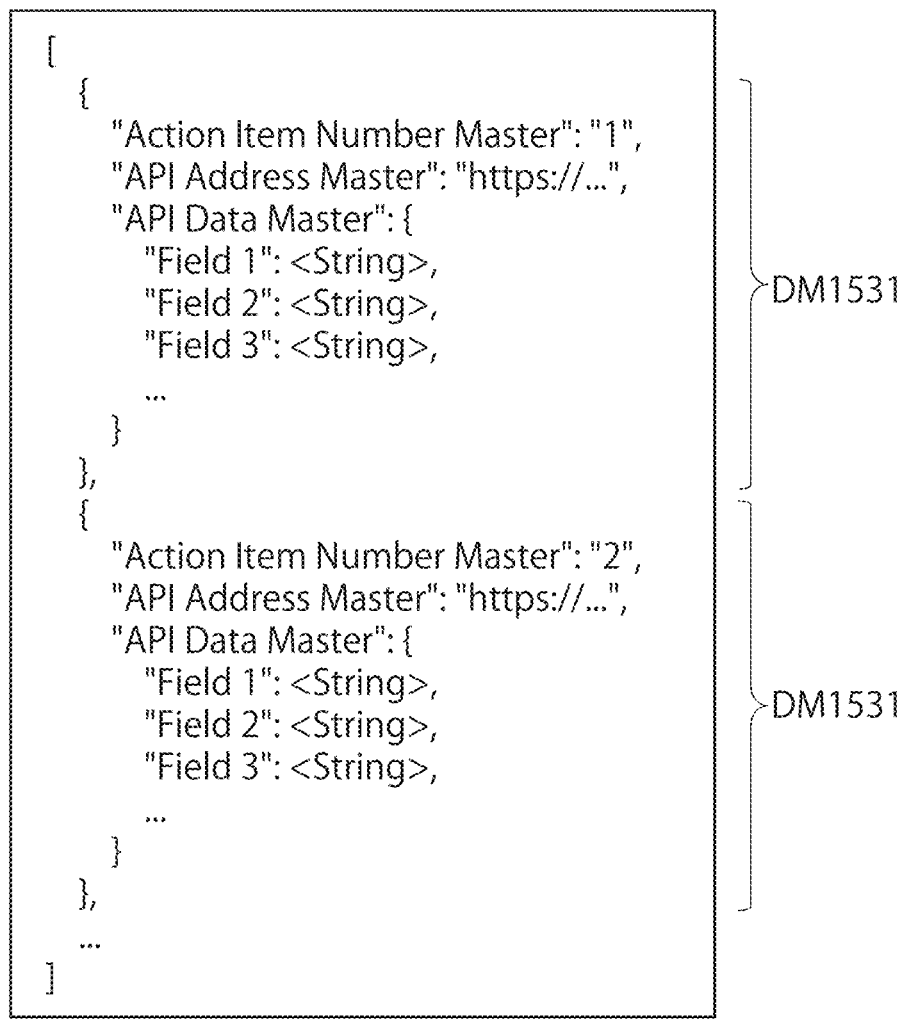
FIG. 9 is a schematic diagram illustrating a data structure of the action information master of a process master node of a process network model accepted as input by the process network model input unit of the process execution system shown in FIG. 1.
Figure 10:
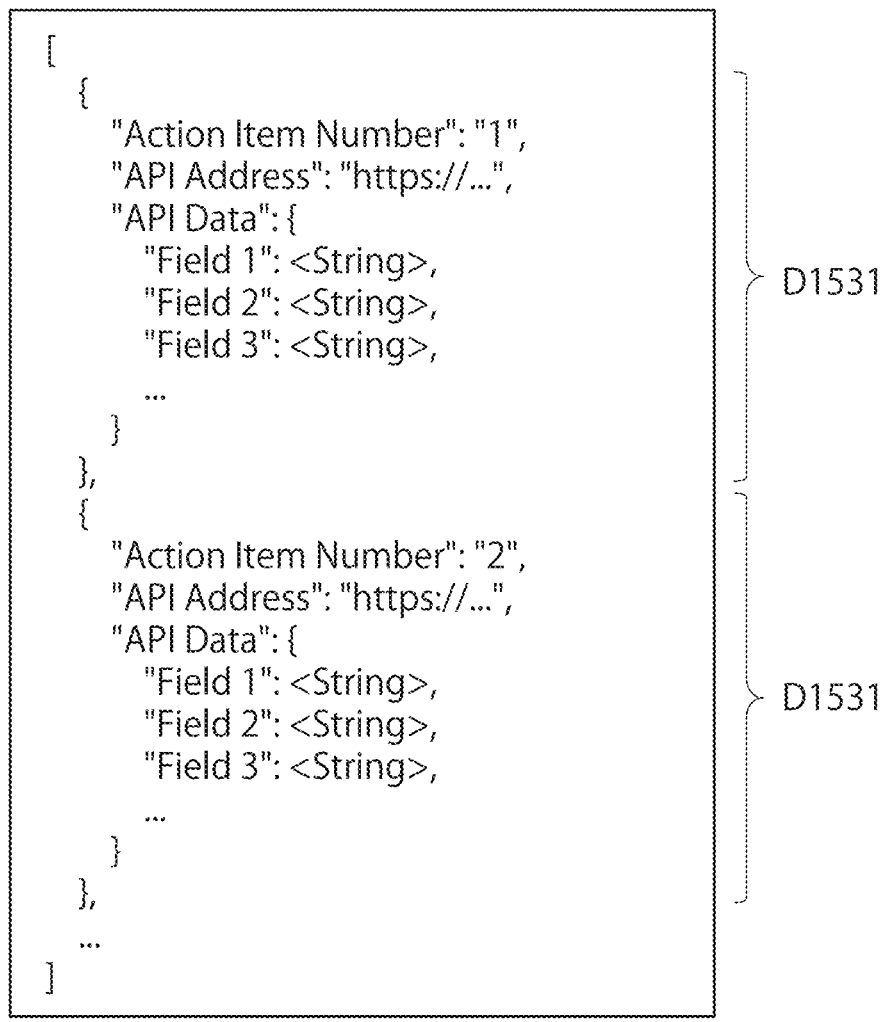
FIG. 10 is a schematic diagram illustrating a data structure of the action information of a process node in a process network generated by the process network generation unit of the process execution system shown in FIG. 1.

The functions of control unit 110 will be described below with reference to FIGS. 3 to 10. FIG. 3 is a functional block diagram of the control unit 110 of the process execution system 100. FIG. 4 is a functional block diagram of the process network generation unit 150 of the process execution system 100. FIG. 5 is a schematic diagram illustrating a data structure of a process network model DM1, which is accepted as input by the process network model input unit 151 of the process execution system 100. FIG. 6 is a schematic diagram illustrating a data structure of a process network D1 generated by the process network generation unit 150 of the process execution system 100. FIG. 7 is a schematic diagram illustrating a data structure of a process master node DM10 of the process network model DM1 accepted as input by the process network model input unit 151 of the process execution system 100. FIG. 8 is a schematic diagram illustrating a data structure of a process node D10 in a process network D1 generated by the process network generation unit 150 of the process execution system 100. FIG. 9 is a schematic diagram illustrating a data structure of an action information master DM153 of the process master node DM10 of the process network model DM1 accepted as input by the process network model input unit 151 of the process execution system 100. FIG. 10 is a schematic diagram illustrating a data structure of the action information D153 of the process nodes D10 in the process network D1 generated by the process network generation unit 150 of the process execution system 100.

As shown in FIG. 3, the control unit 110 functions as the process network generation unit 150, the process network state management unit 160, and the process network execution unit 170.

As shown in FIG. 4, the process network generation unit 150 includes a process network model input unit 151 configured to accept an input of the process network model DM1, and generates the process network D1 from the process network model DM1 accepted as input by the process network model input unit 151. By analogy with object-oriented languages, process network model DM1 corresponds to a class, and process network D1 corresponds to an instance or object of that class.

The process network model input unit 151 may be configured to have a GUI (Graphical User Interface) that accepts an input of the process network model DM1, or may be configured to have an API (Application Programming Interface) that accepts an input of the process network model DM1. The API that accepts an input of the process network model DM1 can be configured to accept an input of the process network model DM1 through communication using, for example, HTTP. Moreover, the GUI that accepts an input of the process network model DM1 can be configured to accepts an input of the process network model DM1, for example, through operations from a browser.

The process network model input unit 151 may accept an input of context data in addition to the input of the process network model DM1. Context data, for example, includes case attribute information such as the case ID of the cases processed in the operations represented by the process network model DM1.

The process network generation unit 150 may be configured to dynamically change the content of the generated process network D1 by using context data when generating the process network D1 from the process network model DM1 accepted as input by the process network model input unit 151. According to this, the process network generation unit 150 can achieve the same effect as dynamically changing the content of the generated object according to the context data when generating the process network D1, which corresponds to the object of the class, from the process network model DM1, which corresponds to the class, if explained by analogy with an object-oriented language.

Additionally, the process network generation unit 150 may store the context data accepted as input by the process network model input unit 151 in the storage unit 120 in association with the generated process network D1. According to this, the process network execution unit 170 can dynamically change the content of actions executed by the action execution system 50 at runtime by dynamically changing the API addresses, API data, and other elements described later in accordance with the context data at runtime when executing the process node D10 included in the process network D1. For example, the process network execution unit 170 can dynamically change the content of the API data sent to the action execution system 50 by using the case attribute information stored in the storage unit 120 as context data. According to this, the content of documents generated by the action execution system 50 and the like can be changed for each case.

As shown in FIG. 5, the process network model DM1 includes a plurality of process master nodes DM10 and represents the relationships between the process master nodes DM10. Preferably, the process network model DM1 is a hierarchical process network model representing hierarchical relationships between process master nodes DM10. In the present embodiment, the process network model DM1 is described as an example of a hierarchical process network model, but it is not limited to this.

The hierarchical process network model DM1 has a tree structure. The hierarchical process network model DM1 has a root process master node DM10. The root process master node DM10 may have one or more process master nodes DM10 as child nodes. The process master node DM10 may have one or more process master nodes DM10 as child nodes. The number of process master nodes DM10 belonging to the same parent can be arbitrary. The hierarchical process network model DM1 may have any number of hierarchical levels, with the hierarchical level to which the root process master node DM10 belongs being designated as the 0th level, and the hierarchical level to which the process master nodes DM10, which are direct children of the root process master node DM10, belong being designated as the 1st level. The number of process master nodes DM10 belonging to the same hierarchical level can be arbitrary.

As shown in FIG. 6, the process network D1 includes a plurality of process nodes D10 and represents the relationships between the process nodes D10. Preferably, the process network D1 is a hierarchical process network representing hierarchical relationships between process nodes D10. In the present embodiment, the process network D1 is described as an example of a hierarchical process network, but it is not limited to this.

The hierarchical process network D1 has a tree structure. The hierarchical process network D1 has a root process node D10. The root process node D10 may have one or more process nodes D10 as child nodes. The process node D10 may have one or more process nodes D10 as child nodes. The number of process nodes D10 belonging to the same parent can be arbitrary. A hierarchical process network D1 may have any number of hierarchical levels, with the hierarchical level to which the root process node D10 belongs being designated as the 0th level, and the hierarchical level to which the direct child process node under the root process node D10 belongs being designated as the 1st level. The number of process nodes D10 belonging to the same hierarchical level can be arbitrary.

The process network generation unit 150 can be configured to generate the process network D1 from the process network model DM1 such that each process master node DM10 included in the process network model DM1 corresponds one-to-one with each process node D10 included in the process network D1.

Additionally, the process network generation unit 150 may be configured to control the generation of the process node D10 corresponding to the process master node DM10 included in the process network model DM1, in accordance with the context data accepted as input by the process network model input unit 151, when generating the process network D1 from the process network model DM1.

Specifically, the process network generation unit 150 may classify the context data accepted as input by the process network model input unit 151 into specific types, and when the context data is classified into one specific type, the process network generation unit 150 may generate a process node D10 corresponding to one specific process master node DM10, and when the context data is classified into another specific type, the process network generation unit 150 may generate a process node D10 corresponding to another specific process master node DM10. That is, the process network generation unit 150 may be configured to selectively switch the process master node DM10 used to generate the process node D10 according to the context data when generating the process network D1 from the process network model DM1. For example, the process network generation unit 150 can be configured to generate a process node D10 corresponding to a specific process master node DM10 when the context data includes a specific customer name (in this case, a process node D10 corresponding to another specific process master node DM10, which will be described later, is not generated), and to generate a process node D10 corresponding to another specific process master node DM10 when the context data includes another specific customer name (in this case, a process node D10 corresponding to the aforementioned specific process master node DM10 is not generated).

Additionally, the process network generation unit 150 may be configured to classify the context data accepted as input by the process network model input unit 151 into specific types, and generate (or not generate) the process node D10 corresponding to the specific process master node DM10 only when the context data is classified into specific types. For example, the process network generation unit 150 may be configured to generate (or not generate) a process node D10 corresponding to a specific process master node DM10 only when the context data includes a specific customer name.

FIG. 7 is a diagram illustrating a data structure of the process master node DM10. The data of the process master node DM10 includes a process master node identifier DM11, a parent process master node identifier DM12, and process generation information DM15.

The process master node identifier DM11 is an identifier for uniquely identifying the process master node DM10 included in the process network model DM1. The parent process master node identifier DM12 is an identifier for identifying the parent process master node DM12 to which the process master node DM10 belongs. When the process master node DM10 is the root process master node, the parent process master node identifier DM12 can be set to null.

FIG. 8 is a schematic diagram illustrating a data structure of a process node D10. The data of process node D10 includes a process node identifier D11, a parent process node identifier D12, a process state D13, and process definition information D15.

The process node identifier D11 is an identifier for uniquely identifying the process node D10 included in the process network D1. The parent process node identifier D12 is an identifier for identifying the parent process node D10 to which the process node D10 belongs. If the process node D10 is the root process node, the parent process node identifier D12 can be set to null.

Process state D13 represents the state of the process node D10. The state of process node D10 includes an executable state. Preferably, the state of process node D10 includes a completed state. More preferably, the state of process node D10 includes a running state, a waiting state, and an error termination state. The value of process state D13 may be a string representing the state of process node D10, a numerical value representing the state of process node D10, or a combination of flags representing the state of process node D10.

The process generation information DM15 is used in the process network generation unit 150 to generate the process definition information D15 of the process node D10, which is generated from the process master node DM10 to which the process generation information DM15 belongs. The process definition information D15 includes information related to actions necessary to execute the process defined by the process definition information D15. Process generation information DM15 includes various masters. The values of various masters included in the process generation information DM15 are used as the values for each item of the process definition information D15 generated by the process generation information DM15.

The process network generation unit 150 can be configured such that, when the value of a master included in the process generation information DM15 is X, the value of an item in the process definition information D15 generated by the master is set to X.

Additionally, the process network generation unit 150 can dynamically change the generated process definition information D15 by using the context data input to the process network model input unit 151 when generating the process network D1 from the process network model DM1 accepted as input by the process network model input unit 151. The method for dynamically changing the process definition information D15 is not particularly limited, but for example, mechanisms of template engines such as the Django Template Language (DTL) used in Django, a framework for creating web applications, can be utilized. Specifically, it is possible to dynamically change the process definition information D15 by embedding tags in the parts of the master values of the process generation information DM15 that are desired to be dynamically changed, and replacing these tags according to the context data input to the process network model input unit 151 when generating the process definition information D15.

Referring to FIG. 7, the process generation information DM15 includes a process number master DM151, a process name master DM152, and an action information master DM153. Referring to FIG. 8, the process definition information D15 includes a process number D151, a process name D152, and action information D153. The process number D151 is generated by the process number master DM151, the process name D152 is generated by the process name master DM152, and the action information D153 is generated by the action information master DM153.

If there is no action to be executed in the process node D10 generated from the process master node DM10 to which the process generation information DM15 belongs, the process master node DM10 may not include the action information master DM153. For example, in the case of a parent process master node DM10 arranged to bundle process master nodes DM10 that perform actions, there may be no actions executed in the parent process master node DM10. When the process master node DM10 does not include action information master DM153, the process node D10 generated from the process master node DM10 will not include action information D153.

The values of the process number master DM151 and the process number D151 are, for example, any natural number. The process network generation unit 150 can be configured such that, when the value of the process number master DM151 is N (any natural number), the process number D151 of the generated process node D10 becomes N. Process number D151 may be unique or duplicated among the process nodes D10 belonging to the same hierarchical level. Additionally, only some of the numbers may be duplicated. For example, in the case where there are five process nodes D10 belonging to the same hierarchical level, the process numbers D151 can be set to 100, 200, 300, 300, and 400, respectively.

The values of process name master DM152 and process name D152 are any strings. The process network generation unit 150 can be configured such that the generated process name D152 becomes S when the value of the process name master DM152 is S (any string).

The action information master DM153 defines the content of actions executed in the process node D10, which is generated from the process master node DM10 to which the action information master DM153 belongs. The content of actions is not particularly limited as long as it is executable by the action execution system 50.

When using Power Automate of MICROSOFT 365 (registered trademark), a cloud service provided by Microsoft Corporation, as the action execution system 50, the content of the actions may include, for example, generating documents, generating emails, sending approval requests, generating tasks, scheduling events, and posting chat messages. The document is, for example, an email or an invoice. By using Power Automate, it is possible to generate various documents. The file format of the document may include, for example, formats usable with Microsoft Corporation's Office applications such as Word, Excel (registered trademark), Outlook (registered trademark), and PowerPoint (registered trademark). The sending of the approval request can be executed by sending the approval request from Power Automate to the approval request application of MICROSOFT 365 (registered trademark). The generation of tasks can be executed by registering tasks from Power Automate to Planner of MICROSOFT 365 (registered trademark). The generation of schedules can be executed by generating schedules in OUTLOOK (registered trademark) of MICROSOFT 365 (registered trademark). The posting of chat messages can be executed by posting messages to a chat with a specific user, posting messages to a specific channel, or posting messages to a specific chat group in Teams of MICROSOFT 365 (registered trademark) from Power Automate.

FIG. 9 is a diagram illustrating a data structure of action information master DM153. The action information master DM153 includes one or more action item masters DM1531.

FIG. 10 is a diagram illustrating a data structure of action information D153. Action information D153 includes one or more action items D1531.

Referring to FIG. 9, the action item master DM1531 includes an action item number master, an API address master, and an API data master. Referring to FIG. 10, the action item includes an action item number, an API address, and API data. The action item number is generated by the action item number master, the API address is generated by the API address master, and the API data is generated by the API data master.

The value of the action item number master and the value of the action item number are, for example, any natural number. The process network generation unit 150 can be configured such that, when the value of the action item number master is N (an arbitrary natural number), the action item number of the generated process node D10 becomes N. The action item number may be unique or duplicated among one or more action items belonging to one action information D153. Also, some action item numbers may be duplicated. For example, if there are five action items belonging to one action information D153, the action item numbers can be set as 1, 2, 3, 3, and 4.

The API address is used to execute an action defined by the action item to which the API address belongs. The process network execution unit 170, when executing an action included in an executable process node D10, sends an action execution request via the API specified by the API address to the action execution system 50, thereby causing the action execution system 50 to execute the action.

The value of the API address master and the value of the API address are strings. The process network generation unit 150 can be configured such that, when the value of the API address master is S (an arbitrary string), the generated API address becomes S. When the process network execution unit 170 sends an HTTP request to the API of the action execution system 50 to cause the action execution system 50 to execute an action, the API address is a URL. For example, when the action execution system 50 is Power Automate, the API address is the URL of the API for triggering a flow in Power Automate. In addition, when the action execution system 50 is a web application operating on an on-premises server or a virtual server constructed by a web framework such as Django, the API address is the URL for triggering actions of the web application.

The value of the API data master and the value of the API data are, for example, any strings. The process network generation unit 150 can be configured such that, when the value of the API data master is S (any string), the generated API data becomes S. When the process network execution unit 170 sends an HTTP request to the API of the action execution system 50 to cause the action execution system 50 to execute an action, the API data is the body of the HTTP request. For example, when the action execution system 50 is Power Automate, the API data is the body to be POSTed to the API for triggering a flow in Power Automate.

The data format of the action information master DM153 is not particularly limited, for example, JSON format can be used. By using JSON format, the action information master DM153, which includes one or more action item masters DM1531, can be represented as a single text string. According to this, when the process network generation unit 150 generates the process network D1 from the process network model DM1, the process of dynamically changing the action information D153 from the action information master DM153 according to the context data accepted as input by the process network model input unit 151 becomes easier.

For example, when using a template engine mechanism such as those used in frameworks for creating web applications (such as Django and the like) as a method to dynamically change the process definition information D15 as mentioned above, it is possible to batch replace the tags included in the action information master DM153 with the transformed values according to the context data. Moreover, JSON format data can be efficiently created and edited using editors such as VS CODE (registered trademark) provided by Microsoft Corporation. Therefore, the business personnel can easily edit and maintain the action information master DM153. Moreover, when training the process network model DM1 using machine learning such as GNN, it is easier to train because the information related to actions is represented as a single text string.

The data format of the action information D153 is not particularly limited, for example, JSON format can be used. By using JSON format, action information D153 containing one or more action items can be represented as a single text string. Additionally, when training the process network model DM1 using machine learning such as GNN with the data of process network D1, it is easier to train because the information related to actions is represented as a single text string.

The process network state management unit 160 performs a state transition process for process nodes D10 included in the process network D1 based on the state of the process node D10 and predetermined process state transition rules. Specifically, the process network state management unit 160 transitions a specific process node D10 to the executable state based on the state of the process node D10 included in the process network D1 and the predetermined process state transition rule. Details of the operation of the process network state management unit 160 will be described later with reference to FIGS. 12 to 14.

The process network execution unit 170 executes the process defined by the process definition information D15 associated with the executable process node D10 included in the process network D1. The process network execution unit 170 can, for example, store executable process nodes D10 in a queue and execute the processes of the executable process nodes D10 sequentially or in parallel.

The process network execution unit 170 executes the process defined by the process definition information D15 by sending an action execution request to the action execution system 50 based on the action information D153 included in the process definition information D15 of the executable process node D10. Specifically, the process network execution unit 170 sends an action execution request to the action execution system 50 based on the content of the action item included in the process definition information D15 of the executable process node D10. More specifically, the process network execution unit 170 causes the action execution system 50 to execute the action by sending API data to the API address contained in the action item. For example, when the action execution system 50 receives an action execution request via an API using HTTP, the process network execution unit 170 performs an HTTP POST with the API data as the body to the API address included in the action item.

Figure 11:
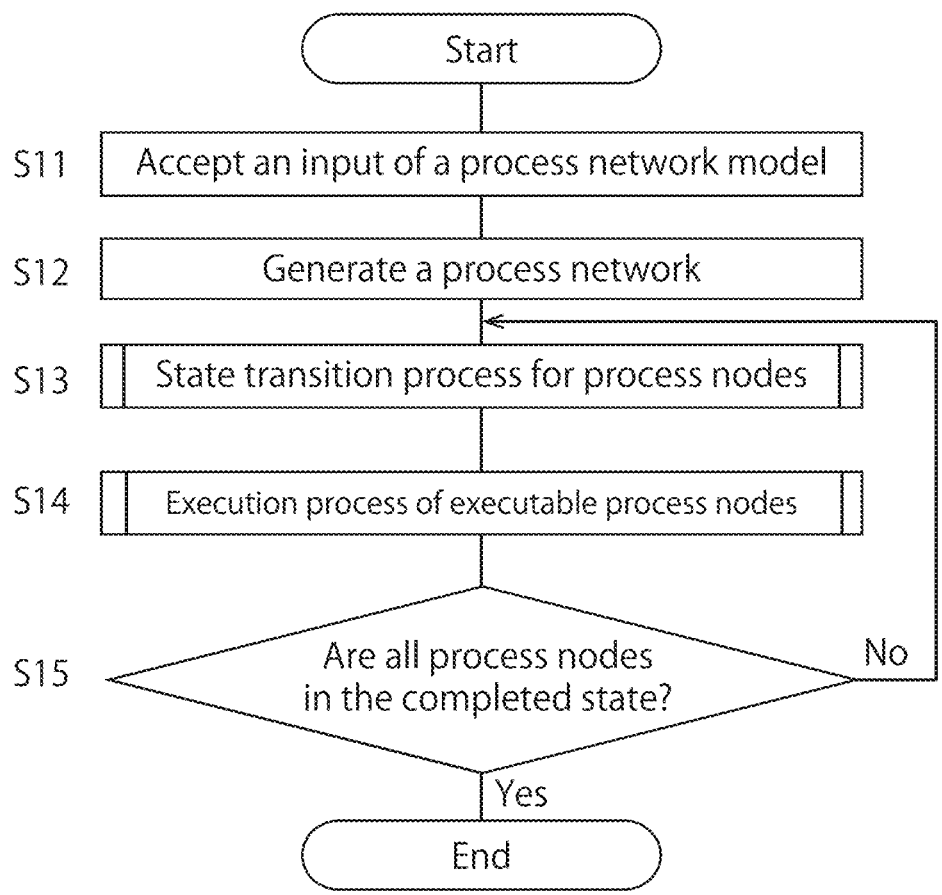
FIG. 11 is a flowchart illustrating the procedure of the process executed in the process execution system shown in FIG. 1.
Figure 12:
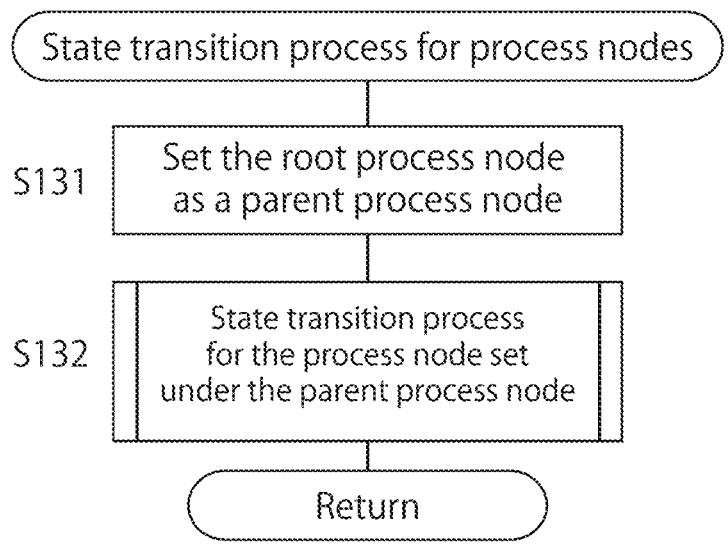
FIG. 12 is a flowchart illustrating the procedure of the state transition process for process nodes executed in the process execution system shown in FIG. 1.
Figure 13:
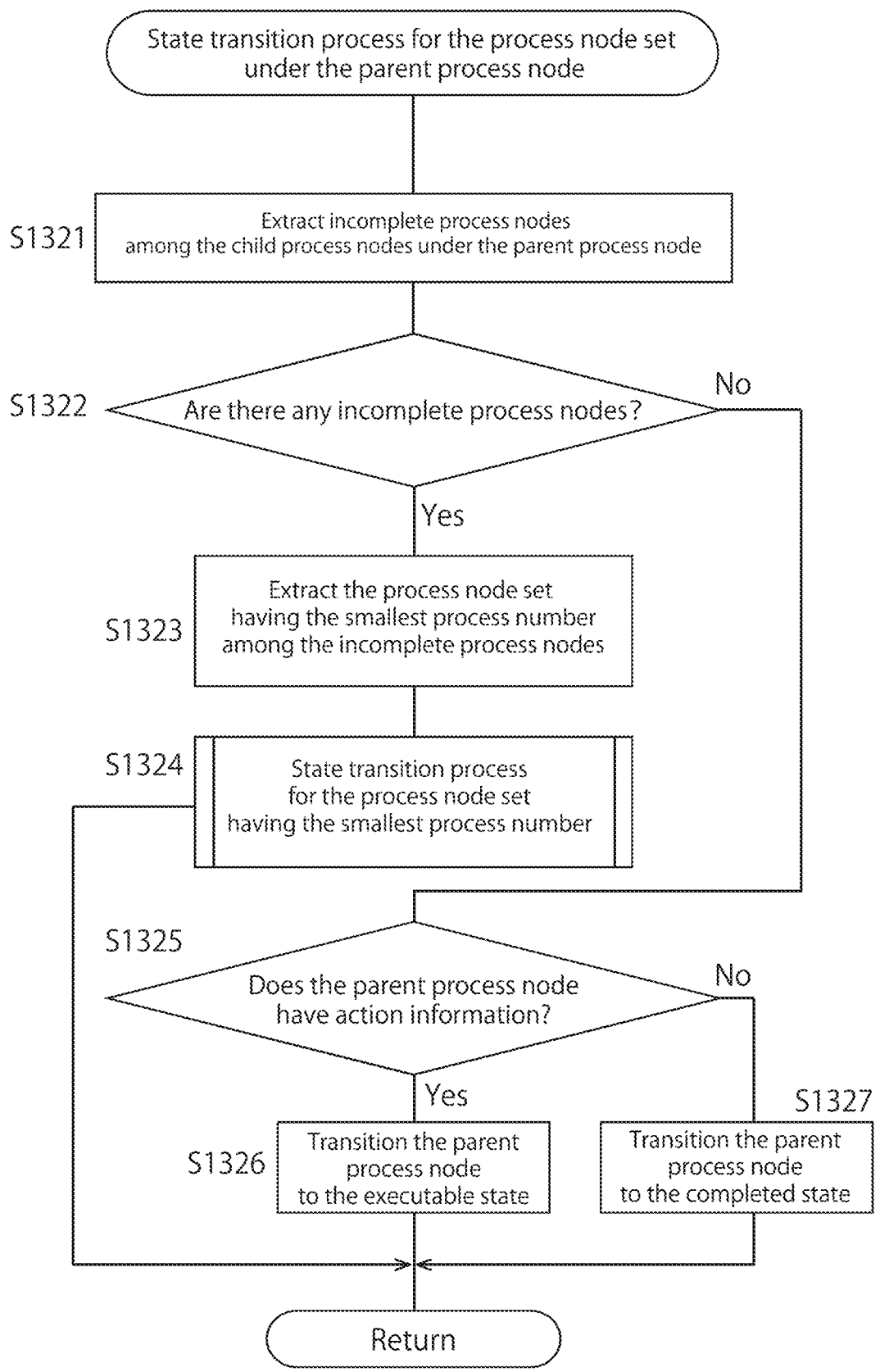
FIG. 13 is a flowchart illustrating the procedure of the state transition process for a process node set under a parent process node executed in the process execution system shown in FIG. 1.
Figure 14:
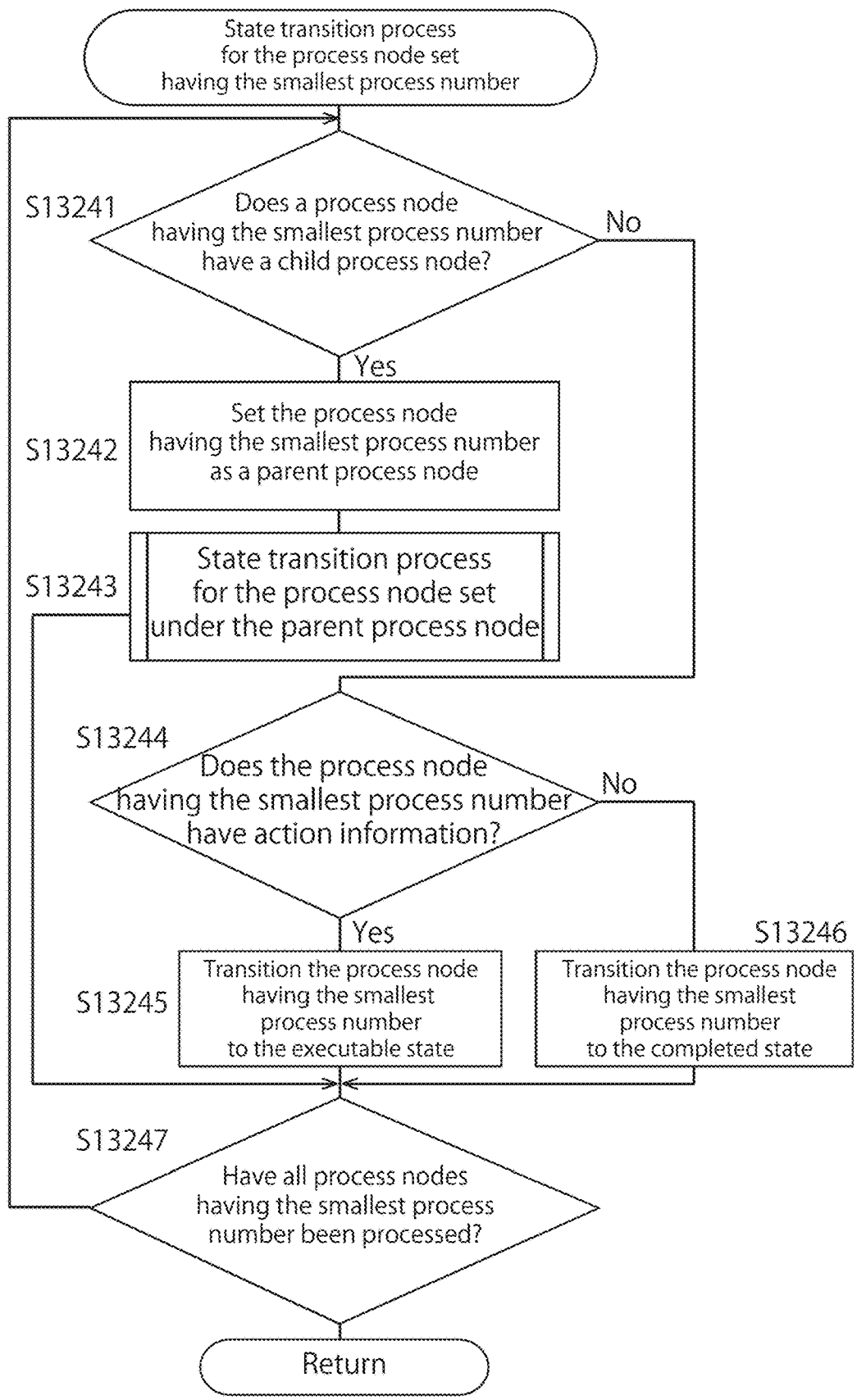
FIG. 14 is a flowchart illustrating the procedure of the state transition process for the process node set having the smallest process number executed in the process execution system shown in FIG. 1.
Figure 15:
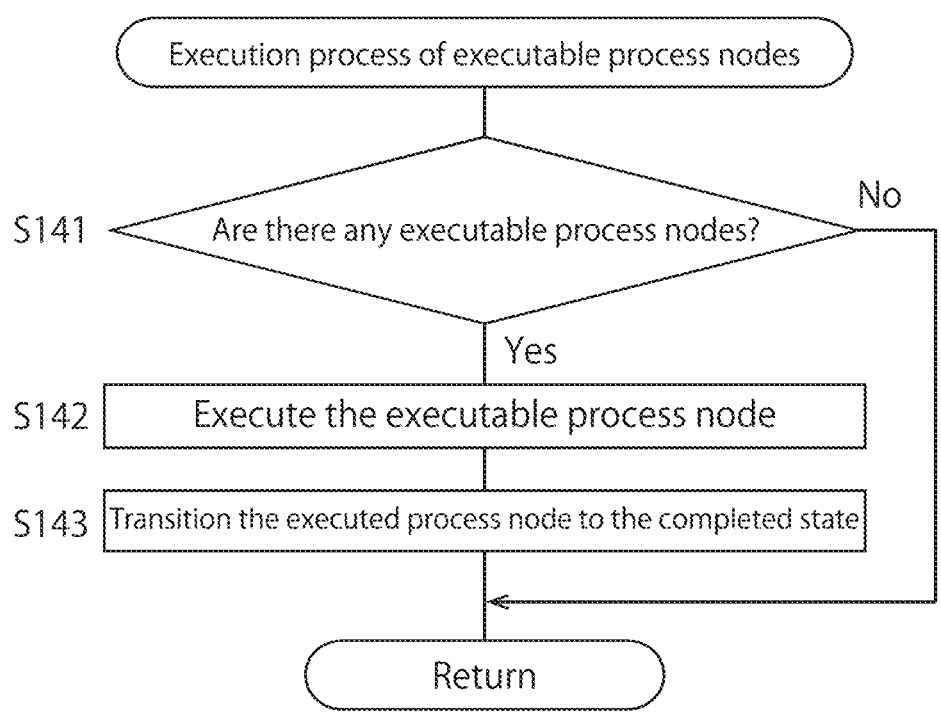
FIG. 15 is a flowchart illustrating the procedure of the execution process of executable process nodes executed in the process execution system shown in FIG. 1.

Subsequently, the operation of the process execution system 100 will be described with reference to FIGS. 11 to 15. FIG. 11 is a flowchart illustrating the procedure of the process executed in the process execution system 100. FIG. 12 is a flowchart illustrating the procedure of the state transition process for process nodes executed in the process execution system 100. FIG. 13 is a flowchart illustrating the procedure of the state transition process for a process node set under a parent process node executed in the process execution system 100. FIG. 14 is a flowchart illustrating the procedure of the state transition process for a process node set having the smallest process number executed in the process execution system 100. FIG. 15 is a flowchart illustrating the procedure of the execution process of executable process nodes executed in the process execution system 100. The processes shown in the flowcharts of FIGS. 11 to 15 are executed by the control unit 110 of the process execution system 100 in accordance with a program.

As shown in FIG. 11, the program executed by the control unit 110 of the process execution system 100 includes a step S11 of accepting an input of a process network model DM1, a step S12 of generating a process network D1, a step S13 of performing a state transition process for process nodes D10, a step S14 of performing an execution process of executable process nodes D10, and a step S15 of determining whether all process nodes D10 included in the process network D1 are in the completed state.

(Step S11)

The process network model input unit 151 accepts an input of a process network model DM1 that includes a plurality of process master nodes DM10 having process generation information DM15 used to generate process definition information D15 defining content of processes, and represents relationships between a plurality of process nodes D10 generated by the process master nodes DM10. The process network model input unit 151 may accept an input of context data when accepting the process network model DM1.

(Step S12)

The process network generation unit 150 generates a process network D1 that includes the plurality of process nodes D10 having the process definition information D15 from the process network model DM1 accepted as input by the process network model input unit 151.

(Step S13)

The process network state management unit 160 performs a state transition process for process nodes D10 based on a state of the process node D10 included in the process network D1 and predetermined process state transition rules Specifically, the process network state management unit 160 transitions the specific process node D10 to the executable state based on the state of the process node D10 included in the process network D1 and a predetermined process state transition rule. The process network state management unit 160 can be configured to transitions the specific process node D10 to the executable state on the combination of states of process nodes D10 included in the process network D1. The process network state management unit 160 can be configured to transition each process node D10 that has action information D153 within the process network D1 to the executable state at least once.

The process network state management unit 160 can be configured to transitions the specific process node D10 to the executable state according to the combination of the states of process nodes D10 belonging to different hierarchical levels included in the process network D1, in the case where the process network D1 is a hierarchical process network. The process network state management unit 160 can be configured such that, in the case where the process network D1 is a hierarchical process network, the process nodes D10 belonging to lower hierarchical levels can be transitioned to the executable state with higher priority than the process nodes D10 belonging to higher hierarchical levels. The process network state management unit 160 can be config-ured such that, in the case where the process network D1 is a hierarchical process network, the parent process node D10 of the child process node D10 becomes executable after the execution of the child process node D10 is completed.

(Step S14)

The process network execution unit 170 performs the execution process of executable process nodes D10 included in the process network D1.

(Step S15)

The process network execution unit 170 determines whether all process nodes D10 included in the process network D1 are in the completed state. If all process nodes D10 included in process network D1 are not in the completed state, return to step S13. If all process nodes D10 included in process network D1 are in the completed state, the process is terminated.

Referring to FIGS. 12 to 14, the state transition process for process nodes D10 performed in step S13 will be described.

Referring to FIG. 12, the state transition process for process nodes D10 performed in step S13 includes step S131 of setting the root process node D10 as a parent process node, and step S132 of performing the state transition process for the process node set under the parent process node.

Referring to FIG. 13, the state transition process for the process node set under the parent process node includes a step S1321 of extracting incomplete process nodes D10 among the child process nodes under the parent process node, a step S1322 of determining whether incomplete process nodes D10 exist, a step S1323 of extracting the process node set having the smallest process number D151 among the incomplete process nodes D10, a step S1324 of performing the state transition process for the process node set having the smallest process number D151, a step S1325 of determining whether the parent process node has action information D153, a step S1326 of transitioning the parent process node to the executable state, and a step S1327 of transitioning the parent process node to the completed state.

(Step S1321)

The process network state management unit 160 extracts incomplete process nodes D10 among the child process nodes under the parent process node. A child process node under a parent process node refers to a process node D10 that is a direct child of the parent process node D10, and does not include process nodes D10 that are children of the direct child process node D10 under the parent process node D10 (e.g., grandchild process nodes D10 under the parent process node D10).

(Step S1322)

The process network state management unit 160 determines whether there are any incomplete process nodes D10 extracted in step S1321. If incomplete process nodes D10 exist, proceed to step S1323. If there are no incomplete process nodes D10, proceed to step S1325.

(Step S1323)

The process network state management unit 160 extracts a process node set having the smallest process number D151 from the incomplete process nodes D10 extracted in step S1321. The process node set having the smallest process number D151 means a set composed of process nodes D10 having the smallest process number D151.

(Step S1324)

The process network state management unit 160 executes the state transition process for the process node set having the smallest process number D151 extracted in step S1323.

(Step S1325)

The process network state management unit 160 determines whether the parent process node has action information D153. If the parent process node has action information D153, proceed to step S1326. If there is no action information D153, proceed to step S1327.
(Step S1326)

The process network state management unit 160 transitions the parent process node to the executable state.
(Step S1327)

The process network state management unit 160 transitions the parent process node to the completed state.

Referring to FIG. 14, the state transition process for the process node set having the smallest process number D151 includes a step S13241 of determining whether a process node D10 having the smallest process number D151 has a child process node, a step S13242 of setting the process node D10 having the smallest process number D151 as a parent process node, a step S13243 of performing the state transition process for the process node set under the parent process node, a step S13244 of determining whether the process node D10 having the smallest process number D151 has action information D153, a step S13245 of transitioning the process node D10 having the smallest process number D151 to the executable state, a step S13246 of transitioning the process node D10 having the smallest process number D151 to the completed state, and a step S13247 of determining whether all process nodes D10 having the smallest process number D151 have been processed.
(Step S13241)

The process network state management unit 160 determines whether the process node D10 having the smallest process number D151 has a child process node. If the process node D10 having the smallest process number D151 has a child process node, proceed to step S13242. If the process node D10 having the smallest process number D151 does not have a child process node, proceed to step S13244.
(Step S13242)

The process network state management unit 160 sets the process node D10 having the smallest process number D151 as a new parent process node.
(Step S13243)

The process network state management unit 160 performs the state transition process for the process node set under the parent process node.
(Step S13244)

The process network state management unit 160 determines whether the process node D10 having the smallest process number D151 has action information D153. If there is action information D153, proceed to step S13245. If there is no action information D153, proceed to step S13246.
(Step S13245)

The process network state management unit 160 transitions the process node D10 having the smallest process number D151 to the executable state.
(Step S13246)

The process network state management unit 160 transitions the process node D10 having the smallest process number D151 to the completed state.
(Step S13247)

The process network state management unit 160 determines whether all process nodes D10 included in the process node set having the smallest process number D151 have been processed. If all process nodes D10 included in the process node set having the smallest process number D151 have not been processed, return to step S13241. When all process nodes D10 included in the process node set having the smallest process number D151 have been processed, the process is terminated.

Referring to FIG. 15, the execution process of executable process nodes D10 performed in step S14 includes step S141 of determining whether executable process nodes D10 exist, step S142 of executing the executable process node D10, and step S143 of transitioning the executed process node D10 to the completed state.
(Step S141)

The process network execution unit 170 determines whether the process node D10 is in the executable state. The determination of whether the process node D10 is in the executable state is made by examining the value of the process state D13 included in the process node D10.
(Step S142)

The process network execution unit 170 executes the process defined by the process definition information D15 by sending an action execution request to the action execution system 50 based on the information related to actions included in the process definition information D15 of the executable process node D10. Specifically, the process network execution unit 170 sends an action execution request to the action execution system 50 based on the content of the action item included in the process definition information D15 of the executable process node D10. The process network execution unit 170 may execute the action items in ascending order of action item numbers if the action information D153 includes a plurality of action items.
(Step S143)

The process network execution unit 170 transitions the process state D13 of the executed process node D10 to the completed state. The method to transition the process state D13 to the completed state is not particularly limited. For example, the process network execution unit 170 can change the process state D13 of the process node D10 in the process network D1 stored in the storage unit 120 to the completed state by requesting the storage unit 120 to set the process state D13 of the executed process node D10 to the completed state. Requests to the storage unit 120 can be made by sending SQL queries when the storage unit 120 functions as a database server.

Figures 16, 17:
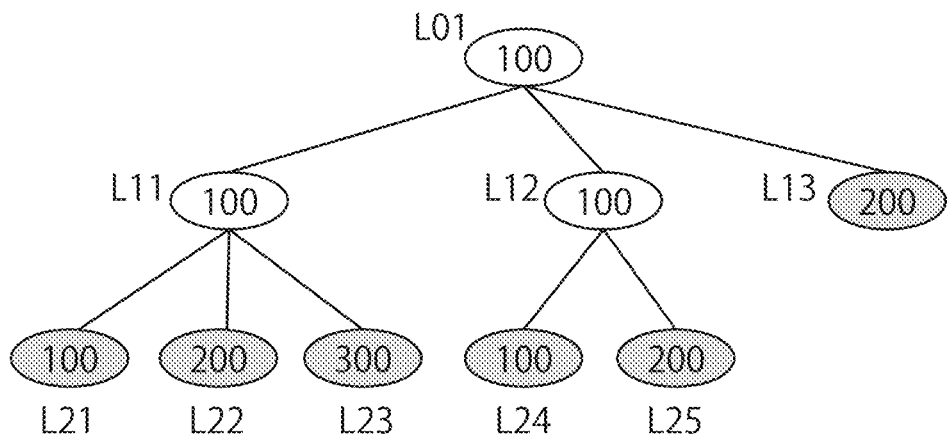
FIG. 16 is a schematic diagram showing a data structure of a process network used to explain an operation example of steps of performing state transition processes for process nodes executed in the process execution system shown in FIG. 1.
FIG. 17 is a diagram illustrating the state transition for process nodes used to explain an operation example of steps of performing the state transition process for process nodes executed in the process execution system shown in FIG. 1.

Referring to FIG. 16 and FIG. 17, an operation example of step S13 of performing the state transition process for process nodes D10 explained using FIG. 12 to FIG. 14, will be described.

FIG. 16 is a schematic diagram showing a data structure of process network D1 used to explain an operation example of step S13 of performing the state transition process for process nodes D10 executed in process execution system 100. In the process network D1 shown in FIG. 16, the root process node L01 has the process nodes L11, L12, and L13 as child process nodes. Process node L11 has process nodes L21, L22, and L23 as child process nodes. Process node L12 has process nodes L24 and L25 as child process nodes. Among the process nodes included in the process network D1 shown in FIG. 20, the process nodes L21, L22, L23, L24, L25, and L13, which are colored in gray, have action information D153, while the process nodes L01, L11, and L12, which are not colored in gray, do not have action information D153. The numbers within each node represent the process number.

FIG. 17 is a diagram illustrating the state transition for process nodes used to explain an operation example of step S13 performing the state transition process for process nodes D10 executed in the process execution system 100. The state transition process for process nodes D10 by the process network state management unit 160 is repeatedly applied until all process nodes D10 included in a process network D1 are in the completed state (see FIG. 11). FIG. 17 shows how the state of process node D10 transitions by performing the state transition process. In the following description, between the execution of one state transition process and the next state transition process, the process node D10, which has become the executable state in the one state transition process, is presumed to be executed by the process network execution unit 170 and be in the completed state.

Referring to FIG. 12, first, in step S131, the root process node L01 is set to the parent process node. Subsequently, in step S132, a state transition process is executed for the process node set under the parent process node L01.

Referring to FIG. 13, in the state transition process for the process node set under the parent process node L01, in step S1321, the incomplete process nodes L11, L12, and L13 among the child process nodes L11, L12, and L13 of the parent process node L01 are extracted. Since the incomplete child process nodes L11, L12, and L13 were extracted in step S1321, the determination in step S1322 is Yes. Subsequently, in step S1323, a process node set {L11, L12} having the smallest process number 100 is extracted from the incomplete process nodes L11, L12, and L13. In step S1324, a state transition process is executed for the process node set {L11, L12} having the smallest process number 100.

Referring to FIG. 14, the state transition process for the process node set {L11, L12} having the smallest process number 100 is performed for each of the process nodes L11 and L12 included in the process node set {L11, L12} having the smallest process number 100.

First, the state transition process for the process node set under process node L11 will be described. Process node L11 has child process nodes L21, L22, and L23, so the determination in step S13241 is Yes, and proceed to step S13242. In step S13242, set the process node L11 as the new parent process node. In step S13243, a state transition process is executed for the process node set under the parent process node L11. Referring to FIG. 13, in the state transition process for the process node set under the parent process node L11, in step S1321, the incomplete process nodes L21, L22, and L23 are extracted from the child process nodes under the parent process node L11. Since there are incomplete process nodes L21, L22, and L23, the determination in step S1322 becomes Yes, and proceed to step S1323. In step S1323, from the incomplete child process nodes L21, L22, and L23, a process node set {L21} having the smallest process number 100 is extracted. In step S1324, a state transition process is executed for the process node set {L21} having the smallest process number 100. Referring to FIG. 14, in the state transition process for the process node set {L21} having the smallest process number 100, since the process node L21 does not have any child process nodes, the determination in step S13241 is No, and the process proceeds to step S13244. Since the process node L21 has action information D153, the determination in step S13244 is Yes, and proceed to step S13245. In step S13245, the process node L21 is transitioned to the executable state, and the state transition process for the process node set under the process node L11 is completed.

The state transition process for the process node set under the process node L12 is similarly performed, and the process is completed by transitioning the process node L24 to the executable state.

Referring to FIG. 14, upon completing the state transition process for the process node set under process node L11 and the state transition process for the process node set under process node L12, the determination in S13247 becomes Yes, and the state transition process for the process node set {L11, L12} having the smallest process number 100 is completed. According to this, the first state transition process is completed.

Subsequently, when the second state transition process is performed, the process is executed in the same manner as the first state transition process, and process node L22 and process node L25 transition to the executable state.

Subsequently, when the third state transition process is performed, the process proceeds in the order of steps S131 and S132 in FIG. 12, and steps S1321, S1322, and S1323 in FIG. 13. In step S1323, extract the process node set {L11, L12} having the smallest process number 100, and proceed to step S1324. In step S1324, a state transition process is executed for the process node set {L11, L12} having the smallest process number 100.

Referring to FIG. 14, in the state transition process for the process node set under process node L11, the process proceeds in the order of steps S13241, S13242, and S13243. In step S13243, a state transition process is executed for the process node set under the parent process node L11. Referring to FIG. 13, in the state transition process for the process node set under the parent process node L11, the process proceeds in the order of S1321, S1322, S1323, and S1324. In step S1324, a state transition process is executed for the process node set {L23} having the smallest process number 300. Referring to FIG. 14, in the state transition process for the process node set {L23} having the smallest process number 300, the process proceeds in the order of steps S13241, S13244, and S13245, and the process is completed by transitioning the process node L23 to the executable state.

Referring to FIG. 14, in the state transition process for the process node set under process node L12, the process proceeds in the order of S13241, S13242, and S13243. In step S13243, a state transition process is executed for the process node set under the parent process node L12. Referring to FIG. 13, in the state transition process for the process node set under the parent process node L12, the process proceeds in the order of steps S1321, S1322, S1325, and S1327, and the process is completed by transitioning the process node L12 to the completed state.

Subsequently, when the fourth state transition process is performed, the process proceeds in the order of Step S131 and S132 in FIG. 12, and Step S1321, S1322, and S1323 in FIG. 13. In step S1323, a process node set {L11} having the smallest process number 100 is extracted, and in step S1324, a state transition process is executed for the process node set {L11} having the smallest process number 100. Referring to FIG. 14, in the state transition process for process node L11 having the smallest process number 100, the process proceeds in the order of steps S13241, S13242, and S13243. In step S13243, a state transition process is executed for the process node set under the parent process node L11. Referring to FIG. 13, in the state transition process for the process node set under the parent process node L11, the process proceeds in the order of steps S1321, S1322, S1325, and S1327, and the process is completed by transitioning the process node L11 to the completed state.

Subsequently, when the fifth state transition process is performed, the process proceeds in the order of Step S131 and S132 in FIG. 12, and Step S1321, S1322, and S1323 in FIG. 13. In step S1323, the process node set {L13} having the smallest process number 200 is extracted, and the process proceeds to step S1324. In step S1324, a state transition process is executed for the process node set {L13} having the smallest process number 200. Referring to FIG.

14, in the state transition process for the process node L13 having the smallest process number 200, the process proceeds in the order of steps S13241, S13244, and S13245, and the process is completed by transitioning the process node L13 to the executable state.

Subsequently, when the sixth state transition process is performed, the process proceeds in the order of Step S131 and S132 in FIG. 12, and Step S1321, S1322, S1325, and S1327 in FIG. 13. In step S1327, the process is completed by transitioning the parent process node L01 (the root process node) to the executable state. According to this, the states of all process nodes D10 included in the process network D1 become the completed state.

Effects

The process execution system 100 according to the present embodiment comprises a process network generation unit 150 configured to generate a process network D1 from a process network model DM1, wherein the process network model DM1 includes a plurality of process master nodes DM10 having process generation information DM15 used to generate process definition information D15 defining content of processes, and represents relationships between a plurality of process nodes D10 generated by the process master nodes DM10, and wherein the process network D1 includes the plurality of process nodes D10 having the process definition information D15, a process network state management unit 160 configured to, based on a state of the process node D10 included in the process network D1 and predetermined process state transition rules, make a specific process node D10 executable, and a process network execution unit 170 configured to execute a process defined by the process definition information D15 associated with the executable process node D10 included in the process network D1, wherein the process network generation unit 150 is configured to include a process network model input unit 151 configured to accept an input of the process network model DM1, the process network generation unit 150 being configured to generate the process network D1 from the process network model DM1 accepted as input by the process network model input unit 151, wherein the process definition information D15 includes information D153 related to actions necessary to execute the process defined by the process definition information D15, and wherein the process network execution unit 170 is configured to execute the process defined by the process definition information D15 of the executable process node D10 by sending an execution request for an action, based on the information D153 related to actions included in the process definition information D15, to an action execution system 50 that executes predetermined actions upon request.

According to this, the process execution system 100 according to the present embodiment functions as an execution environment for the process network model DM1, and by changing the process network model DM1, it is possible to also change the execution results, thereby allowing flexible adaptation to changes in business operations.

Additionally, the actions necessary for the execution of the process are performed by an action execution system 50, which is independent of the process execution system 100. As a result, the substantive content of the actions required for process execution only needs to be defined on the action execution system 50 side, while the process network model DM1 only needs to define the method of action execution requests to the action execution system 50. Therefore, it becomes easier for the business personnel themselves to create or modify the process network model DM1, allowing for more flexible adaptation to changes in business content and the like.

Additionally, by defining the substantive content of the actions required for process execution on the action execution system 50 side, it becomes easier to reuse similar actions across different operations. That is, by reusing the actions used in a process network model representing one operation, similar other operations can be quickly represented and executed by the process network model. Therefore, according to the process execution system 100 of the present embodiment, it becomes easier to quickly adapt to various operations.

Furthermore, since the business processes that constitute the operations are represented as process network model DM1, the relationships between the processes are easy to understand. According to this, it becomes easier to prevent the execution results or changes of some processes from unexpectedly affecting other processes. Furthermore, since the process network model DM1 is separated from its execution environment (process execution system 100), by referring to the process network model DM1, it becomes easier to evaluate the content of the business operations executed based on the process network model DM1. As a result, it becomes easier to conduct stable business operations.

Accordingly, according to the process execution system 100 of the present embodiment, by achieving a balance between plasticity and stability, it becomes possible to provide a process execution system 100 with high adaptability to rapidly changing business environments.

In the process execution system 100 according to the present embodiment, the process network model input unit 151 is configured to accept an input of a hierarchical process network model DM1 representing hierarchical relationships between process nodes D10 generated by process master nodes DM10, and the process network generation unit 150 is configured to generate a hierarchical process network D1 corresponding to the hierarchical process network model DM1 accepted as input by the process network model input unit 151.

According to the process execution system 100 of the present embodiment, the process network model DM1 is represented hierarchically. According to this, the impact of some changes in process network model DM1 can be localized, and the impact on other parts of process network model DM1 can be minimized. Therefore, it becomes easier to modify the process network model DM1 while ensuring stability. Furthermore, by representing the process network model DM1 hierarchically, it becomes even easier to understand the relationships between processes, thereby further enhancing the stability of business operations. According to the present embodiment, it becomes even easier to provide the process execution system 100 with high adaptability to rapidly changing business environments by achieving a balance between plasticity and stability.

Second Embodiment

The process execution system 200 according to the second embodiment, in summary, differs from the process execution system 100 according to the first embodiment in that the process network state management unit accepts a process state change request for changing the state of a specific process node, the process master node has an asynchronous flag master and an auto-start flag master, and the process node has an asynchronous flag and an auto-start flag. According to the second embodiment of the process execution system 200, the execution of business processes including asynchronous processing becomes easier.

Asynchronous processing refers to a process where, for example, an inquiry is made to a customer, and a specific process is executed when a response to the inquiry is received. During the waiting time from making an inquiry to the customer until receiving a response, it is preferable that the process execution system 200 is configured to execute another executable process node. According to the second embodiment of the process execution system 200, the execution of business processes including such asynchronous processing becomes easier. The process execution system 200 according to the second embodiment can be configured similarly to the process execution system 100 according to the first embodiment, except for the configuration specifically described below.

Figure 18:
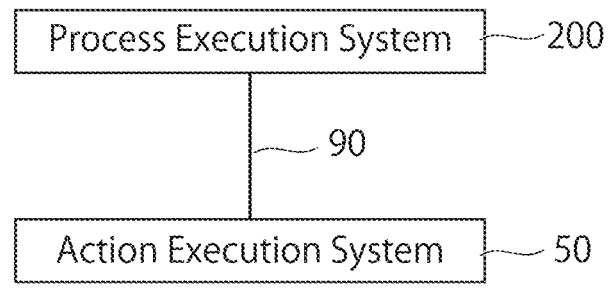
FIG. 18 is a diagram showing the configuration of a process execution system according to the second embodiment of the present invention and an action execution system that communicates with the process execution system.
Figure 19:
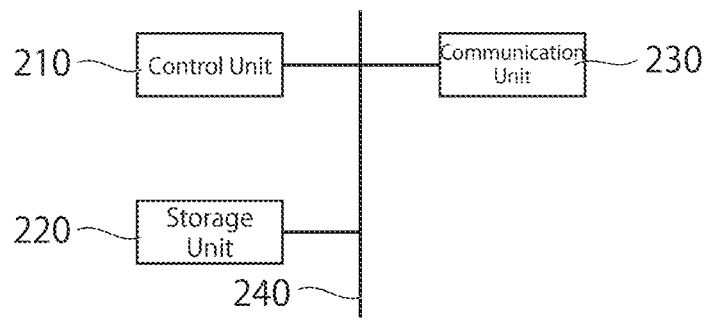
FIG. 19 is a block diagram of the process execution system shown in FIG. 18.
Figure 20:
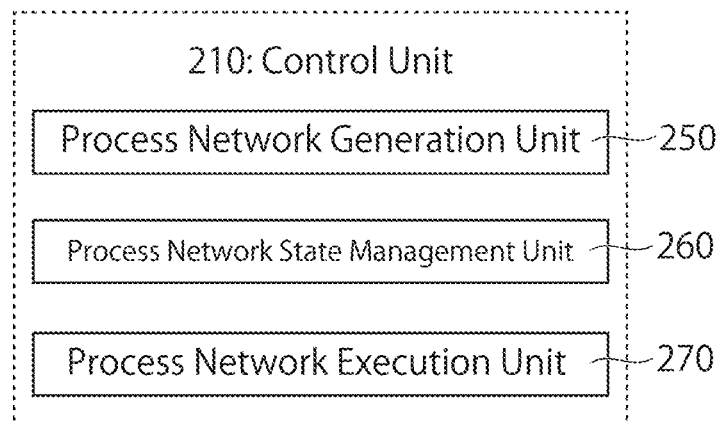
FIG. 20 is a functional block diagram of the control unit of the process execution system shown in FIG. 18.
Figure 21:
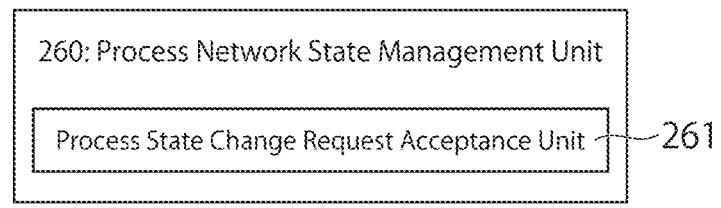
FIG. 21 is a functional block diagram of the process network state management unit of the process execution system shown in FIG. 18.
Figure 22:
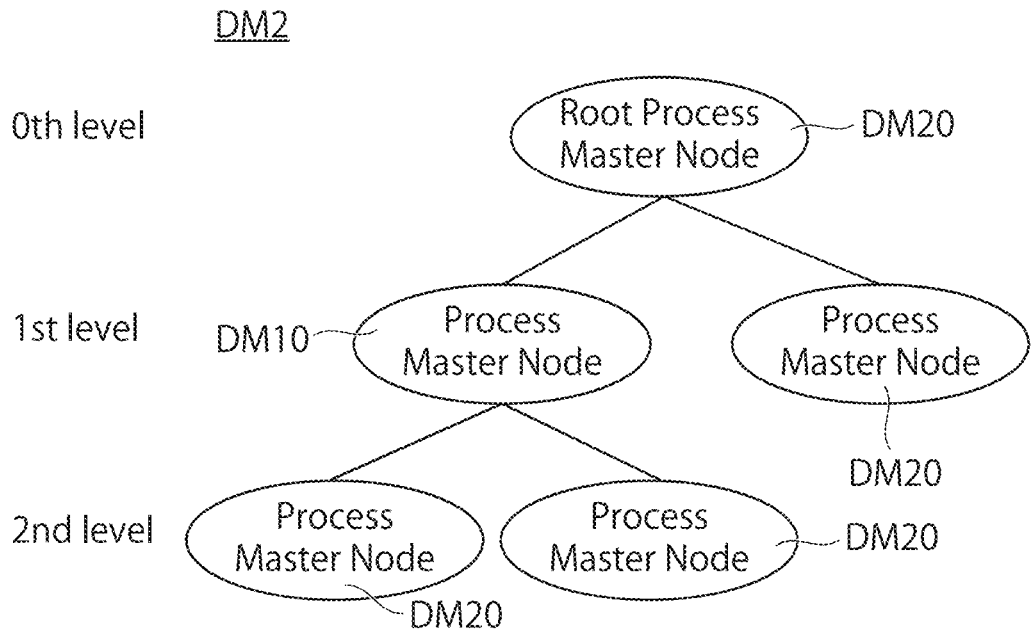
FIG. 22 is a schematic diagram illustrating a data structure of a process network model accepted as input by the process network model input unit of the process execution system shown in FIG. 18.
Figure 23:
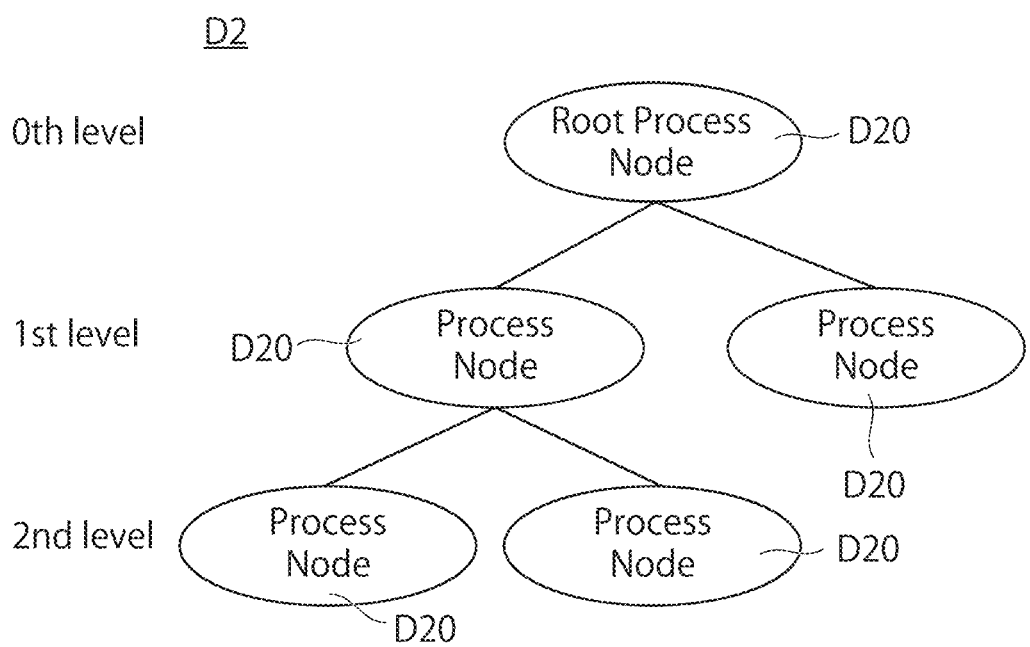
FIG. 23 is a schematic diagram illustrating a data structure of a process network generated by the process network generation unit of the process execution system shown in FIG. 18.

FIG. 18 is a diagram showing the configuration of a process execution system 200 according to the second embodiment of the present invention and an action execution system 50 that communicates with the process execution system 200. FIG. 19 is a block diagram of the process execution system. FIG. 20 is a functional block diagram of the control unit 210 of the process execution system 200. FIG. 21 is a functional block diagram of the process network state management unit 260 of the process execution system 200. FIG. 22 is a schematic diagram illustrating a data structure of a process network model DM2 accepted as input by the process network model input unit 151 of the process execution system 200. FIG. 23 is a schematic diagram illustrating a data structure of a process network D2 generated by the process network generation unit 250 of the process execution system 200. FIG. 24 is a schematic diagram illustrating a data structure of a process master node DM20 of a process network model DM2 accepted as input by the process network model input unit 151 of the process execution system 200. FIG. 25 is a schematic diagram illustrating a data structure of a process node D20 in a process network D2 generated by the process network generation unit 250 of the process execution system 200. The process execution system 200 according to the second embodiment will be described below.

As shown in FIG. 18, the process execution system 200 according to the present embodiment transmits and receives information via communication means 90 with the action execution system 50. The action execution system 50 is configured similarly to the action execution system 50 described in the first embodiment. The communication means 90 is configured similarly to the communication means 90 described in the first embodiment.

As shown in FIG. 19, the process execution system 200 according to the present embodiment includes a control unit 210, a storage unit 220, and a communication unit 230. These components are connected to each other via the bus 240. The storage unit 220 is configured similarly to the storage unit 120 of the process execution system 100 according to the first embodiment. The communication unit 230 is configured similarly to the communication unit 130 of the process execution system 100 according to the first embodiment. The bus 240 is configured similarly to the bus 140 of the process execution system 100 according to the first embodiment.

As shown in FIG. 20, the control unit 210 functions as a process network generation unit 250, a process network state management unit 260, and a process network execution unit 270. The process network generation unit 250 is configured similarly to the process network generation unit 150 of the process execution system 100 according to the first embodiment. The process network execution unit 270 is configured similarly to the process network execution unit 170 of the process execution system 100 according to the first embodiment.

As shown in FIG. 21, the process network state management unit 260 includes a process state change request acceptance unit 261.

The process state change request acceptance unit 261 accepts a process state change request for changing the state of a specific process node D20. The process network state management unit 260 changes the state of the specific process node D20 included in the process network D1 based on the process state change request accepted as input by the process state change request acceptance unit 261. The process node D20, which is the target for the process state change request accepted as input by the process state change request acceptance unit 261, can be randomly selected by the sender of the process state change request. "Random" in "randomly selectable" means that a causal relationship with the internal state of the process execution system 200 cannot be identified. That is, "randomly selectable" means that, from the perspective of the process state change request acceptance unit 261, the timing at which the process state change request is made and the process node D20 for which the process state change request is made cannot be predicted. The process node D20, for which the process state change request acceptance unit 261 accepts a process state change request, may be a process node D20 that has never transitioned to the executable state.

The process state change request acceptance unit 261 is configured to accept process state change requests from systems external to the process execution system 200. The process state change request acceptance unit 261 may be configured to have an API for accepting process state change requests, or may be configured to have a GUI for accepting process state change requests. An API that accepts process state change requests can be configured to accept process state change requests through communication using, for example, HTTP. Additionally, the GUI that accepts process state change requests can be configured to accept process state change requests through operations from a browser, for example.

As shown in FIG. 22, the process network model DM2 according to the present embodiment includes a plurality of process master nodes DM20 and represents the relationships between the process master nodes DM20. Preferably, the process network model DM2 is a hierarchical process network model DM1 representing hierarchical relationships between process master nodes DM20. The process network model DM2 is configured similarly to the process network model DM1 according to the first embodiment, except for the points specifically described below.

As shown in FIG. 23, the process network D2 according to the present embodiment includes a plurality of process nodes D20 and represents the relationships between the process nodes D20. Preferably, the process network D2 is a hierarchical process network D1 representing hierarchical relationships between process nodes D20. The process network D2 is configured similarly to the process network D1 according to the first embodiment, except for the points specifically described below.

Referring to FIG. 24, the process master node DM20 has a process master node identifier DM21, a parent process master node identifier DM22, and process generation information DM25. The process master node identifier DM21 can be configured similarly to the process master node identifier DM11 according to the first embodiment. The parent process master node identifier DM22 can be configured similarly to the parent process master node identifier DM12 according to the first embodiment.

Referring to FIG. 25, the process node D20 has a process node identifier D21, a parent process node identifier D22, a process state D23, and process definition information D25. The process node identifier D21 can be configured similarly to the process node identifier D11 according to the first embodiment. The parent process node identifier D22 can be configured similarly to the parent process node identifier D12 according to the first embodiment.

The process generation information DM25 includes a process number master DM251, a process name master DM252, an action information master DM253, an asynchronous flag master DM254, and an auto-start flag master DM255. The process number master DM251 can be configured similarly to the process number master DM151 according to the first embodiment. The process name master DM252 can be configured similarly to the process name master DM152 according to the first embodiment. The action information master DM253 can be configured similarly to the action information master DM153 according to the first embodiment.

The process definition information D25 includes a process number D251, a process name D252, action information D253, an asynchronous flag D254, and an auto-start flag D255. Process number D251 can be configured similarly to process number D151 according to the first embodiment. Process name D252 can be configured similarly to process name D152 according to the first embodiment. Action information D253 can be configured similarly to action information D153 according to the first embodiment.

The value of the asynchronous flag master DM254 and the value of the asynchronous flag D254 are, for example, Boolean values. The process network generation unit 250 can be configured such that, when the value of the asynchronous flag master DM254 is B (True or False), the value of the asynchronous flag of the process node D20 generated in the process network generation unit 250 becomes B.

The values of auto-start flag master DM255 and auto-start flag D255 are, for example, Boolean values. The process network generation unit 250 can be configured such that when the value of the auto-start flag master DM255 is B (a Boolean value of True or False), the value of the auto-start flag D255 of the process node D20 generated by the process network generation unit 250 becomes B.

Figure 26:
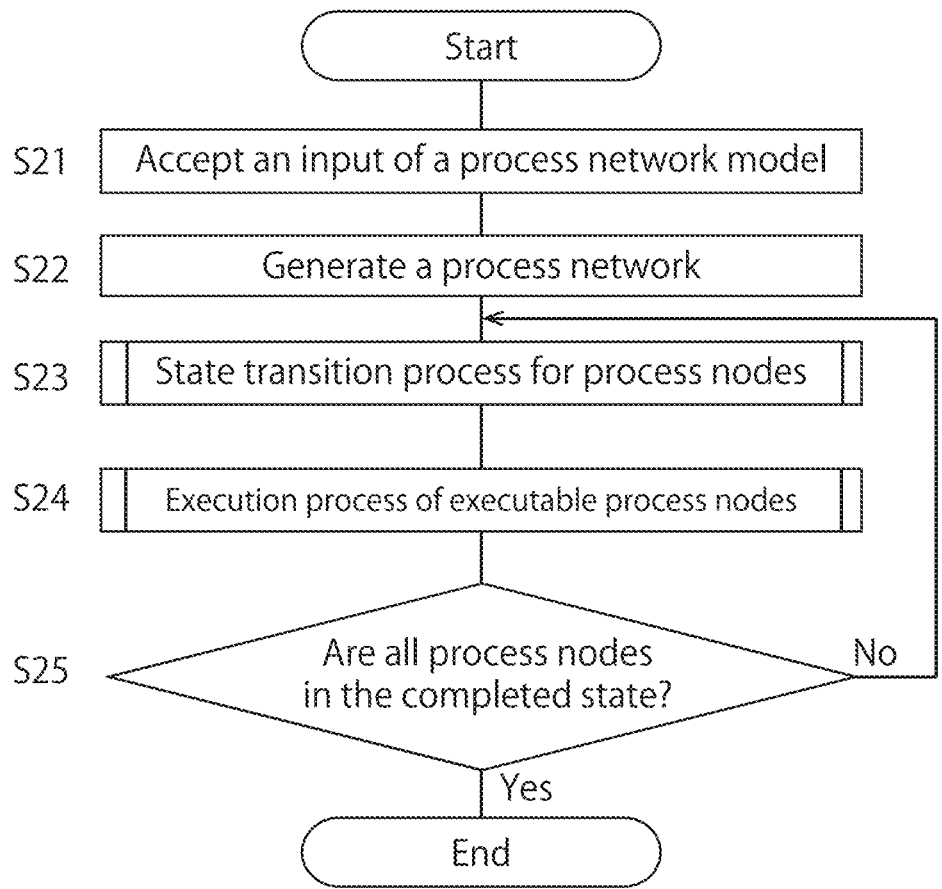
FIG. 26 is a flowchart illustrating the procedure of the process executed in the process execution system shown in FIG. 18.
Figure 27:
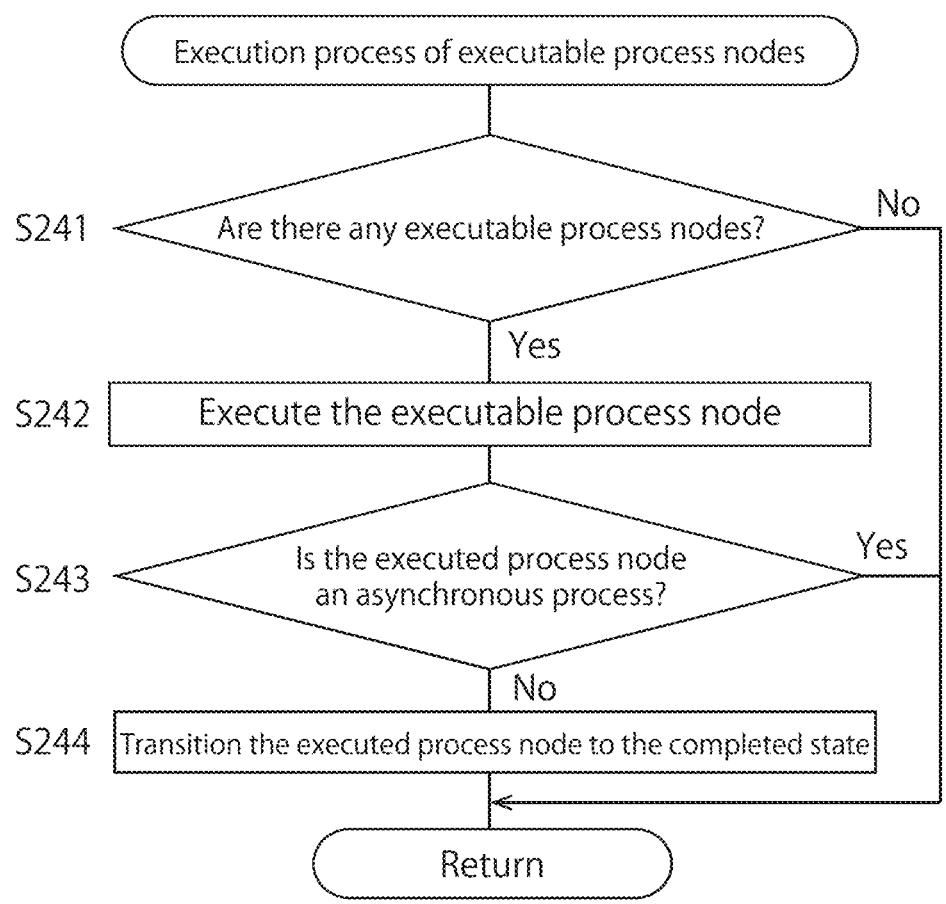
FIG. 27 is a flowchart illustrating the procedure of the execution process of executable process nodes executed in the process execution system shown in FIG. 18.

Subsequently, the operation of process execution system 200 according to the present embodiment will be described with reference to FIG. 26 and FIG. 27. FIG. 26 is a flowchart illustrating the procedure of the process executed in the process execution system 200. FIG. 27 is a flowchart illustrating the procedure of the execution process of executable process nodes D20 executed in the process execution system 200. The process shown in the flowcharts of FIG. 26 and FIG. 27 is executed by the control unit 210 of the process execution system 200 in accordance with a program.

As shown in FIG. 26, the program executed by the control unit 210 of the process execution system 200 includes a step S21 of accepting an input of a process network model DM2, a step S22 of generating a process network D2, a step S23 of performing a state transition process for process nodes D20, a step S24 of performing the execution process of executable process nodes D20, and a step S25 of determining whether all process nodes D20 included in the process network D2 are in the completed state. Step S21 of accepting an input of a process network model DM2, can be configured similarly to step S11, which accepts an input of a process network model DM1, according to the first embodiment. The step S22 of generating a process network D1 can be configured similarly to the step S12, generates a process network D1, according to the first embodiment. Step S25 of determining whether all process nodes D20 included in process network D2 are in the completed state, can be configured similarly to step S15, which determines whether all process nodes D10 included in process network D1 are in the completed state, according to the first embodiment.

(Step S23)

Step S23 of performing a state transition process for process nodes D20 is configured similarly to step S13 of performing a state transition process for process nodes D10 in the first embodiment of the process execution system 100, except for the following points. That is, the process network state management unit 260, in step S1326 (see FIG. 13) and step S13245 (see FIG. 14), transitions the process node D20 to the executable state if the process node D20 is an auto-start process, and does not transition the process state D23 of the process node D20 if the process node D20 is not an auto-start process. The determination of whether the process node D20 is an auto-start process is based on the value of the auto-start flag D255 of the process node D20. For example, the process network state management unit 260 determines that the process node D20 is an auto-start process if the value of the auto-start flag is True, and determines that it is not an auto-start process if the value of the auto-start flag is False.

(Step S24)

As shown in FIG. 27, the execution process of executable process nodes D20 performed in step S24 includes a step S241 of determining whether executable process nodes D20 exist, a step S242 of executing the executable process nodes D20, a step S243 of determining whether the executed process node D20 is an asynchronous process, and a step S244 of transitioning the state of the executed process node D20 to the completed state. Step S241 of determining whether executable process nodes D20 exist can be configured similarly to step S141 for determining whether executable process nodes D10 exist according to the first embodiment. Step S242 of executing the executable process nodes D20 can be configured similarly to step S142 of executing the executable process nodes D10 according to the first embodiment.

(Step S243)

The process network execution unit 270 determines whether the executed process node D20 is an asynchronous process. If the executed process node D20 is determined to be an asynchronous process, the process is terminated. If it is determined that the executed process node D20 is not an asynchronous process, proceed to step S244. The process network execution unit 270 determines whether the executed process node D20 is an asynchronous process based on the value of the asynchronous flag of the executed process node D20. Specifically, the process network execution unit 270 determines that it is an asynchronous process when the value of the asynchronous flag of the executed process node D20 is True, and determines that it is not an asynchronous process when the value of the asynchronous flag of the executed process node D20 is False. The process network execution unit 270 may be configured to transition the process state D23 to the waiting state if the executed process node D20 is an asynchronous process.

(Step S244)

The process network execution unit 270 transitions the process state D23 of the executed process node D20 to the completed state. The method to transition the process state D23 to the completed state is not particularly limited, for example, it may be a method of sending a request to the storage unit 220 as described in step S143 of the first embodiment. Additionally, the process network execution unit 270 may send a process state change request to the process network state management unit 260 to transition the process state D23 of the executed process node D20 to the completed state.

Effects

In the process execution system 200 according to the present embodiment, the process network state management unit 260 is configured to include a process state change request acceptance unit 261 configured to accept a process state change request for changing a state of a specific process node D20 and to change the state of the specific process node D20 included in the process network D1 based on the process state change requests accepted by the process state change request acceptance unit 261.

According to this, the process network model DM2 executed by the process execution system 200 according to the present embodiment becomes easier to represent business processes including asynchronous processes. Therefore, it becomes easier to modify the process network Model DM2 in response to changes in business operations, and the maintainability of the process network Model DM2 is also improved. Accordingly, according to the present embodiment, it becomes further easier to provide a process execution system 200 with high adaptability to rapidly changing business environments by achieving a balance between plasticity and stability.

Third Embodiment

The process execution system 300 according to the third embodiment differs from the process execution system 200 according to the second embodiment in that the control unit 310 further includes a transcription unit 380. According to the process execution system 300 of the third embodiment, the content of the process to be executed can be changed in response to changes in environment E, thereby further improving adaptability to rapidly changing business environments. The process execution system 300 according to the third embodiment can be configured similarly to the process execution system 200 according to the second embodiment, except for the configuration specifically described below.

Figure 28:
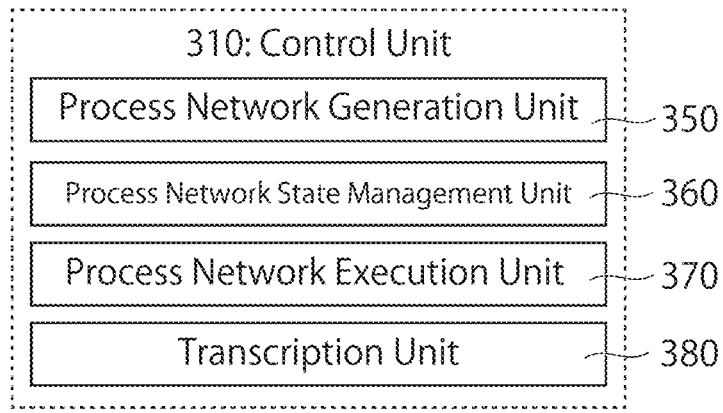
FIG. 28 is a functional block diagram of the control unit of the process execution system according to the third embodiment of the present invention.
Figure 29:
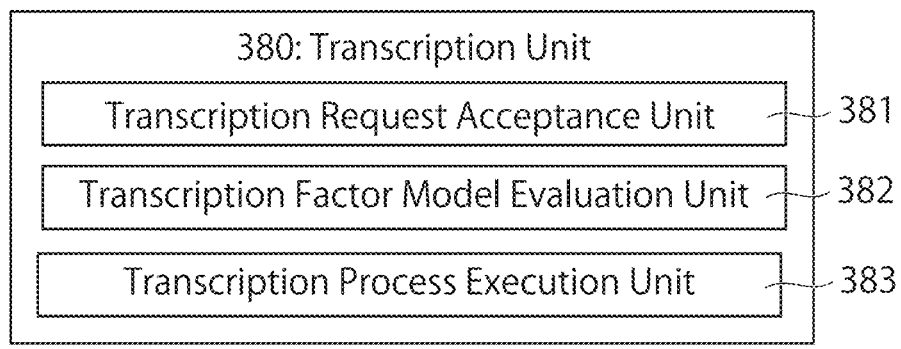
FIG. 29 is a functional block diagram of the transcription unit of the process execution system according to the third embodiment of the present invention.
Figure 30:
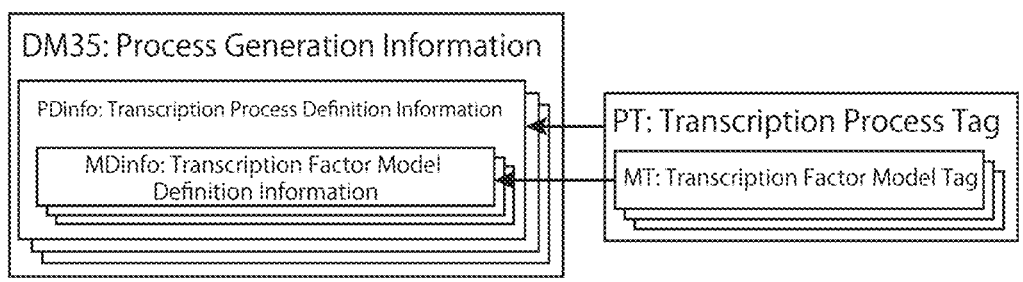
FIG. 30 is a conceptual diagram showing a process generation information of the process execution system according to the third embodiment of the present invention.
Figure 31:
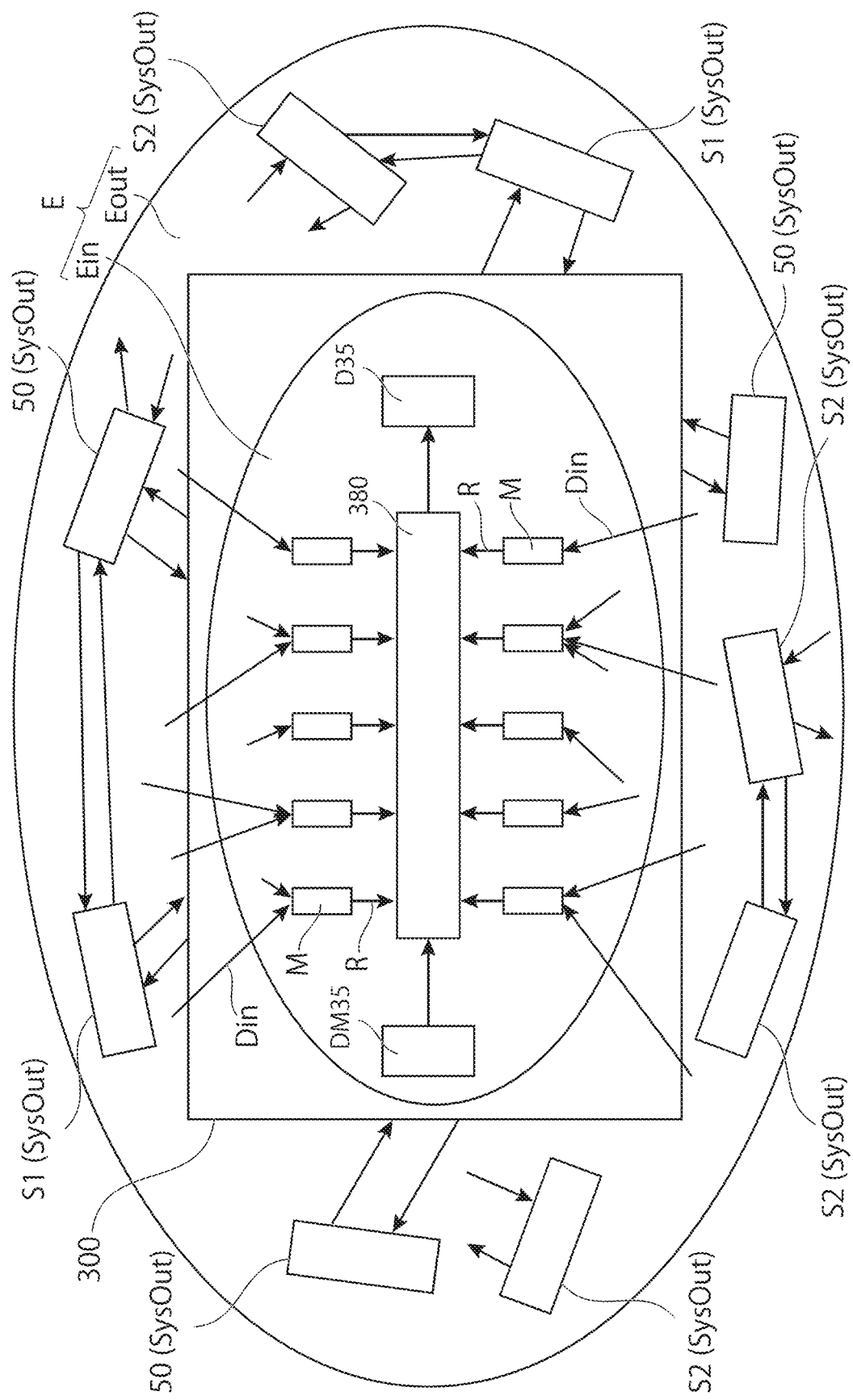
FIG. 31 is a conceptual diagram showing an interaction between the process execution system according to the third embodiment of the present invention and an environment.
Figures 32, 33, 34:
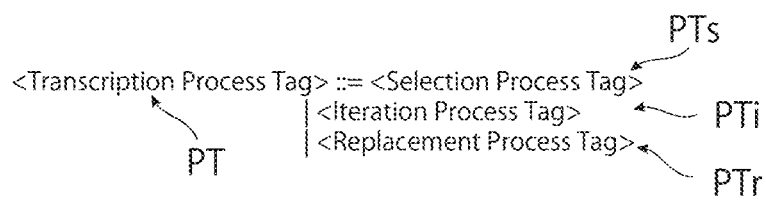
FIG. 32 is a schematic diagram illustrating a data structure of a case data table referenced by the process execution system according to the third embodiment of the present invention.
FIG. 33 is a schematic diagram illustrating a data structure of context data stored by the process network model input unit of the process execution system according to the third embodiment of the present invention.
FIG. 34 is a diagram illustrating the syntax of the transcription process tag in the process execution system according to the third embodiment of the present invention.
Figure 40:
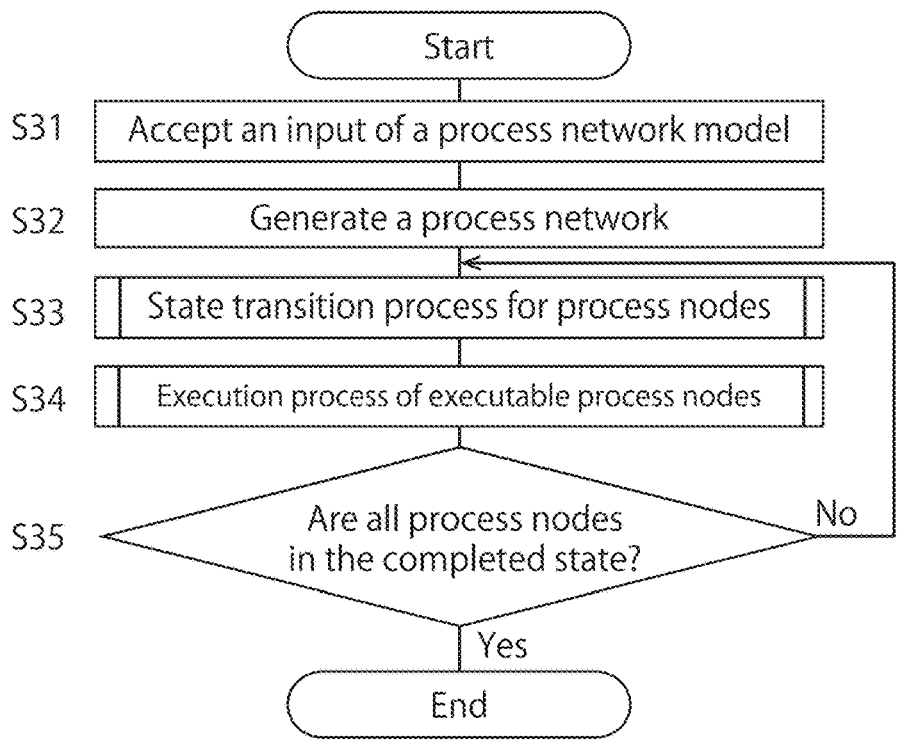
FIG. 40 is a flowchart illustrating the procedure of the process executed in the process execution system according to the third embodiment of the present invention.

FIG. 28 is a functional block diagram of the control unit 310 of the process execution system 300 according to the third embodiment of the present invention. FIG. 29 is a functional block diagram of the transcription unit 380 of the process execution system 300 according to the third embodiment of the present invention. FIG. 30 is a conceptual diagram showing the process generation information DM35 of the process execution system 300 according to the third embodiment of the present invention. FIG. 31 is a conceptual diagram showing an interaction between the process execution system 300 according to the third embodiment of the present invention and the environment. FIG. 32 is a schematic diagram illustrating a data structure of a case data table CDT referenced by the process execution system 300 according to the third embodiment of the present invention. FIG. 33 is a schematic diagram illustrating a data structure of context data CxD stored by the process network model input unit 351 of the process execution system 300 according to the third embodiment of the present invention. FIG. 34 is a diagram illustrating the syntax of a transcription process tag PT in the process execution system 300 according to the third embodiment of the present invention. FIG. 35 is a diagram illustrating the syntax of a selection process tag PT of the process execution system 300 according to the third embodiment of the present invention. FIG. 36 is a diagram illustrating the syntax of an iteration process tag PTi in the process execution system 300 according to the third embodiment of the present invention. FIG. 37 is a diagram illustrating the syntax of a replacement process tag PTr in the process execution system 300 according to the third embodiment of the present invention. FIG. 38 is a diagram illustrating the syntax of a transcription factor model tag MT of the process execution system 300 according to the third embodiment of the present invention. FIG. 39 is a diagram illustrating output data Dout of a transcription factor model M of the process execution system 300 according to the third embodiment of the present invention. The process execution system 300 according to the third embodiment will be described below.

Referring to FIGS. 28 to 31, the process execution system 300 according to the present embodiment further includes a transcription unit 380 configured to execute a transcription process for transcribing the process generation information DM35 associated with one process master node DM30 into one process node D30 corresponding to the one process master node DM30 as the process definition information D35.

Process generation information DM35 includes at least one piece of transcription process definition information PDinfo defining the transcription process. Specifically, the process generation information DM35 includes at least one piece of transcription process definition information PDinfo defining the transcription process for transcribing the process generation information DM35 as process definition information D35 into the process node D30 corresponding to the process master node DM30 having the process generation information DM35. The transcription process definition information PDinfo includes at least one piece of transcription factor model definition information MDinfo defining a transcription factor model M, the transcription factor model M modeling an influence of an environment E with which the process execution system is communicable on the transcription process.

The transcription unit 380 includes a transcription request acceptance unit 381 configured to accept an execution request for the transcription process, a transcription factor model evaluation unit 382 configured to evaluate the transcription factor model M defined by the transcription factor model definition information MDinfo, and a transcription process execution unit 383 configured to execute the transcription process defined by the transcription process definition information PDinfo.

The environment E with which the process execution system 300 is communicable includes an internal environment Ein, with which the process execution system 300 can communicate exclusively, and an external environment Eout, with which an external system SysOut, as seen from the process execution system 300, can communicate.

The external system SysOut includes an action execution system 50. The external system SysOut includes a system S1, which is a system other than the action execution system 50 and communicates with the process execution system 300. The external system SysOut includes a system S2 that does not directly communicate with the process execution system 300. A system that does not communicate directly with the process execution system 300 refers to a system for which a causal relationship with signals sent from the process execution system 300 cannot be identified.

The internal environment Ein includes the storage unit 220 of the process execution system 300. The internal environment Ein includes a storage unit 220 functioning as a database server. The internal environment Ein includes a database server managed by the web application itself when the process execution system 300 is configured as a web application operating on a server machine.

The external environment Eout includes the external system SysOut itself, which communicates with the process execution system 300.

The transcription factor model evaluation unit 382 evaluates the transcription factor model M using the information that the process execution system 300 can obtain from the environment E with which the process execution system 300 is communicable, as input data Din. The input data Din used by the transcription factor model evaluation unit 382 to evaluate the transcription factor model M is not particularly limited as long as it is information that can be obtained from the environment E with which the process execution system 300 is communicable.

The input data Din includes data obtained from the storage unit 220 (internal environment Ein) of the process execution system 300.

The input data Din includes data obtained from an external database server (external environment Eout) with which the external system SysOut communicates.

The data retrieval from an external database server (external environment Eout) with which the external system SysOut communicates may be performed via the external system SysOut. For example, in the case where an external system SysOut is a web application built using a web application framework such as Django, the data retrieval from an external database (external environment Eout) with which the web application communicates can be performed via the API of the web application. Additionally, when the external system SysOut is Power Automate of Microsoft 365, and the external database server (external environment Eout) is Microsoft Dataverse, SharePoint Online, or Excel Online, the data retrieval from the external database server can be performed via an API configured with a Power Automate flow (triggered by an HTTP POST).

Additionally, the data retrieval from the external database server (external environment Eout) with which the external system SysOut communicates may be performed directly from the external database server. For example, if the external system SysOut is Power Automate of Microsoft 365 and the external database server (external environment Eout) is Microsoft Dataverse, data retrieval from Microsoft Dataverse can be performed via the Microsoft Dataverse Web API.

The external system SysOut includes Web 3.0 (Web3) related systems that use blockchains such as Ethereum. The external system SysOut includes an application that processes DApps and smart contracts configured on the blockchain.

The input data Din may be information generated by the external system SysOut (external environment Eout) that can communicate with the process execution system 300. Information generated by the external system SysOut (external environment Eout) with which the process execution system 300 is communicable includes data such as text, images, and audio generated by a trained generative model, for example, in response to a request from the process execution system 300. As a service that generates text using a trained generative model in response to requests from clients, there is, for example, ChatGPT.

The process network model input unit 351 is configured similarly to the process network model input unit 251 of the second embodiment of the process execution system 200, except for the following points. That is, the process network model input unit 351 accepts an input of context data CxD associated with the process network D3 generated from the process network model DM3 when accepting the input of the process network model DM3. The input data Din includes the context data CxD accepted as input by the process network model input unit 351.

The process network model input unit 351 stores the context data CxD, which was accepted when accepting an input of the process network model DM3, in a database server functioning as the storage unit 220.

Referring to FIG. 32, the case data CD related to the cases processed in operations represented by the process network model DM3 is stored for each case in one or more case data tables CDT of the database server (internal environment Ein) functioning as the storage unit 220. The case data table CDT may be stored in an external database server (external environment Eout) with which the external system SysOut communicates.

Referring to FIG. 33, the process network model input unit 351 stores the context data CxD, which is accepted when accepting an input of the process network model DM3, in the context table CxT of the database server functioning as the storage unit 220. The context data CxD includes the case ID (CID) of the case to be processed in the operations represented by the process network model DM3. The case ID (CID) is represented by a combination of the application name CID1 that manages the case data table CDT, the table name CID2 of the case data table CDT, and the record ID (CID3) of the record in which the case data of the relevant case is stored in the case data table CDT.

The process network model input unit 351, when storing the context data CxD in the database server functioning as the storage unit 220, stores it in association with the process node identifier D31 of the process node D30 included in the process network D3 with which the context data CxD is associated.

The transcription factor model M is not particularly limited as long as it is a model in which the output result is determined according to the input data Din. The transcription factor model M may be either a deterministic model or a probabilistic model. The deterministic model used as the transcription factor model M includes a model represented by a function, preferably a model represented by a higher-order function that takes a function as an argument. The deterministic model used as the transcription factor model M includes machine learning models such as deterministic deep learning models. The probabilistic model used as the transcription factor model M includes machine learning models such as probabilistic deep learning models (generative models) and deep Boltzmann machines.

The transcription process execution unit 383 controls the transcription process based on evaluation results R of one or more transcription factor models M evaluated by the transcription factor model evaluation unit 382.

The transcription process controlled by the transcription process execution unit 383 includes a selection process that selects a part of the process generation information DM35 based on the evaluation result R of the transcription factor model M, an iteration process that iterates a part of the process generation information DM35 based on the evaluation result R of the transcription factor model M, and a Constant> or a <Transcription Factor Model Tag>. By specifying the <Transcription Factor Model Tag> as the <Loop Variable Array>, the evaluation result R of the transcription factor model M can be used as the loop variable array. A <Loop Variable Array Constant> is data consisting of string-type data arranged and separated by commas, enclosed in parentheses.

The <Iteration Block> is data that consists of zero or more repetitions of data in which optionally a <String>, optionally a <Loop Variable> enclosed in double brackets ("{{", "}}"), and optionally a <Transcription Process Tag> are sequentially arranged in this order. For example, <Iteration Block> may be data in which {{<Loop Variable>}}, <String>, <String>, <Transcription Process Tag>, {{<Loop Variable>}}, <String> are arranged in this order. The <Iteration Block> may be empty.

<Iteration Process Tag End Symbol> represents the end position of iteration process tag PTi. The <Iteration Process Tag End Symbol> exemplifies a combination of <Transcription Process Tag Start Symbol>, "endfor", and the <Transcription Process Tag End Symbol>, but it is not particularly limited as long as the end position of the iteration process tag PTi can be specified.

Referring to FIG. 37, the replacement process tag PTr is the <Transcription Factor Model Tag> itself.

The transcription factor model definition information MDinfo is represented by the transcription factor model tag MT described in a predetermined syntax. The syntax for describing the transcription factor model tag MT is not particularly limited. FIG. 38 illustrates the definition of the syntax of the transcription factor model tag MT in Extended Backus-Naur Form (EBNF).

The transcription factor model tag MT is data in which a <Transcription Factor Model Tag Start Symbol>, a <Transcription Factor Model>, optionally a <Evaluation Result Selector Group>, and a <Transcription Factor Model Tag End Symbol> are sequentially arranged in this order.

<Transcription Factor Model Tag Start Symbol> represents the start position of the transcription factor model tag MT. <Transcription Factor Model> represents the transcription factor model M. <Evaluation Result Selector Group> represents the data to be used as the evaluation result R of the transcription factor model M from the output data Dout of the transcription factor model M. <Transcription Factor Model Tag End Symbol> represents the end position of the transcription factor model tag MT.

FIG. 38 illustrates a case where the <Transcription Factor Model Tag Start Symbol> is "<", but the <Transcription Factor Model Tag Start Symbol> is not particularly limited as long as the start position of the transcription factor model tag MT can be specified.

The <Transcription Factor Model> is data in which a <Model ID>, and optionally a <Input Data Group> are sequentially arranged in this order. <Model ID> is an identifier for uniquely identifying the transcription factor model M. The <Input Data Group> represents one or more input data Din used to evaluate the transcription factor model M.

The method of expressing the <Model ID> is not particularly limited. In the present embodiment, the <Model ID> has a hierarchical structure. Specifically, a <Model ID> is data consisting of one or more <Model Group Names> separated by periods (".") and a <Model Name> arranged in sequence. The <Model Group Name> is arranged from the higher hierarchical level to the lower hierarchical level from the left side to the right side. <Model Group Name> and <Model Name> are string-type data.

The <Input Data Group> is data that encloses a <Input Data> in parentheses. The <Input Data> is data consisting of one or more <Input Variable> arranged in sequence and separated by commas.

The <Input Variable> is data that concatenates the <Input Variable Name> and the <Input Variable Value> with "=". The <Input Variable Name> is string-type data. The <Input Variable Value> is either a <String> or a <Transcription Factor Model Tag>. The transcription factor model M has the structure of a higher-order function by being able to set the <Transcription Factor Model Tag> as the <Input Variable Value>, thereby using the evaluation result R of one transcription factor model M as the input data Din for another transcription factor model M.

The <Evaluation Result Selector Group> is data in which the <Evaluation Result Selectors> are arranged and separated by ".". <Evaluation Result Selector> represents an identifier that identifies the data to be used as the evaluation result R of the transcription factor model M from the output data Dout of the transcription factor model M. When all the data contained in the output data Dout of the transcription factor model M is used as the evaluation result R of the transcription factor model M, the <Evaluation Result Selector Group> may not be necessary.

The output data Dout of the transcription factor model M may include pieces of data. Specifically, the output data Dout of the transcription factor model M can be a list, an array, an associative array, or structured data with nested elements. FIG. 39 illustrates an example where the output data Dout of the transcription factor model M is in JSON format. If the output data Dout of the transcription factor model M is structured data, the <Evaluation Result Selector Group> will sequentially list the identifiers that specify the data in each hierarchical level from the upper hierarchical level to the lower hierarchical level, from left to right, as <Evaluation Result Selector>. For example, in the output data Dout illustrated in FIG. 39, the <Evaluation Result Selector Group> specifying "Value 31B" can be "1.key12.0.key22.key31".

If the transcription factor model M is a probabilistic model, the output data Dout may be a probability distribution. If the output data Dout is a probability distribution, the <Evaluation Result Selector Group> may be, for example, data representing the value of the random variable that takes the maximum probability in the probability distribution.

FIG. 38 illustrates a case where the <Transcription Factor Model Tag End Symbol> is ">>>", but the <Transcription Factor Model Tag End Symbol> is not particularly limited as long as the termination position of the transcription factor model tag MT can be specified.

Subsequently, with reference to FIG. 40 and FIG. 41, the operation of the process execution system 300 will be described. FIG. 40 is a flowchart illustrating the procedure of the process executed in the process execution system 300 according to the present embodiment. FIG. 41 is a flowchart illustrating the procedure of the execution process of executable process nodes D30 executed in the process execution system 300 according to the present embodiment. The process shown in the flowcharts of FIG. 41 and FIG. 42 is executed by the control unit 310 of the process execution system 300 in accordance with a program.

As shown in FIG. 40, the program executed by the control unit 310 of the process execution system 300 includes a step S31 of accepting an input of a process network model DM3, a step S32 of generating a process network D3, a step S33 of performing the state transition process for process nodes D30, a step S34 of performing the execution process of executable process nodes D30, and a step S35 of determining whether all process nodes D30 included in the process network D3 are in the completed state.

The step S32 of generating a process network D3 can be configured similarly to the step S22 of generating a process network D2 in the second embodiment. Step S33 of performing the state transition process for process nodes D30 can be configured similarly to the Step S23, which performs the state transition process for process nodes D20 in the second embodiment. Step S35 of determining whether all process nodes D30 included in process network D3 are in the completed state can be configured similarly to step S25, which determines whether all process nodes D20 included in process network D2 are in the completed state in the second embodiment.

(Step S31)

Step S31 of accepting an input of a process network model DM3 is configured similarly to Step S21 of accepting an input of a process network model DM2 in the process execution system 200 according to the second embodiment, except for the following points. That is, the process network model input unit 351 accepts an input of context data CxD associated with a process network D3 generated from the process network model DM3 when accepting the process network model DM3 as input. The process network model input unit 351 stores the context data CxD, which was accepted when accepting the process network model DM3 as input, in the context table CxT of the database server functioning as the storage unit 220.

(Step S34)

Figure 41:
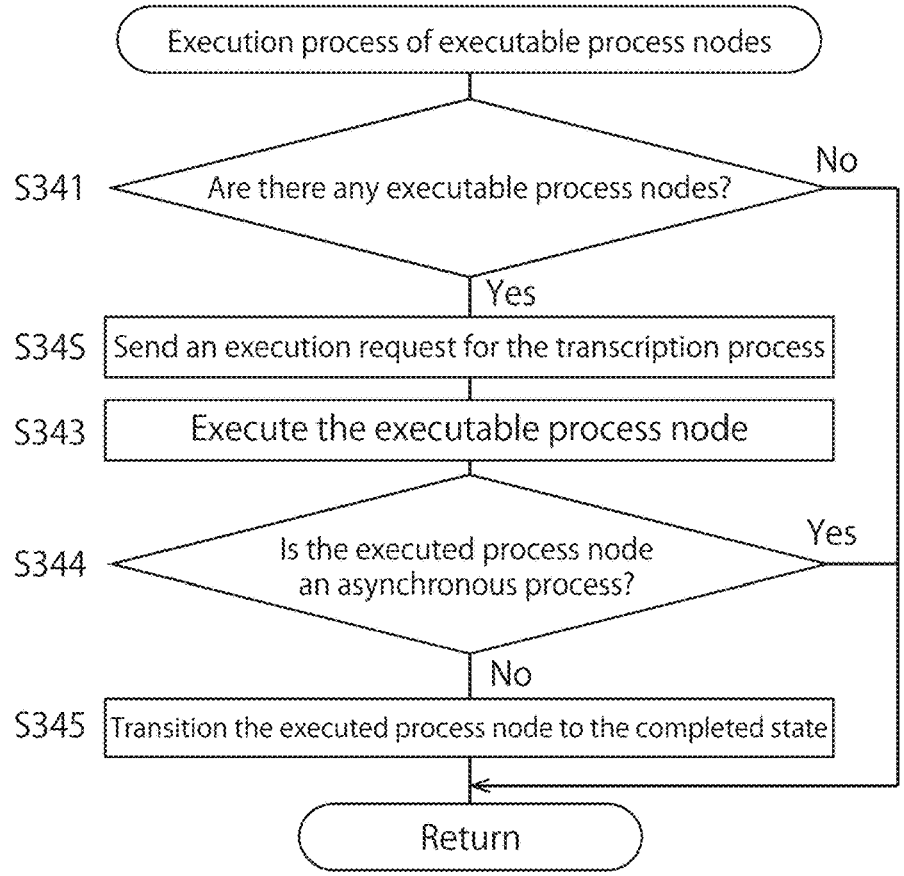
FIG. 41 is a flowchart illustrating the procedure of the execution process of executable process nodes executed in the process execution system according to the third embodiment of the present invention.

As shown in FIG. 41, the execution process of executable process nodes D30 performed in step S34 includes a step S341 of determining whether executable process nodes D30 exist, a step S342 of sending an execution request for the transcription process, a step S343 of performing the execution process of executable process nodes D30, a step S344 of determining whether the executed process node D30 is an asynchronous process, and a step S345 of transitioning the state of the executed process node D30 to the completed state.

Step S341 of determining whether executable process nodes D30 exist can be configured similarly to step S241 of determining whether executable process nodes D20 exist according to the second embodiment. Step S343 of executing the executable process node D30 can be configured similarly to step S242 of executing the execution process of executable process nodes D20 according to the second embodiment. Step S344 of determining whether the executed process node D30 is an asynchronous process can be configured similarly to step S243 for determining whether the executed process node D20 is an asynchronous process according to the second embodiment. Step S345 of transitioning the state of the executed process node D30 to the completed state can be configured similarly to step S244, which transitions the state of the executed process node D20 to the completed state, according to the second embodiment.

(Step S342)

The process network execution unit 370 sends an execution request for a transcription process that transcribes the process generation information DM35 associated with the process master node DM30 corresponding to the executable process node D30, into the executable process node D30 as process definition information D35. The transcription unit 380 transcribes the process generation information DM35, for which the transcription request acceptance unit 381 has accepted an execution request for the transcription process, as process definition information D35 into the process node corresponding to the process master node DM30 that has the process generation information DM35. The process definition information D35 is updated by the transcription unit 380 through transcription.

(Step S343)

The process network execution unit 370 executes the process based on the process definition information D35 updated by the transcription unit 380 in step S342.

Figure 42:
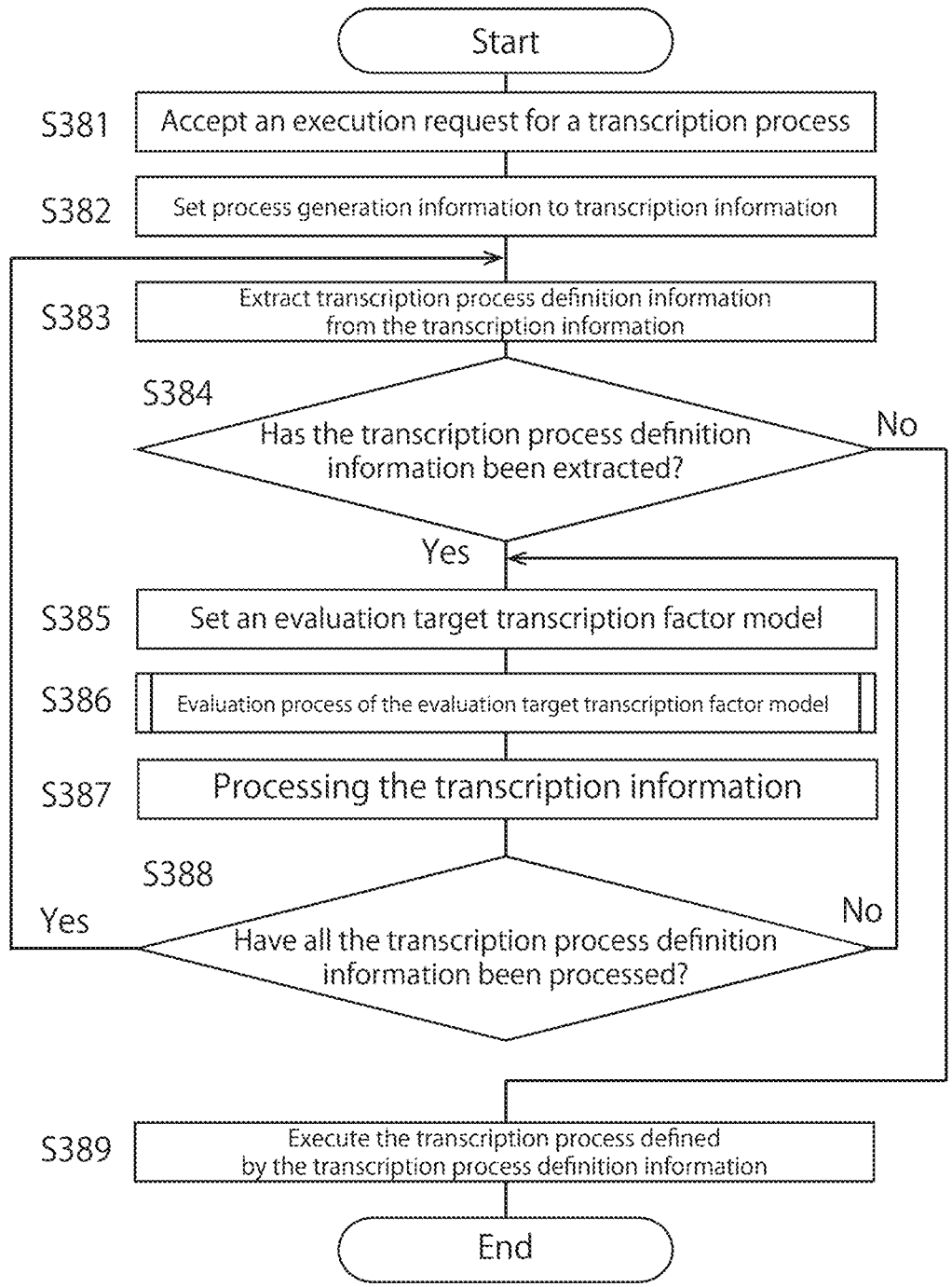
FIG. 42 is a flowchart illustrating the procedure of the process executed in the transcription unit of the process execution system according to the third embodiment of the present invention.
Figure 43:
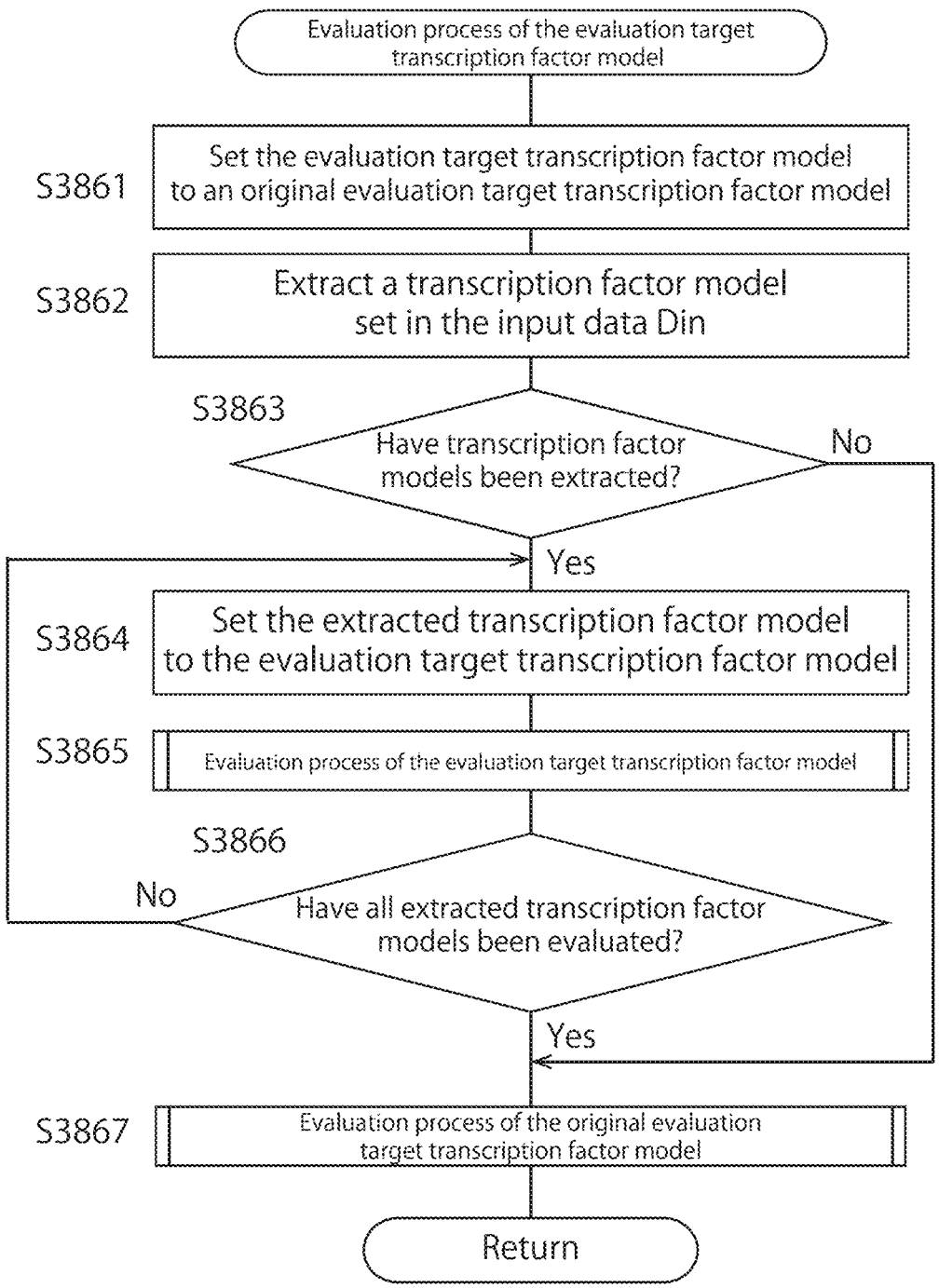
FIG. 43 is a flowchart illustrating the procedure of the evaluation process of the evaluation target transcription factor model executed in the transcription unit of the process execution system according to the third embodiment of the present invention.
Figure 44:
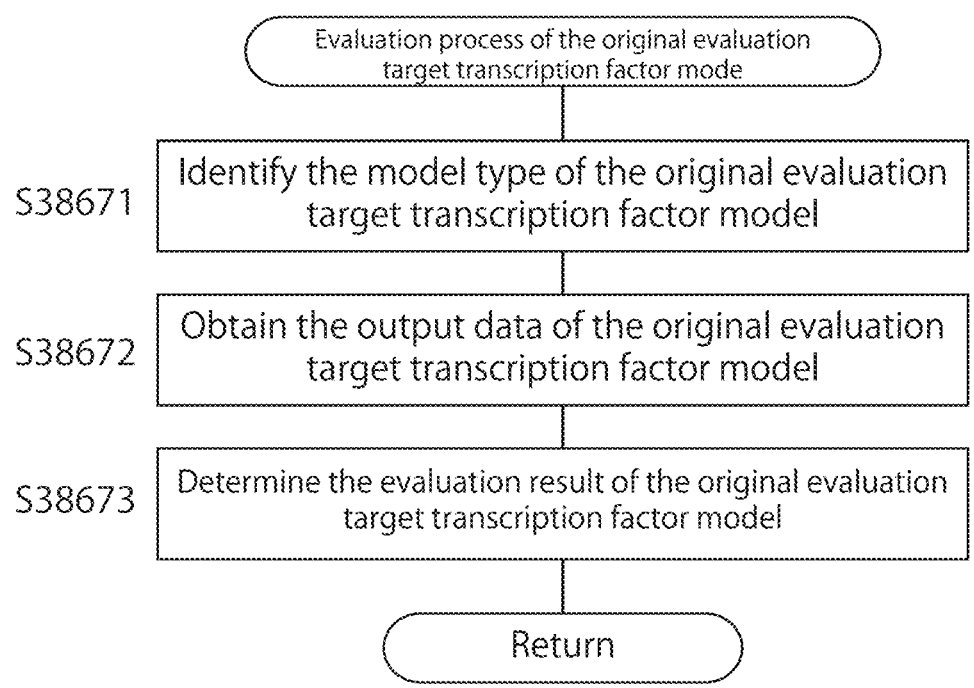
FIG. 44 is a flowchart illustrating the procedure of the evaluation process of the original evaluation target transcription factor model executed in the transcription unit of the process execution system according to the third embodiment of the present invention.

Referring to FIGS. 42 to 44, the operation of the program executed by the transcription unit 380 of the process execution system 300 will be described. FIG. 42 is a flowchart illustrating the procedure of the process executed in the transcription unit 380 of the process execution system 300 according to the present embodiment. FIG. 43 is a flowchart illustrating the procedure of the evaluation process of the evaluation target transcription factor model Me executed in the transcription unit 380 of the process execution system 300 according to the present embodiment. FIG. 44 is a flowchart illustrating the procedure of the evaluation process of the original evaluation target transcription factor model Mo executed in the transcription unit 380 of the process execution system 300 according to the present embodiment. The processes shown in the flowcharts of FIGS. 42 to 44 are executed by the control unit 310 of process execution system 300 in accordance with the program.

The program executed by the transcription unit 380 of the process execution system 300 includes a step S381 of accepting an execution request for a transcription process, a step S382 of setting process generation information DM35 to transcription information Tinfo, a step S383 of extracting transcription process definition information PDinfo from the transcription information Tinfo, a step S384 of determining whether the transcription process definition information PDinfo has been extracted, a step S385 of setting an evaluation target transcription factor model Me, a step S386 of performing the evaluation process of the evaluation target transcription factor model Me, a step S387 of processing the transcription information Tinfo, a step S388 of determining whether all the transcription process definition information PDinfo has been processed, and a step S389 of executing the transcription process defined by the transcription process definition information PDinfo.

(Step S381)

The transcription request acceptance unit 381 accepts an execution request for the transcription process to transcribe the process generation information DM35 associated with one process master node DM30.

(Step S382)

The transcription process execution unit 383 sets the process generation information DM35, for which a transcription process execution request was accepted in step S381, into the transcription information Tinfo.

(Step S383)

The transcription process execution unit 383 extracts transcription process definition information PDinfo from the transcription information Tinfo. Specifically, the transcription process execution unit 383 extracts the transcription process tag PT representing the transcription process definition information PDinfo from the transcription information Tinfo.

(Step S384)

The transcription process execution unit 383 determines whether the transcription process definition information PDinfo has been extracted in step S383. Specifically, the transcription process execution unit 383 determines whether the transcription process tag PT representing the transcription process definition information PDinfo has been extracted in step S383. If it is determined that the transcription process definition information PDinfo has been extracted, proceed to step S385. If it is determined that the transcription process definition information PDinfo has not been extracted, proceed to step S389.
(Step S385)

The transcription factor model evaluation unit 382 sets the transcription factor model M, defined by the transcription factor model definition information MDinfo included in the transcription process definition information PDinfo, as the target transcription factor model Me for evaluation.

Specifically, the transcription factor model evaluation unit 382 sets the transcription factor model M, represented by the transcription factor model tag MT included in the selection conditions of the selection process tag PTs, as the evaluation target transcription factor model Me when the transcription process tag PT representing the transcription process definition information PDinfo is the selection process tag PTs. The transcription factor model evaluation unit 382 sets the transcription factor model M, represented by the transcription factor model tag MT included in the iteration conditions of the iteration process tag PTi, as the evaluation target transcription factor model Me when the transcription process tag PT representing the transcription process definition information PDinfo is the iteration process tag PTi. The transcription factor model evaluation unit 382 sets the transcription factor model M, represented by the transcription factor model tag MT, as the evaluation target transcription factor model Me when the transcription process tag PT representing the transcription process definition information PDinfo is the replacement process tag PTr.
(Step S386)

The transcription factor model evaluation unit 382 performs the evaluation process of the evaluation target transcription factor model Me set in step S385. The transcription factor model evaluation unit 382 evaluates the evaluation target transcription factor model Me by using the information that can be obtained from the environment E, with which the process execution system 300 is communicable, as input data Din when performing the evaluation process of the evaluation target transcription factor model Me.
(Step S387)

The transcription process execution unit 383 processes the transcription information Tinfo based on the evaluation result R of the transcription factor model M evaluated in step S386.

The transcription process execution unit 383 evaluates the selection conditions based on the evaluation result R of the transcription factor model M represented by the transcription factor model tag MT included in the selection conditions of the selection process tag PTs, and replaces the selection process tag PTs with the selection block where the selection conditions are true, in the case where the transcription process tag PT representing the transcription process definition information PDinfo is the selection process tag PTs.

The transcription process execution unit 383 replaces the iteration process tag PTi with the transcription process tag PTi using the iteration information generated by iterating the iteration block with each element contained in the <Loop Variable Array> as the value of the loop variable, in the case where the transcription process tag PT representing the transcription process definition information PDinfo is the iteration process tag PTi. The transcription process execution unit 383 replaces "{{<Loop Variable>}}" with the value of the loop variable when "{{<Loop Variable>}}" is included in the iterative block during the generation of iterative information. The transcription process execution unit 383, when the transcription factor model tag MT is set in the <Loop Variable Array>, treats the evaluation result R of the transcription factor model M represented by the transcription factor model tag MT as the <Loop Variable Array>.

The transcription process execution unit 383 replaces the replacement process tag PTr with the evaluation result R of the transcription factor model M, which is represented by the transcription factor model tag MT that constitutes the replacement process tag PTr, when the transcription process tag PT representing the transcription process definition information PDinfo is the replacement process tag PTr.
(Step S388)

The transcription process execution unit 383 determines whether all the transcription process definition information PDinfo extracted in step S383 has been processed. If it is determined that all the transcription process definition information PDinfo has been processed, return to step S383. If there is any unprocessed transcription process definition information PDinfo, return to step S385.
(Step S389)

The transcription process execution unit 383 transcribes the transcription information Tinfo as process definition information D35 into the process node D30 corresponding to the process master node DM30, for which a transcription process execution request was accepted in step S381.

Referring to FIG. 43, step S386 of performing the evaluation process of the evaluation target transcription factor model Me includes a step S3861 of setting the evaluation target transcription factor model Me to an original evaluation target transcription factor model Mo, a step S3862 of extracting a transcription factor model M set in the input data Din, step S3863 of determining whether transcription factor models have been extracted, step S3864 of setting the extracted transcription factor model M to the evaluation target transcription factor model Me, step S3865 of performing the evaluation process of the evaluation target transcription factor model Me, step S3866 of determining whether all extracted transcription factor models M have been evaluated, and step S3867 of performing the evaluation process of the original evaluation target transcription factor model Mo.
(Step S3861)

The transcription factor model evaluation unit 382 sets the evaluation target transcription factor model Me to the original evaluation target transcription factor model Mo.
(Step S3862)

The transcription factor model evaluation unit 382 extracts the transcription factor model M set in the input data Din of the original evaluation target transcription factor model Mo. Specifically, the transcription factor model evaluation unit 382 extracts the transcription factor model M represented by the transcription factor model tag MT set in the <Input Variable Value> of the transcription factor model tag MT representing the original evaluation target transcription factor model Mo.
(Step S3863)

The transcription factor model evaluation unit 382 determines whether the transcription factor model M has been extracted in step S3862. If it is determined that the transcription factor model M has been extracted, proceed to step S3864. If it is determined that the transcription factor model M has not been extracted, proceed to step S3867.
(Step S3864)

The transcription factor model evaluation unit 382 sets the transcription factor model M extracted in step S3862 as the evaluation target transcription factor model Me.

(Step S3865)

The transcription factor model evaluation unit 382 performs the evaluation process of the evaluation target transcription factor model Me.

(Step S3866)

The transcription factor model evaluation unit 382 determines whether the transcription factor model M extracted in step S3862 has been evaluated. If it is determined that all transcription factor models M extracted in step S3862 have been evaluated, the process proceeds to step S3867. If it is determined that there is a transcription factor model M extracted in step S3862 that has not been evaluated, the process returns to step S3864.

(Step S3867)

The transcription factor model evaluation unit 382 performs the evaluation process of the original evaluation target transcription factor model Mo.

Referring to FIG. 44, step S3867 of performing the evaluation process of the original evaluation target transcription factor model Mo includes step S38671 of identifying the model type of the original evaluation target transcription factor model Mo, step S38672 of obtaining the output data Dout of the original evaluation target transcription factor model Mo, and step S38673 of determining the evaluation result R of the original evaluation target transcription factor model Mo.

(Step S38671)

The transcription factor model evaluation unit 382 identifies the model type of the original evaluation target transcription factor model Mo. Specifically, the transcription factor model evaluation unit 382 identifies the model type of the original evaluation target transcription factor model Mo based on the transcription factor model tag MT representing the original evaluation target transcription factor model Mo. More specifically, the transcription factor model evaluation unit 382 identifies the model type of the original evaluation target transcription factor model Mo based on the <Model ID> included in the transcription factor model tag MT representing the original evaluation target transcription factor model Mo.

More specifically, the transcription factor model evaluation unit 382 identifies the model type of the original evaluation target transcription factor model Mo as a self-process reference type when the <Model ID> included in the transcription factor model tag MT representing the original evaluation target transcription factor model Mo lacks a <Model Group Name> and the model name is "SelfProcess".

The transcription factor model evaluation unit 382 specifies the model type of the original evaluation target transcription factor model Mo as a table reference type when the <Model Group Name> in the <Model ID> included in the transcription factor model tag MT representing the original evaluation target transcription factor model Mo is the application name and the <Model Name> is the table name.

The transcription factor model evaluation unit 382 identifies the model type of the original evaluation target transcription factor model Mo as a script type when the <Model ID> included in the transcription factor model tag MT representing the original evaluation target transcription factor model Mo does not have a <Model Group Name> and the <Model Name> is "Script".

The transcription factor model evaluation unit 382 identifies the model type of the original evaluation target transcription factor model Mo as a machine learning model type when the <Model ID> included in the transcription factor model tag MT, which represents the original evaluation target transcription factor model Mo, does not have a <Model Group Name> and the <Model Name> is "MachineLearningModel".

The transcription factor model evaluation unit 382 identifies the model type of the original evaluation target transcription factor model Mo as an API type if the <Model ID> included in the transcription factor model tag representing the original evaluation target transcription factor model Mo does not have a <Model Group Name> and the <Model Name> is "API".

(Step S38672)

The transcription factor model evaluation unit 382 evaluates the original evaluation target transcription factor model Mo using the information that is obtained from the environment E, with which the process execution system 300 is communicable, as input data Din, and obtains the output data Dout. Specifically, the transcription factor model evaluation unit 382 evaluates the original evaluation target transcription factor model Mo based on the model type of the original evaluation target transcription factor model Mo identified in step S38671 and obtains the output data Dout.

More specifically, the transcription factor model evaluation unit 382 obtains the information of the process node D30 as the output data Dout when the model type of the original evaluation target transcription factor model Mo identified in step S38671 is the self-process reference type.

The transcription factor model evaluation unit 382, when the model type of the original evaluation target transcription factor model Mo identified in step S38671 is a table reference type, obtains the information searched based on the input data Din of the transcription factor model tag MT from the table specified by the <Model Group Name> (representing the application name managing the table) and <Model Name> (representing the table name) of the transcription factor model tag MT representing the original evaluation target transcription factor model Mo, as output data Dout. The table from which information is obtained as output data Dout of the original evaluation target transcription factor model Mo may be in either the internal environment Ein or the external environment Eout.

The transcription factor model evaluation unit 382, when the model type of the original evaluation target transcription factor model Mo identified in step S38671 is a script type, obtains the execution result of the script executed based on the input data Din of the transcription factor model tag MT representing the original evaluation target transcription factor model Mo as the output data Dout.

The transcription factor model evaluation unit 382, in the case where the model type of the original evaluation target transcription factor model Mo identified in step S38671 is a machine learning model type, obtains the inference result using the machine learning model executed based on the input data Din of the transcription factor model tag MT representing the original evaluation target transcription factor model Mo as the output data Dout.

The transcription factor model evaluation unit 382, when the model type of the original evaluation target transcription factor model Mo identified in step S38671 is an API type, obtains the execution result of the API executed based on the input data Din of the transcription factor model tag MT representing the original evaluation target transcription factor model Mo as the output data Dout.

(Step S38673)

The transcription factor model evaluation unit 382 determines the data to be returned as the evaluation result R of the original evaluation target transcription factor model Mo from the output data Dout of the original evaluation target transcription factor model Mo obtained in step S38672. Specifically, the transcription factor model evaluation unit 382 determines the data to be returned as the evaluation result R from the output data Dout of the original evaluation target transcription factor model Mo based on the transcription factor model tag MT representing the original evaluation target transcription factor model Mo. More specifically, the transcription factor model evaluation unit 382 determines the data to be returned as the evaluation result R from the output data Dout of the original evaluation target transcription factor model Mo based on the <Evaluation Result Selector Group> of the transcription factor model tag MT representing the original evaluation target transcription factor model Mo.

Referring to FIGS. 45 to 47, an operation example of the execution process of the transcription process executed in the transcription unit 380 described using FIG. 42 will be described. FIG. 45 is a schematic diagram illustrating process generation information DM35 used to explain an operation example of the transcription unit 380 of the process execution system 300 according to the present embodiment. FIG. 46 is a schematic diagram illustrating the transcription information Tinfo used to explain an operation example of the transcription unit 380 of the process execution system 300 according to the present embodiment. FIG. 47 is a schematic diagram illustrating transcription information Tinfo used to explain an operation example of the transcription unit 380 of the process execution system 300 according to the present embodiment. As shown in FIG. 45, the process generation information DM35 used in the description of the operation example includes transcription process tags PT (PTs1, PTs2, PTs3, PTi, and PTr) representing the transcription process definition information PDinfo.

When the transcription request acceptance unit 381 accepts a transcription process execution request (step S381), the transcription process execution unit 383 sets the process generation information DM35 as the transcription information Tinfo (step S382).

In step S383, the transcription process execution unit 383 extracts the selection process tag PTs1 and the replacement process tag PTr from the transcription information Tinfo. Since the transcription process tag PT (PTs1 and PTr) is extracted in step S383, the determination in step S384 becomes Yes.

The process from step S385 to step S387 is performed for each of the selection process tag PTs1 and the replacement process tag PTr. Here, the selection process tag PTs1 and the replacement process tag PTr are processed in that order.

In step S385, the transcription factor model evaluation unit 382 sets the transcription factor model M, represented by the included in the selection conditions of the selection process tag PTs1, as the evaluation target transcription factor model Me. In step S386, the transcription factor model evaluation unit 382 performs the evaluation process of the evaluation target transcription factor model Me. Here, the evaluation result R of the evaluation target transcription factor model Me is assumed to be "Value m".

In step S387, the transcription process execution unit 383 processes the transcription information Tinfo according to the evaluation result R of the transcription factor model M in step S386. Specifically, the transcription process execution unit 383 replaces the selection process tag PTs1 included in the transcription information Tinfo with the selection block corresponding to the selection condition "=="Value in"" that evaluates to true (the block containing the iteration process tag PTi).

Since the processing of the replacement process tag PTr has not been completed, the determination in step S388 is No, and the process returns to step S385.

In step S385, the transcription factor model evaluation unit 382 sets the transcription factor model M, represented by the replacement process tag PTr forming the , as the evaluation target transcription factor model Me. In step S386, the transcription factor model evaluation unit 382 performs the evaluation process of the evaluation target transcription factor model Me. Here, the evaluation result R of the evaluation target transcription factor model Me is "Evaluation Result 01".

In step S387, the transcription process execution unit 383 replaces the replacement process tag PTr included in the transcription information Tinfo based on the evaluation result R of the evaluation target transcription factor model Me in step S386.

Since the transcription process tags PT (PTs1 and PTr) extracted in step S383 have been processed, the determination in step S388 is Yes, and the process returns to step S383. As a result of the process up to this point, the transcription information Tinfo becomes as shown in FIG. 46.

In step S383, the transcription process execution unit 383 extracts the iteration process tag PTi from the transcription information Tinfo. Since the iteration process tag PTi has been extracted, the determination in step S384 becomes Yes.

In step S385, the transcription factor model evaluation unit 382 sets the transcription factor model M, represented by the included in the iteration conditions of the iteration process tag PTi, as the evaluation target transcription factor model Me. In step S386, the transcription factor model evaluation unit 382 performs the evaluation process of the evaluation target transcription factor model Me. Here, the evaluation result R of the evaluation target transcription factor model Me is assumed to include three pieces of data: "Evaluation Result 221," "Evaluation Result 222," and "Evaluation Result 223."

In step S387, the transcription process execution unit 383 generates iteration information by iterating the <Iteration Block> included in the iteration process tag PTi for each of the three pieces of data included in the evaluation result R of the evaluation target transcription factor model Me in step S386, using each data piece as the loop variable. The "{{Loop Variable}}" included in the iterative information is replaced by each of the three pieces of data of the evaluation result R of the evaluation target transcription factor model Me. The transcription process execution unit 383 replaces the iteration process tag PTi included in the transcription information Tinfo with the generated iteration information.

Since the iteration process tag PTi extracted in step S383 has been processed, the determination in step S388 is Yes, and the process returns to step S383. As a result of the process up to this point, the transcription information Tinfo becomes as shown in FIG. 47.

Since the transcription process definition information PDinfo extracted from the transcription information Tinfo in step S383 does not exist, the determination in step S384 is No, and the process proceeds to step S389.

In step S389, the transcription process execution unit 383 transcribes the transcription information Tinfo as process definition information D35 into the process node D30 corresponding to the process master node DM30, for which a transcription process execution request was accepted in step S381. This completes the execution process of the transcription process by transcription unit 380.

Referring to FIGS. 48 to 53, an operation example of the evaluation process for the evaluation target transcription factor model Me executed in the transcription unit 380 described using FIGS. 43 and 44 will be explained. FIG. 48 is a schematic diagram illustrating a transcription process tag PT used to explain an operation example of the evaluation process of the evaluation target transcription factor model Me in the transcription unit 380 of the process execution system 300 according to the present embodiment. FIG. 49 is a schematic diagram illustrating a transcription process tag PT used to explain an operation example of the evaluation process of the evaluation target transcription factor model Me in the transcription unit 380 of the process execution system 300 according to the present embodiment. FIG. 50 is a schematic diagram illustrating a transcription process tag PT used to explain an operation example of the evaluation process of the evaluation target transcription factor model Me in the transcription unit of the process execution system 300 according to the present embodiment. FIG. 51 is a schematic diagram illustrating a transcription process tag used to explain an operation example of the evaluation process of the evaluation target transcription factor model Me in the transcription unit 380 of the process execution system 300 according to the present embodiment. FIG. 52 is a schematic diagram illustrating a transcription process tag PT used to explain an operation example of the evaluation process of the evaluation target transcription factor model Me in the transcription unit 380 of the process execution system 300 according to the present embodiment. FIG. 53 is a schematic diagram illustrating a transcription process tag PT used to explain an example of the evaluation process of the evaluation target transcription factor model Me in the transcription unit 380 of the process execution system 300 according to the present embodiment.

First, a case will be described where the evaluation target transcription factor model Me is the transcription factor model M represented by the transcription factor model tag MT illustrated in FIG. 48.

Referring to FIG. 43, in step S3861, the evaluation target transcription factor model Me is set to the original evaluation target transcription factor model Mo. In step S3862, since the transcription factor model M set in the input data Din is not extracted, the determination in step S3863 is No, and the process proceeds to step S3867. In step S3867, the evaluation process of the original evaluation target transcription factor model Mo is performed.

Referring to FIG. 44, in step S38671, since the <Model ID> of the transcription factor model tag MT representing the original evaluation target transcription factor model Mo is "SelfProcess," the model type of the original evaluation target transcription factor model Mo is identified as the self-process reference type. In step S38672, since the model type of the original evaluation target transcription factor model Mo is a self-process reference type, information of the self-process node D30 is obtained from the storage unit 220 as output data Dout. In step S38673, since the <Evaluation Result Selector Group> of the transcription factor model tag MT representing the original evaluation target transcription factor model Mo is the "ProcessNode-Identifier," the data of the process node identifier D31 among the output data Dout is determined as the evaluation result R of the original evaluation target transcription factor model Mo.

Subsequently, a case will be described where the evaluation target transcription factor model Me is the transcription factor model M represented by the transcription factor model tag MT illustrated in FIG. 49.

Referring to FIG. 43, in step S3861, the evaluation target transcription factor model Me is set to the original evaluation target transcription factor model Mo. In step S3862, the transcription factor model M, which is set to the <Input Variable Value> corresponding to the <Input Variable Name>"ProcessNodeIdentifier" is extracted. Since the transcription factor model M is extracted in step S3862, the determination in step S3863 becomes Yes, and the process proceeds to step S3864. In step S3864, the transcription factor model M set to the <Input Variable Value> corresponding to the <Input Variable Name>"ProcessNodeIdentifier" is set as the evaluation target transcription factor model Me. In step S3865, the evaluation process of the evaluation target transcription factor model Me is performed. Since the evaluation target transcription factor model Me is the same as the transcription factor model M represented by the transcription factor model tag MT illustrated in FIG. 48, the same process as the aforementioned evaluation process for the transcription factor model tag MT illustrated in FIG. 48 is performed. Since all the transcription factor models M extracted in step S3862 have been evaluated, the determination in step S3866 becomes Yes, and the process proceeds to step S3867. In step S3867, the evaluation process of the original evaluation target transcription factor model Mo is performed.

Referring to FIG. 44, in step S38671, since the <Model ID> of the transcription factor model tag MT representing the original evaluation target transcription factor model Mo is "AppVa.ContextTable," the model type of the original evaluation target transcription factor model Mo is identified as a table reference type. In step S38672, since the model type of the original evaluation target transcription factor model Mo is a table reference type, information retrieved based on the input data Din from the context table managed by the application Va is obtained as the output data Dout. Here, the information of the record from the context table managed by the application Va, where the process node identifier D31 is the process node identifier D31 of its own process node D30, is obtained as output data Dout. In step S38673, since the <Evaluation Result Selector Group> of the transcription factor model tag MT representing the original evaluation target transcription factor model Mo is "CaseID," the data of the case ID in the output data Dout is determined as the evaluation result R of the original evaluation target transcription factor model Mo.

Subsequently, a case will be described where the evaluation target transcription factor model Me is the transcription factor model M represented by the transcription factor model tag MT illustrated in FIG. 50.

Referring to FIG. 43, in step S3861, the evaluation target transcription factor model Me is set to the original evaluation target transcription factor model Mo. In step S3862, the transcription factor model M, which is set to the <Input Variable Value> corresponding to the <Input Variable Name>"ColumnCp1" is extracted. Since the transcription factor model M is extracted in step S3862, the determination in step S3863 becomes Yes, and the process proceeds to step S3864. In step S3864, the transcription factor model M set to the <Input Variable Value> corresponding to the <Input Variable Name>"ColumnCp1" is set as the evaluation target transcription factor model Me. In step S3865, the evaluation process of the evaluation target transcription factor model Me is performed. The evaluation target transcription factor model Me is the same as the transcription factor model M represented by the transcription factor model tag MT illustrated in FIG. 49, so the same process as the evaluation process described above for the transcription factor model tag MT illustrated in FIG. 49 is performed. Since all the transcription factor models M extracted in step S3862 have been evaluated, the determination in step S3866 becomes Yes, and the process proceeds to step S3867. In step S3867, the evaluation process of the original evaluation target transcription factor model Mo is performed.

Referring to FIG. 44, in step S38671, since the <Model ID> of the transcription factor model tag MT representing the original evaluation target transcription factor model Mo is "AppWa.TableWt", the model type of the original evaluation target transcription factor model Mo is identified as a table reference type. In step S38672, since the model type of the original evaluation target transcription factor model Mo is a table reference type, the information searched based on the input data Din is obtained as output data Dout from the table Wt managed by the application Wa. Here, the information of the record from the table Wt managed by the application Wa, where column Cp1 is the case ID of the context data CxD associated with its own process node D30, and column Cp2 is "ColumnCp2Value," is obtained as output data Dout. In step S38673, since the <Evaluation Result Selector Group> of the transcription factor model tag MT representing the original evaluation target transcription factor model Mo is "ColumnWs," the data of column Ws in the output data Dout is determined as the evaluation result R of the original evaluation target transcription factor model Mo.

Subsequently, a case will be described where the evaluation target transcription factor model Me is the transcription factor model M represented by the transcription factor model tag MT illustrated in FIG. 51.

Referring to FIG. 43, in step S3861, the evaluation target transcription factor model Me is set to the original evaluation target transcription factor model Mo. In step S3862, the transcription factor model M, which is set to the <Input Variable Value> corresponding to the <Input Variable Name>"ScriptCode" and the transcription factor model M, which is set to the <Input Variable Value> corresponding to the <Input Variable Name>"InputVvariableDp1" are extracted. Since the transcription factor model M is extracted in step S3862, the determination in step S3863 becomes Yes, and the process proceeds to step S3864. The evaluation process of the transcription factor model M extracted in step S3862 is performed in step S3864 and step S3865.

Since the transcription factor model M, which is set as the <Input Variable Value> corresponding to the <Input Variable Name>"ScriptCode," is of the table reference type, its evaluation process is the same as the evaluation process described above for the transcription factor model tag MT illustrated in FIG. 48 and FIG. 49. Specifically, a record with a script ID of "ScriptIDValue" is retrieved as output data Dout from the script table managed by application Xa, and the data of the script code from the output data Dout is determined as evaluation result R.

Since the transcription factor model M, which is set as the <Input Variable Value> corresponding to the <Input Variable Name>"InputVariableDp1," is the same as the transcription factor model M represented by the transcription factor model tag MT illustrated in FIG. 49, the same evaluation process as described above for the transcription factor model tag MT illustrated in FIG. 49 is performed.

Since all the transcription factor models M extracted in step S3862 have been evaluated, the determination in step S3866 becomes Yes, and the process proceeds to step S3867.

In step S3867, the evaluation process of the original evaluation target transcription factor model Mo is performed.

Referring to FIG. 44, in step S38671, since the <Model ID> of the transcription factor model tag MT representing the original evaluation target transcription factor model Mo is "Script," the model type of the original evaluation target transcription factor model Mo is identified as a script type. In step S38672, since the model type of the original evaluation target transcription factor model Mo is a script type, the execution result of the script executed based on the input data Din is obtained as the output data Dout. Here, the evaluation result R of the transcription factor model M, which is set to the <Input Variable Value> corresponding to the <Input Variable Name>"ScriptCode," is used as the script code, and the script is executed with the script type set to "Python." When executing the script, the value of the input variable Dp1 of the script is set to the evaluation result R of the transcription factor model M corresponding to the <Input Variable Name>"InputVariableDp1", and the value of the input variable Dp2 is set to the "InputVariableDp2Value". In step S38673, the data to be returned as the evaluation result R from the output data Dout is determined based on the <Evaluation Result Selector Group>"EvaluationResultSelectorDs1.EvaluationResultSelectorDs2".

Subsequently, a case will be described where the evaluation target transcription factor model Me is a transcription factor model represented by the transcription factor model tag illustrated in FIG. 52.

Referring to FIG. 43, in step S3861, the evaluation target transcription factor model Me is set to the original evaluation target transcription factor model Mo. In step S3862, the transcription factor model M set as the <Input Variable Value> corresponding to the <Input Variable Name>"MachineLearningModelData" and the transcription factor model M set as the <Input Variable Value> corresponding to the <Input Variable Name>"InputVariableEp1" are extracted. Since the transcription factor model M is extracted in step S3862, the determination in step S3863 becomes Yes, and the process proceeds to step S3864. The evaluation process of the transcription factor model M extracted in step S3862 is performed in step S3864 and step S3865.

The transcription factor model M set as the <Input Variable Value> corresponding to the <Input Variable Name>"MachineLearningModelData" is of the table reference type, and its evaluation process is the same as the aforementioned evaluation process for the transcription factor model tag MT illustrated in FIGS. 48 and 49. Specifically, from the machine learning model table managed by the application Ya, the record where the machine learning model ID is "MachineLearningModelIDValue" is obtained as output data Dout, and from this output data Dout, the model data is determined as evaluation result R.

Since the transcription factor model M, which is set as the <Input Variable Value> corresponding to the <Input Variable Name>"InputVariableEp1," is the same as the transcription factor model M represented by the transcription factor model tag MT illustrated in FIG. 49, the same evaluation process as described above for the transcription factor model tag MT illustrated in FIG. 49 is performed.

Since all the transcription factor models M extracted in step S3862 have been evaluated, the determination in step S3866 becomes Yes, and the process proceeds to step S3867. In step S3867, the evaluation process of the original evaluation target transcription factor model Mo is performed.

Referring to FIG. 44, in step S38671, since the <Model ID> of the transcription factor model tag MT representing In the explanation above using FIGS. 54 to 57, the case where the transcription process definition information PDinfo is included in the action information master DM353 of the process generation information DM35 was explained as an example. However, the operation example can also be understood for the case where the transcription process definition information PDinfo is included in the process generation information DM35 other than the action information master DM353. For example, among the process generation information DM35, the transcription process definition information PDinfo may be included in the process number master DM351. Specifically, process number master DM351 may include transcription process definition information PDinfo, which is configured such that process number D351 is determined according to the evaluation result R of the transcription factor model M defined by the transcription factor model definition information MDinfo. According to this, the process execution system 300 can change the process number D351 according to the environment E with which the process execution system 300 is communicable. Therefore, when the state transition process for the process network state management unit 360 is determined according to the process number D351 as described above with reference to FIGS. 12 to 14, the process execution system 300 can change the order of the process nodes D30 to be executed according to the environment E with which the process execution system 300 is communicable.

Effects

The process execution system 300 according to the present embodiment further includes a transcription unit 380 configured to execute a transcription process for transcribing the process generation information DM35 associated with one process master node DM30 into one process node corresponding to the one process master node DM30 as the process definition information D35. The process generation information DM35 includes at least one piece of transcription process definition information PDinfo defining the transcription process. The transcription process definition information PDinfo includes at least one piece of transcription factor model definition information MDinfo defining a transcription factor model M, the transcription factor model M modeling an influence of an environment E with which the process execution system 300 is communicable on the transcription process. Transcription unit 380 is configured to include a transcription request acceptance unit 381 configured to accept an execution request for the transcription process, a transcription factor model evaluation unit 382 configured to evaluate the transcription factor model M defined by the transcription factor model definition information MDinfo, and a transcription process execution unit 383 configured to execute the transcription process defined by the transcription process definition information PDinfo. The transcription process execution unit 383 is configured to control the transcription process based on evaluation results R of one or more transcription factor models M evaluated by the transcription factor model evaluation unit 382

According to the process execution system 300 of the present embodiment, the process definition information D35, which defines content of the process, can be modified by the transcription factor model M, which models the influence of the environment E, with which the process execution system 300 is communicable, on the transcription process. That is, the process execution system 300 can change the content of the processes executed by the process network execution unit 370 according to the environment E with which the process execution system 300 is communicable. Therefore, according to the process execution system 300 of the present embodiment, it becomes possible to provide a process execution system 300 with high adaptability to rapidly changing business environments.

The process network execution unit 370 of the process execution system 300 according to the present embodiment is configured to, when executing the process defined by the process definition information D35, send the execution request for the transcription process to the transcription request acceptance unit 381, thereby executing the process based on the process definition information D35 updated by the transcription unit 380 transcribing the process generation information DM35 used to generate the process definition information D35.

According to this, when the process network execution unit 370 executes the process defined by the process definition information D35, the process execution system 300 can execute the process based on the process definition information D35 that has been automatically updated according to the environment E with which the process execution system 300 is communicable. Therefore, according to the process execution system 300 of the present embodiment, it becomes possible to provide a process execution system 300 with even higher adaptability to rapidly changing business environments by achieving a balance between plasticity and stability.

The transcription factor model evaluation unit 382 is configured to, when evaluating one transcription factor model M, use evaluation results R of the other transcription factor models M as input data Din for the one transcription factor model M.

According to this, the transcription factor model evaluation unit 382 can evaluate the transcription factor model M, which has a structure similar to a higher-order function that takes a function as an argument. Therefore, the complex influence of the environment E, with which the process execution system 300 is communicable, on the transcription process can be modeled. Therefore, according to the process execution system 300 of the present embodiment, it becomes possible to provide a process execution system with even higher adaptability to rapidly changing business environments by achieving a balance between plasticity and stability.

(Variant)

By modifying the configuration of the third embodiment described above, it is possible to change the structure of the process network D3 according to the environment E with which the process execution system 300 is communicable.

FIG. 58 is a schematic diagram illustrating a data structure of a process network D3 generated by the process network generation unit 350 of the process execution system 300 according to the present variant. FIG. 59 is a schematic diagram illustrating a data structure of a process network model DM3 accepted as input by a process network model input unit 351 of the process execution system 300 according to the present variant. FIG. 60 is a schematic diagram illustrating a data structure of the process master node DM30 of the process network model DM3, for which the process network model input unit 351 of the process execution system 300 according to the present variant. FIG. 61 is a schematic diagram illustrating a data structure of a process node D30 in a process network D3 generated by the process network generation unit 350 of the process execution system 300 according to the present variant. The process execution system 300 according to the present variant will be described below.

As shown in FIG. 58, the process definition information D35 of the process execution system 300 according to the present variant includes an active flag D356 that indicates whether the process node D30 having the process definition information D35 is active or inactive.

As shown in FIG. 59, the process generation information DM35 of the process execution system 300 according to the present variant includes the active flag master DM356, which is used to generate the active flag D356.

Referring to FIG. 60 and FIG. 61, the active flag master DM356 includes transcription process definition information PDinfo, which is configured such that the active flag D356 is determined according to the evaluation result R of the transcription factor model M defined by the transcription factor model definition information MDinfo.

The process network state management unit 360 treats the process node D30 as if they did not exist when the active flag D356 included in the process definition information D35 associated with the process node D30 indicates that it is inactive. Specifically, the process network state management unit 360, when extracting process nodes D30 (for example, in step S1321 of FIG. 13), ensures that if the active flag D356 included in the process definition information D35 associated with the process node D30 indicates that it is inactive, the process node D30 is not included in the extraction results. According to this, when the active flag D356 included in the process definition information D35 associated with process node D30 indicates that it is inactive, process node D30 will not enter the executable state and will be treated as if it does not substantially exist. Therefore, when the process network D3 is generated, the structure of the process network D3 will change according to the environment E with which the process execution system 300 is communicable.

The process network generation unit 350, when generating the process network D3, transcribes the process generation information DM35 associated with one of the process master nodes DM30 included in the process network model DM3 accepted as input by the process network model input unit 351, into the process node D30 corresponding to the one process master node DM30 as process definition information D35 by sending an execution request for the transcription process to the transcription request acceptance unit 381.

Effects

The process definition information D35 of the process execution system 300 according to the present variant an active flag D356 indicating whether the process having the process definition information D35 is active or inactive. The process generation information DM35 of the process execution system 300 according to the present variant includes an active flag master DM356 used to generate the active flag D356. The active flag master DM356 includes the transcription process definition information TDinfo configured to determine the active flag D356 based on evaluation results R of the transcription factor models M. The process network state management unit 360 treats the process node D30 as if they did not exist when the active flag D356 included in the process definition information D35 associated with the process node D30 indicates that it is inactive.

According to this, the process execution system 300 can change the structure of the process network D3 according to the environment E with which the process execution system 300 is communicable. Therefore, according to the present variant of the process execution system 300, it becomes possible to provide a process execution system with even higher adaptability to rapidly changing business environments by achieving a balance between plasticity and stability.

In the process execution system 300 according to the present variant, the process network generation unit 350, when generating the process network D3, transcribes the process generation information DM35 of one of the process master nodes DM30 included in the process network model DM3 accepted as input by the process network model input unit 351 into process definition information D35 for the process node D30 corresponding to said one process master node DM30 by sending an execution request for the transcription process to the transcription request acceptance unit 381.

According to this, at the time of generating process network D3, the process execution system 300 can change the structure of process network D3 according to the environment E with which the process execution system 300 is communicable. Therefore, according to the present variant of the process execution system 300, it becomes possible to provide a process execution system 300 with even higher adaptability to rapidly changing business environments by achieving a balance between plasticity and stability.

Fourth Embodiment

The process network model (Executable Process Network) accepted as input by the process network model input unit of the process execution system according to Embodiment 1, Embodiment 2, and Embodiment 3 described above has various notable features different from BPMN (Business Process Modeling Notation), which is commonly used to represent business processes.

For example, in BPMN, a gate representing a control flow (such as AND split, XOR split, etc.) is placed between an activity and another activity. On the other hand, in the process network model accepted as input by the process network model input unit of the process execution system according to Embodiments 1, 2, and 3 described above, it is not necessary to place gates representing control flows between processes.

This is because a complex control flow can be achieved through the interaction between processes. For example, if you want to selectively execute either one process node or another process node based on the execution result of a process node that is executed before them (hereinafter referred to as a conditional branch process node), which corresponds to an XOR split, the following procedure can be followed. That is, by executing the action defined in the conditional branch process node, a process state change request for changing the state of either one process node or another process node to the completed state is sent to the process state change request acceptance unit. Whether to change one process node or another process node to the completed state is conditioned based on the execution result of the action defined in the conditional branch process node. According to this, among one process node or other process nodes, the process node that was not changed to the completed state based on the execution result of the action defined in the conditional branch process node is executed. It should be noted that for the execution of sequential process nodes that do not require complex control flow, the process state change request acceptance unit may not be necessary.

In recent years, by shifting the perspective from Networks as Things to Networks as Processes and understanding the world through the interactions between processes, the possibility of integratively handling all kinds of systems, such as physical systems, quantum computing, intelligent systems, biological systems, information systems, and social systems, has been suggested. (Bob Coecke, Aleks Kissinger, "Picturing Quantum Processes: A First Course in Quantum Theory and Diagrammatic Reasoning", Cambridge University Press, 2017. John C. Baez, Mike Stay, "Physics, Topology, Logic and Computation: A Rosetta Stone", arXiv, 2009. Uri Alon, "An Introduction to Systems Biology: Design Principles of Biological Circuits", 2nd edition, Chapman and Hall/CRC, 2019. Saunders Mac Lane, "Categories for the Working Mathematician", Springer, 1978. Ludwig Von Bertalanffy, "General System Theory", Allen Lane, 1972). Focusing on the network that expresses the interactions between processes, the process execution system according to the embodiment of the present invention, which uses an executable process network, can facilitate interconnection with any other system by shifting the perspective to Networks as Processes. Therefore, the process execution system according to the embodiment of the present invention can easily enhance adaptability to rapidly changing business environments by achieving a balance between plasticity and stability.

The fourth embodiment and the fifth embodiment described below have a configuration that exhibits advantageous effects due to the remarkable feature that it is not necessary to place gates representing control flow between processes in the process network model.

The process execution system 400 according to the fourth embodiment, in summary, differs from the process execution system 200 according to the second embodiment in that it has a process network model output unit 452 that serializes and outputs the process network model DM4, and a process network model input unit 451 that accepts an input of the serialized process network model DM4. According to the process execution system 400 of the fourth embodiment, it becomes easier to use the process network model DM4, which is used in one process execution system 400, in another process execution system 400, thereby improving interoperability. The process execution system 400 according to the fourth embodiment can be configured similarly to the process execution system 200 according to the second embodiment, except for the configuration specifically described below.

FIG. 62 is a functional block diagram of the process network generation unit 450 of the process execution system 400 according to the present embodiment. FIG. 63 is a schematic diagram illustrating data serialized by the process network model output unit 452 of the process execution system 400 according to the present embodiment. The process execution system 400 according to the present embodiment will be described below.

Referring to FIG. 62, the process network generation unit 450 according to the present embodiment further includes a process network model output unit 452 that outputs a process network model DM4. The process network model output unit 452 outputs the serialized data MDout of the process network model DM4.

The process network model input unit 451 according to the present embodiment accepts an input of serialized data of the process network model DM4. The process network generation unit 450 generates the process network D4 using the process network model DM4 obtained by deserializing the serialized data of the process network model DM4 accepted as input by the process network model input unit 451.

The process network model output unit 452 serializes the process network model DM4 based on a rule that the process network model DM4 and the serialized data MDout of the process network model DM4 have a one-to-one correspondence.

The one-to-one correspondence between the process network model DM4 and the serialized data MDout of the process network model DM4 means that if the process network model DM4 is identical, the serialized data MDout will be identical, and if the process network model DM4 is different, the serialized data MDout will be different. Conversely, if the serialized data MDout is identical, the process network model DM4 will be identical, and if the serialized data MDout is different, the process network model DM4 will be different.

The rule for the one-to-one correspondence between the process network model DM4 and the serialized data MDout of the process network model DM4 can be, for example, a rule that arranges the process master nodes in ascending or descending order based on the value of the process number master DM451. In the case of a hierarchical process network model DM4, the rule for the one-to-one correspondence between the process network model DM4 and the serialized data MDout output from the process network model DM4 can be a rule that arranges the nodes in a depth-first order and, within the same hierarchical level, in ascending or descending order based on the value of the process number master DM45

The data format used by the process network model output unit 452 when outputting the serialized data MDout of the process network model DM4 is not limited as long as the process network model DM4, which was the target of serialization, can be restored by deserializing the serialized data MDout.

The data format used by the process network model output unit 452 when outputting the serialized data MDout of the process network model DM4 can be, for example, JSON, XML (Extensible Markup Language), YAML, or CSV. Preferably, the data format used by the process network model output unit 452 to output the serialized data MDout of the process network model DM4 is an array of key-value pairs. More preferably, the data format used by the process network model output unit 452 to output the serialized data MDout of the process network model DM4 is JSON (JavaScript Object Notation).

When the data format used by the process network model output unit 452 to output the serialized data MDout of the process network model DM4 is an array of key-value pairs, the values can be configured to represent data in various types such as string, numeric, Boolean, date, and list. Furthermore, the values can be configured as a list whose elements are data consisting of key-value pairs.

FIG. 63 is a schematic diagram illustrating data serialized by the process network model output unit 452. FIG. 63 illustrates a case where the data format used by the process network model output unit 452 to output the serialized data MDout of the process network model DM4 is JSON. FIG. 63 illustrates a case where the process master node has a data structure exemplified in FIG. 7 according to Embodiment 1. The process master node can also be serialized in the same manner when it has a data structure according to the second embodiment illustrated in FIG. 24.

Referring to FIG. 63, the data of one process master node DM40 has "Process Generation Information" and "Child Process Master Node Group" as keys. The value corresponding to the key "Process Generation Information" is data in which the process generation information included in one process master node DM40 is arranged in key-value pairs. The value corresponding to the key "Child Process Master Node Group" is a list that arranges the data of each process master node DM40 included in the group of child process master nodes directly under one process master node DM40. If there is no child process master node DM40 directly under one process master node DM40, the list stored in the value corresponding to the key "Child Process Master Node Group" will be empty.

Effects

The process network generation unit 450 of the process execution system 400 according to the present embodiment includes a process network model output unit 452 configured to output a process network model DM4. The process network model output unit 452 is configured to output the process network model DM4.

According to this, it becomes easier to use the process network model DM4, which is used in one process execution system 400, in another process execution system 400, thereby improving interoperability. Therefore, according to the process execution system 400 of the present embodiment, it becomes possible to provide a process execution system 400 with higher adaptability to rapidly changing business environments by achieving a balance between plasticity and stability.

According to the process execution system 400 of the present embodiment, it is not necessary to place gates representing control flows between processes in the process network model DM4. Therefore, compared to models expressed in notations with gates such as BPMN, the serialization of the process network model DM4 is easier.

The process network model input unit 451 of the process execution system 400 according to the present embodiment is configured to accept an input of serialized data of the process network model DM4. The process network generation unit 450 is configured to generate the process network D4 using the process network model DM4 obtained by deserializing the serialized data of the process network model DM4 accepted as input by the process network model input unit 451.

According to this, a process network model DM4 used in one process execution system 400 can be directly input and used in another process execution system 400, thereby improving interoperability. Therefore, according to the process execution system 400 of the present embodiment, it becomes possible to provide a process execution system 400 with even higher adaptability to rapidly changing business environments by achieving a balance between plasticity and stability.

In operating the process execution system 400, it is very important to make it easy to identify the differences between a process network model DM4 and other process network models DM4. For example, since the process network model DM4 is also modified when the business process is changed, it is preferable to manage the version of the process network model DM4. In this regard, ensuring that the differences between the process network model DM4 before and after the version upgrade can be easily confirmed is extremely important for ensuring the quality of operations using the process execution system 400.

The process network model output unit 452 of the process execution system 400 according to the present embodiment is configured to serialize the process network model DM4 based on a rule that the process network model DM4 and the serialized data of the process network model DM4 have a one-to-one correspondence.

This facilitates the identification of differences in the process network model DM4. For example, by comparing the serialized data of the process network model DM4 before and after the version upgrade using general-purpose text data comparison software, it is easy to identify the changes. Therefore, according to the process execution system 400 of the present embodiment, it becomes possible to provide a process execution system 400 with even higher adaptability to rapidly changing business environments by achieving a balance between plasticity and stability.

On the other hand, in the case of notations with gates such as BPMN, especially when gates are added or deleted, the serialized data of the model often changes significantly, making it difficult to confirm the modified parts.

In the process execution system 400 according to the present embodiment, the data format used by the process network model output unit 452 to output the serialized data MDout of the process network model DM4 is an array of key-value pairs.

According to this, the size of the serialized data of the process network model DM4 is reduced, and readability is improved. Therefore, according to the process execution system 400 of the present embodiment, it becomes possible to provide a process execution system 400 with even higher adaptability to rapidly changing business environments by achieving a balance between plasticity and stability.

On the other hand, in the case of notations with gates such as BPMN, it is difficult to express the relationship between activities and gates in a data format with key-value pair arrangement. Therefore, in the case of notations with gates such as BPMN, the serialized data of the model is often in a data format where strings are enclosed with predetermined tags, like XML. As a result, in the case of notations with gates such as BPMN, the serialized data of the model tends to be large in size, and it is often difficult for humans to read and understand the serialized data of the model.

In the process execution system 400 according to the present embodiment, the data format used by the process network model output unit 452 to output the serialized data MDout of the process network model DM4 is JSON.

JSON is a data format currently widely used for exchanging data between different systems, particularly between different systems connected via networks such as the Internet. By using JSON as the data format when the process network model output unit 452 outputs the serialized data of the process network model DM4, it becomes easier to use the process network model DM4, which is used in one process execution system 400, in another process execution system 400, thereby improving interoperability. Therefore, according to the process execution system 400 of the present embodiment, it becomes possible to provide a process execution system 400 with even higher adaptability to rapidly changing business environments by achieving a balance between plasticity and stability.

Fifth Embodiment

The process execution system 500 according to the fifth embodiment, in summary, differs from the process execution system 200 according to the second embodiment in that the control unit 510 further includes a process network model display unit 590 and a process network display unit 595 configured to display the process network D5. According to the process execution system 500 of the fifth embodiment, since the process network model DM5 and the process network D5 can be visualized, it becomes easier to ensure the quality of operations even if the complexity of the process network model DM5 and the process network D5 increases. The process execution system 500 according to the fifth embodiment can be configured similarly to the process execution system 200 according to the second embodiment, except for the configuration specifically described below.

Figure 64:
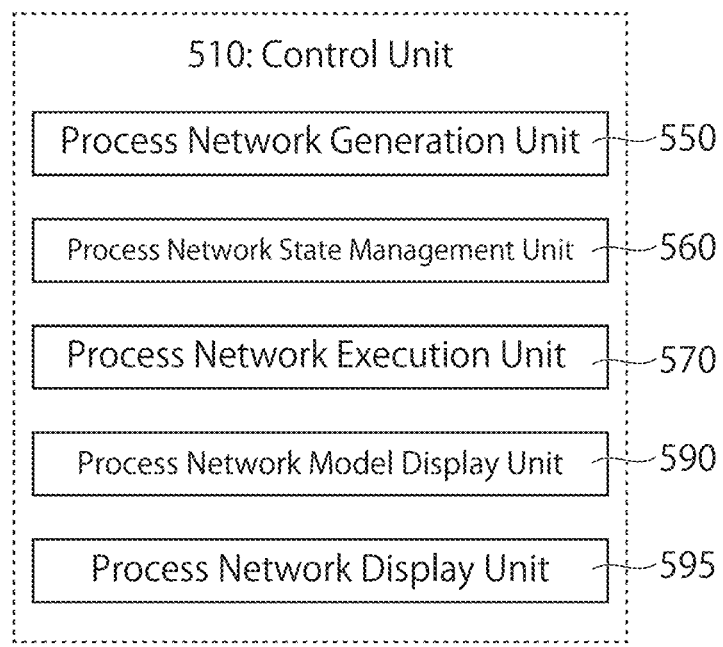
FIG. 64 is a functional block diagram of the control unit of the process execution system according to the fifth embodiment of the present invention.
Figure 65:
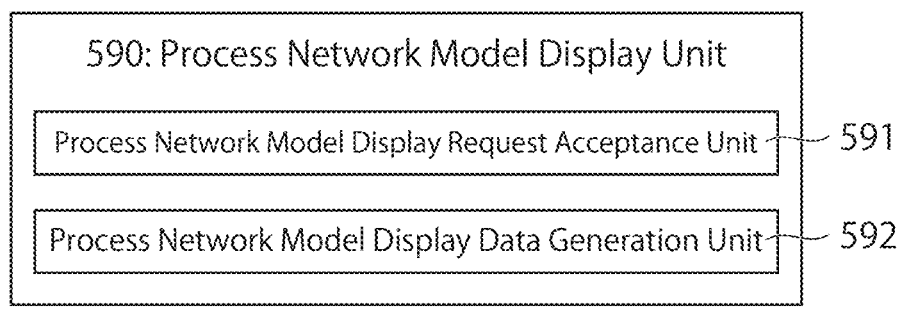
FIG. 65 is a functional block diagram of the process network model display unit of the process execution system according to the fifth embodiment of the present invention.
Figure 66:
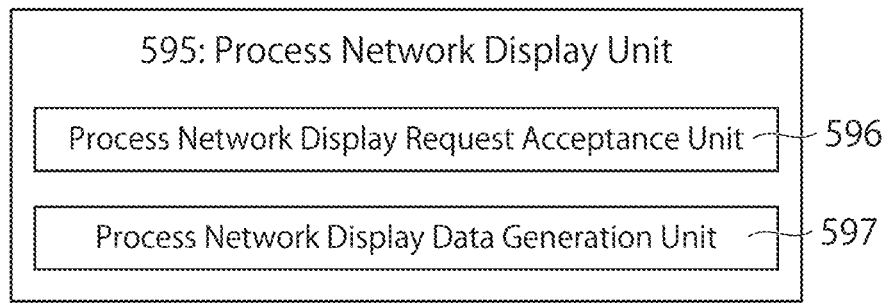
FIG. 66 is a functional block diagram of the process network display unit of the process execution system according to the fifth embodiment of the present invention.
Figure 67:
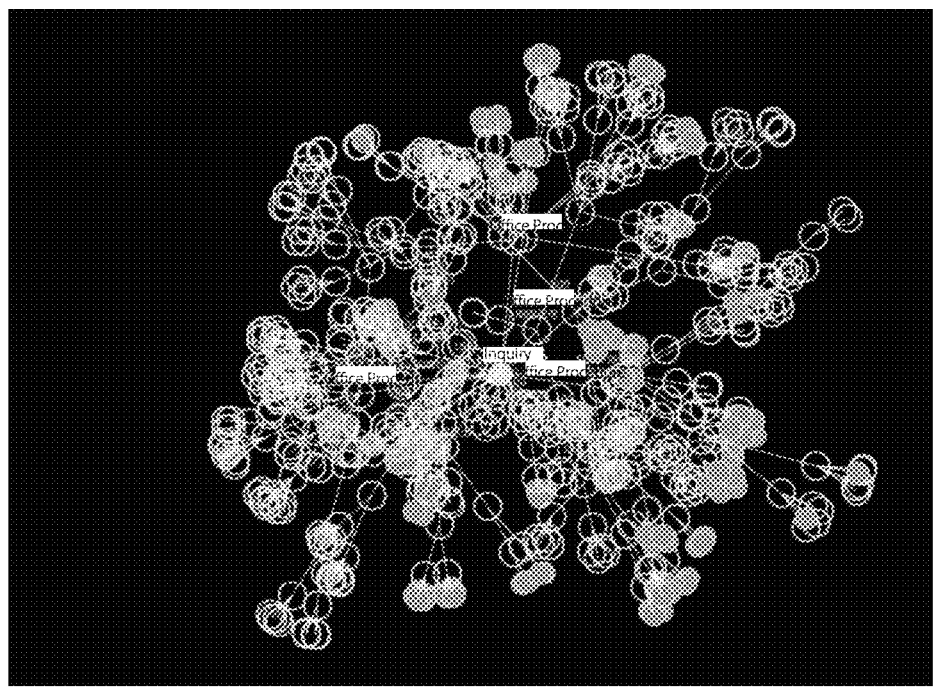
FIG. 67 is a diagram showing an appearance of a process network model as displayed by the process network model display unit of the process execution system according to the fifth embodiment of the present invention.
Figure 68:
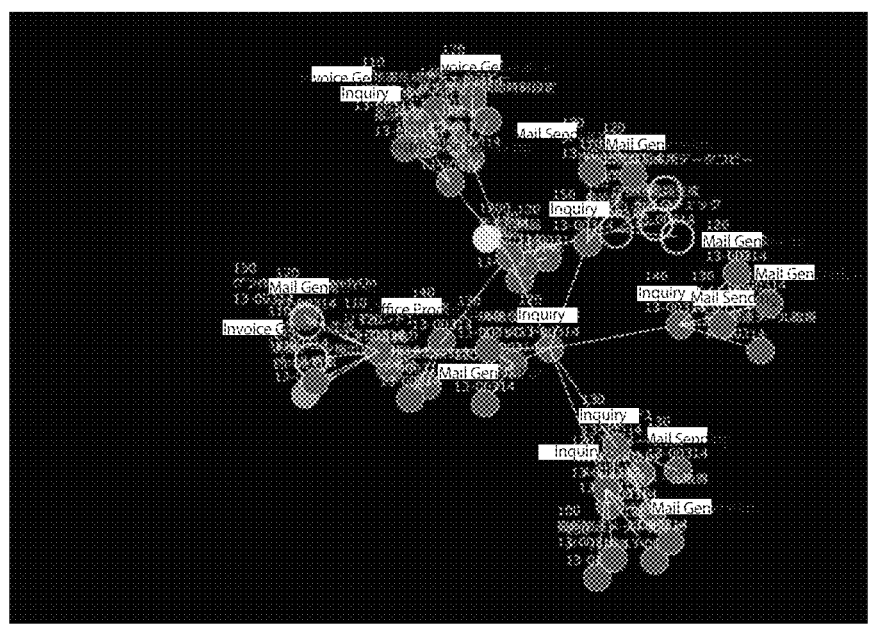
FIG. 68 is a diagram showing an appearance of a process network as displayed by the process network display unit of the process execution system according to the fifth embodiment of the present invention.

FIG. 64 is a functional block diagram of the control unit 510 of the process execution system 300 according to the present embodiment. FIG. 65 is a functional block diagram of a process network model display unit 590 of a process execution system 500 according to the present embodiment. FIG. 66 is a functional block diagram of the process network display unit 595 of the process execution system according to the present embodiment. FIG. 67 is a diagram showing the appearance of the process network model DM5 as displayed by the process network model display unit 590 of the process execution system 500 according to the present embodiment. FIG. 68 is a diagram showing the appearance of the process network D5 as displayed by the process network display unit 595 of the process execution system 500 according to the present embodiment. The process execution system 500 according to the fifth embodiment will be described below.

Referring to FIG. 64, the control unit 510 of the process execution system 500 according to the present embodiment further includes a process network model display unit 590 configured to display the process network model DM5, and a process network display unit 595 configured to display the process network D5.

Referring to FIG. 65, the process network model display unit 590 includes a process network model display request acceptance unit 591 that accepts a display request for the process network model DM5, and a process network model display data generation unit 592 that generates process network model display data for displaying the process network model DM5 at the source of the request.

The process network model display unit 590, upon the process network model display request acceptance unit 591 accepting a display request, generates process network model display data in the process network model display data generation unit 592 and sends the process network model display data back to the source of the request.

The method by which the process network model display request acceptance unit 591 accepts a display request is not particularly limited. For example, display requests for the process network model DM5 may be accepted through communication using HTTP.

The process network model display data generation unit 592 generates process network model 3D display data for three-dimensional display of the process network model DM5 at the source of the display request.

The process network model 3D display data represents the process network model DM5 as a three-dimensional network structure, where the process master nodes DM50 included in the process network model DM5 are the nodes, and the relationships between the process master nodes DM50 are the edges. In the case of a hierarchical process network model DM5, the process network model 3D display data represents the process network model DM5 as a three-dimensional network structure, where the process master nodes DM50 included in the process network model DM5 are the nodes, and the parent-child relationships between the process master nodes DM50 are the edges.

The method for generating process network model 3D display data is not particularly limited. For example, by using libraries such as NetworkX, which are available from the programming language Python, it is possible to generate process network model 3D display data by assigning three-dimensional coordinates to the process master node DM50.

The display request for the process network model DM5 includes process network model display control information that controls the visual representation of the process network model DM5 at the source of the display request of the process network model DM5.

The process network model display data generation unit 592 generates process network model display data such that the visual representation of the process network model DM5 at the source of the display request of the process network model DM5 changes according to the process network model display control information.

Changes in the visual representation of the process network model DM5 in accordance with the process network model display control information are, for example, a combination of at least one or more changes in the visual representation selected from the group consisting of rotation, enlargement, reduction, and translation of the process network model DM5. Changes in the visual representation of the process network model DM5 according to the process network model display control information may be the display and non-display of information related to the process master node DM50 included in the process network model DM5.

The method by which the process network model display request acceptance unit 591 accepts a display request of the process network model DM5, which includes process network model display control information, is not particularly limited. For example, by using libraries such as Plotly, which can be used from the programming language Python, the process network model display request acceptance unit 591 can accept a display request for the process network model DM5 that includes process network model display control information.

The method by which the process network model display unit 590 returns the process network model display data to the source of the display request for the process network model DM5 is not particularly limited. For example, it can be configured to return process network model display data via communication using HTTP.

The process network model display unit 590 may display information related to each process master node DM50 included in the process network model DM5 for each process master node DM50. The process network model display unit 590 may represent information related to the process master node DM50 included in the process network model DM5 using the color and shape of the nodes. For example, the process network model display unit 590 may change the color or shape of the node according to the values of the asynchronous flag master DM554 and the auto-start flag master DM555 included in the process generation information of the process master node DM50.

Referring to FIG. 66, the process network display unit 595 includes a process network display request acceptance unit 596 that accepts a display request for the process network D5, and a process network display data generation unit 597 that generates process network display data for displaying the process network D5 at the source of the request.

When the process network display request acceptance unit 596 accepts a display request for the process network D5, the process network display unit 595 generates process network display data in the process network display data generation unit 597 and sends the process network display data back to the source of the display request.

The method by which the process network display request acceptance unit 596 accepts a display request for the process network D5 is not particularly limited and can be configured similarly to the process network model display request acceptance unit 591.

The process network display data generation unit 597 generates process network 3D display data for three-dimensional display of the process network D5 at the source of the display request for the process network D5.

The process network 3D display data represents the process network D5 as a three-dimensional network structure, where the process nodes D50 included in the process network D5 are the nodes, and the relationships between the process nodes D50 are the edges. In the case of a hierarchical process network D5, the process network 3D display data represents the process network D5 as a three-dimensional network structure, where the process nodes D50 included in the process network D5 are the nodes, and the parent-child relationships between the process nodes D50 are the edges.

The method for generating process network 3D display data is not particularly limited and can be configured in the same manner as the method for generating process network model 3D display data.

The display request for the process network D5 includes process network display control information that controls the visual representation of the process network D5 at the source of the display request for the process network D5.

The process network display data generation unit 597 generates process network display data such that the visual representation of the process network D5 at the source of the display request for the process network D5 changes according to the process network display control information.

Changes in the visual representation of the process network D5 in accordance with the process network display control information are, for example, a combination of at least one or more changes in the visual representation selected from the group consisting of rotation, enlargement, reduction, and translation of the process network D5. Changes in the visual representation of the process network D5 according to the process network display control information may be the display and non-display of information related to the process node D50 included in the process network D5.

The method by which the process network display request acceptance unit 596 accepts a display request for the process network D5, which includes process network display control information, is not particularly limited and can be configured similarly to the process network model display request acceptance unit 591.

The method by which the process network display unit 595 returns process network display data to the source of the display request for the process network D5 is not particularly limited and can be configured similarly to the process network model display unit 590.

The process network display unit 595 may display information related to each process node D50 included in the process network D5 for each process node D50. The process network display unit 595 may represent information related to the process node D50 included in the process network D5 using the color and shape of the node. For example, the process network display unit 595 may change the color or shape of the node according to the process state D53 of the process node D50.

FIG. 67 is a diagram showing the process network model DM5 displayed in 3D on a browser, achieved by making a display request for the process network model DM5 to the process network model display unit 590 via HTTP communication from the browser, and then displaying the process network model DM5 using the process network model 3D display data returned by the process network model display unit 590. The process network model DM5 displayed in the browser can be rotated, enlarged, reduced, and translated through mouse operations on the browser. Additionally, when the mouse is hovered over the process master node DM50 included in the process network model DM5 displayed in the browser, the process generation information of the process master node DM50 can be displayed via a popup.

FIG. 68 is a diagram showing the process network D5 displayed in 3D on a browser, achieved by making a display request for the process network D5 to the process network display unit 595 via HTTP communication from the browser, and then displaying the process network D5 using the process network 3D display data returned by the process network display unit 595. The process network D5 displayed in the browser can be rotated, enlarged, reduced, and translated through mouse operations on the browser. Additionally, when the mouse is hovered over process node D50 included in process network D5 displayed in the browser, the process definition information of process node D50 can also be displayed via a popup.

Effects

The visualization of the process network model DM5 is extremely important in ensuring the quality of operations using the process execution system 500. In particular, when the number of process master nodes DM50 included in the process network model DM5 increases and the complexity of the model increases, the visualization of the process network model DM5 plays a very important role in ensuring the quality of operations using the process execution system 500.

The process execution system 500 according to the present embodiment further includes the process network model display unit 590 configured to display the process network model DM5.

According to this, even if the number of process master nodes DM50 included in the process network model DM5 increases and the complexity of the model increases, it becomes easier to ensure the quality of operations using the process execution system 500. Therefore, according to the process execution system 500 of the present embodiment, it is possible to provide a process execution system 500 with even higher adaptability to rapidly changing business environments by balancing both plasticity and stability.

On the other hand, in the case of notations with gates such as BPMN, when the model is visualized, gates and activities are displayed mixed together, making it often difficult to verify the model. In particular, even when visualizing hierarchical models or complex models that include many activities and gates, visibility is poor, and it is often difficult to verify the models.

The process network model display unit 590 of the process execution system 500 according to the present embodiment includes a process network model display request acceptance unit 591 that accepts a display request for the process network model DM5, and a process network model display data generation unit 592 that generates process network model display data for displaying the process network model DM5 at the source of the request. The process network model display data generation unit 592 generates process network model 3D display data for three-dimensionally displaying the process network model DM5 at the source of the request for displaying the process network model DM5.

According to this, even if the number of process master nodes DM50 included in the process network model DM5 increases and the complexity of the model increases, it becomes easier to ensure the quality of operations using the process execution system 500. Therefore, according to the process execution system 500 of the present embodiment, it becomes possible to provide a process execution system 500 with even higher adaptability to rapidly changing business environments by achieving a balance between plasticity and stability.

The process network model display unit 590 of the process execution system 500 according to the present embodiment displays information related to each process master node DM50 included in the process network model DM5.

According to this, even if the number of process master nodes DM50 included in the process network model DM5 increases and the complexity of the model increases, the process model can be easily verified. Therefore, according to the process execution system 500 of the present embodiment, it becomes possible to provide a process execution system 500 with even higher adaptability to rapidly changing business environments by achieving a balance between plasticity and stability.

The visualization of the process network D5 is extremely important in ensuring the quality of operations using the process execution system 500. In particular, when the number of process nodes D50 included in the process network D5 increases and the complexity of the model increases, the visualization of the process network D5 plays a very important role in ensuring the quality of operations using the process execution system 500.

The process execution system 500 according to the present embodiment further includes a process network display unit 595 configured to display the process network D5.

According to this, even if the number of process nodes D50 included in the process network D5 increases and the complexity of the model increases, it becomes easier to ensure the quality of operations using process execution system 500. Therefore, according to the process execution system 500 of the present embodiment, it becomes possible to provide a process execution system 500 with even higher adaptability to rapidly changing business environments by achieving a balance between plasticity and stability.

The process network display unit 595 of the process execution system 500 according to the present example includes a process network display request acceptance unit 596 that accepts a display request for the process network D5, and a process network display data generation unit 597 that generates process network display data for displaying the process network D5 at the source of the request. The process network display data generation unit 597 generates process network 3D display data for three-dimensional display of the process network D5 at the source of the request for the display request for the process network D5.

According to this, even if the number of process nodes D50 included in the process network D5 increases and the complexity of the model increases, it becomes easier to ensure the quality of operations using process execution system 500. Therefore, according to the process execution system 500 of the present embodiment, it becomes possible to provide a process execution system 500 with even higher adaptability to rapidly changing business environments by achieving a balance between plasticity and stability.

The process network display unit 595 of the process execution system 500 according to the present example displays information related to each process node D50 included in the process network D5.

According to this, even if the number of process nodes D50 included in process network D5 increases and the complexity of the model increases, it becomes easier to monitor the execution status of the process. Therefore, according to the process execution system 500 of the present embodiment, it becomes possible to provide a process execution system 500 with even higher adaptability to rapidly changing business environments by achieving a balance between plasticity and stability.

Example

The effects of the present invention will be described more specifically using examples. However, the technical scope of the present invention is not limited to the present example alone. This example will be described based on the configuration of the process execution system 200 according to the aforementioned second embodiment, but the effects and advantages of the process execution system 100 according to the aforementioned first embodiment, the process execution system 300 according to the third embodiment, the process execution system 400 according to the fourth embodiment, and the process execution system 500 according to the fifth embodiment can also be understood based on the present example.

The process execution system 200 according to the present example operates on an on-premises server. The control unit 210 of the process execution system 200 according to the present example is composed of a CPU (Central Processing Unit) and memory such as RAM (Random Access Memory), ROM (Read Only Memory) included in an on-premises server. The storage unit 220 of the process execution system 200 according to the present embodiment is configured with an SSD (Solid State Drive) or the like included in an on-premises server. The communication unit 230 of the process execution system 200 according to the present example is composed of an interface circuit (such as a LAN card) included in an on-premises server.

The action execution system 50 used in the present example is composed of Power Automate and Power Automate for desktop, which are cloud services by Microsoft Corporation under MICROSOFT 365 (registered trademark).

The control unit 210 of the process execution system 200 according to the present example functions as a process network generation unit 250, a process network state management unit 260, and a process network execution unit 270. The process network generation unit 250, the process network state management unit 260, and the process network execution unit 270 are implemented as functions of a web application built using Django, a framework for creating web applications.

The storage unit 220 of the process execution system 200 according to the present example functions as a database server. The database server is configured using PostgreSQL. The process network model DM1 and process network D1 are stored in the storage unit 220 functioning as a database server.

The communication unit 230 of the process execution system 200 according to the present example functions as a gateway server communicating with cloud services. According to this, communication can be performed between an on-premises server and a cloud service. In the present example, the communication unit 130 is made to function as a gateway server using the on-premises data gateway provided by Microsoft Corporation. By using the on-premises data gateway, access to the process execution system 200 from Power Automate, functioning as the action execution system 50, can be achieved via the API.

The process network model input unit 151 of the process network generation unit 250 has a Graphical User Interface (GUI) that allows for the registration and manipulation of the process network model DM2 by accessing it through a web browser.

The process network state management unit 260 is configured as part of the library that constitutes the web application. The library constituting the process network state management unit 260 is executed from a task that is periodically initiated by the task scheduler of the Windows (registered trademark) operating system from Microsoft Corporation. According to this, the process network state management unit 260 can periodically execute the state transition process for process nodes D20 included in the process network D2. The process network state management unit 260 has an API that accepts state change requests for a process. By using the API, it is possible to change the state of a specific process node D20 from action execution system 50.

The process network execution unit 270 is configured as part of the library that constitutes the web application. The library constituting the process network execution unit 270 can be executed from tasks that are periodically initiated by the task scheduler of the Windows (registered trademark) operating system from Microsoft Corporation. According to this, the process network execution unit 270 can periodically perform the execution process of executable process nodes D20.

In the present example, the process network execution unit 270 transitions the process state D23 of the executable process node D20 to the running state when starting the execution process of process nodes D20. Additionally, the process network execution unit 270 transitions the process state D23 of the process node D20 to the waiting state when the process of the process node D20 with the asynchronous flag D254 set to True is completed. Additionally, in step S1326 (see FIG. 13) and step S13245 (see FIG. 14), the process network state management unit 260 does not change the process state D23 of the process node D20 if the process state D23 of the process node D20 is in the running state or the waiting state.

In the present example, the process execution system 200 is used to process a business process related to the payment of patent annuities to the patent office.

The context data of the cases for which patent annuities are to be paid is stored in a storage unit 220 functioning as a database server. The context data of the cases for which patent annuities are to be paid includes information such as the application number, applicant, number of claims, the share of each applicant, and whether there is a reduction in patent fees. The context data of the cases for which patent annuities are to be paid can be obtained from the storage unit 220 functioning as a database server, using the case number uniquely set for each case as the primary key.

The storage unit 220, functioning as a database server, is accessible from Power Automate or Power Automate for desktop, functioning as an action execution system, via the communication unit 230, functioning as a gateway server. By using actions such as sending SQL queries of Power Automate or Power Automate for desktop, it is possible to retrieve context data of a specific case using the case number as a key from the storage unit 220 functioning as a database server via the communication unit 230.

The context data such as case numbers is embedded in the API data of the action item when the process network generation unit 250 generates the process network D1 from the process network model DM1 using the context data. Embedding for API data is performed using a mechanism similar to the Django Template Language used by the Django template engine. That is, the embedding for the API data is performed by replacing the tags embedded in the API data master of the action item master DM1531 of the process network model DM1 based on the context data.

Referring to FIGS. 69 to 73, the process network model DM2 and the process network D2 used in the present example will be described. FIGS. 69 to 73 are schematic diagrams showing part of a data structures of the process network model and the process network used to explain the processes executed in the process execution system according to the present example. The process network generation unit 250 generates a process network D2 that includes a plurality of process nodes corresponding one-to-one with the process master nodes included in the process network model DM2.

Figure 69:
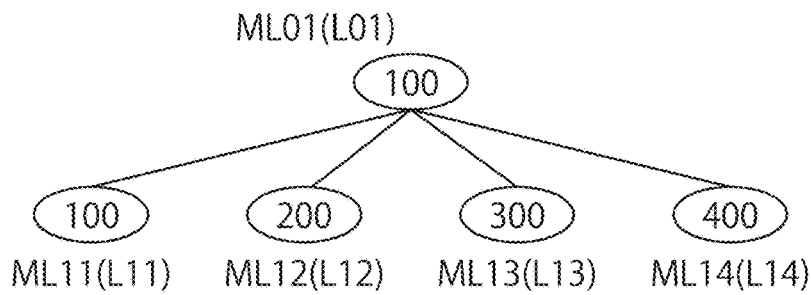
FIG. 69 is a schematic diagram showing part of a data structure of a process network model and a process network used to explain the process executed in the process execution system according to an example.

Referring to FIG. 69, the process network model DM2 used in the present example has a root process master node ML01. The root process master node ML01 is used to generate the root process node L01.

The root process master node ML01 has process master nodes ML11, ML12, ML13, and ML14. The process master node ML11 is used to generate an inquiry process node L11. The process master node ML12 is used to generate an instruction receiving process node L12. The process master node ML13 is used to generate the office procedure process node L13. The process master node ML14 is used to generate the billing process node L14.

Figure 70:
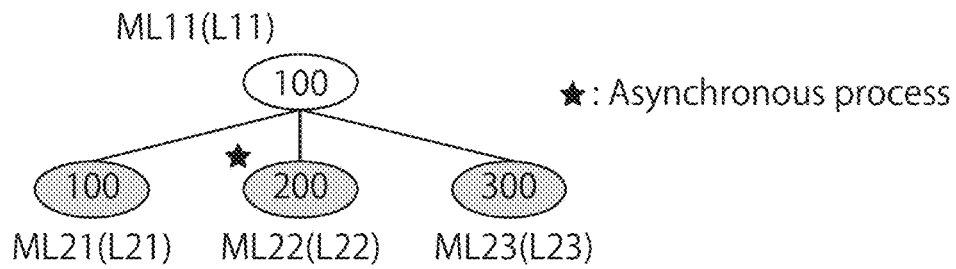
FIG. 70 is a schematic diagram showing part of a data structure of the process network model and the process network used to explain the process executed in the process execution system according to the example.

Referring to FIG. 70, process master node ML11 has process master nodes ML21, ML22, and ML23. The process master node ML21 is used to generate an inquiry mail generation process node L21. The process master node ML22 is used to generate an inquiry mail sending process node L22. The process master node ML13 is used to generate the document generation process initiation process node L13.

Figure 71:
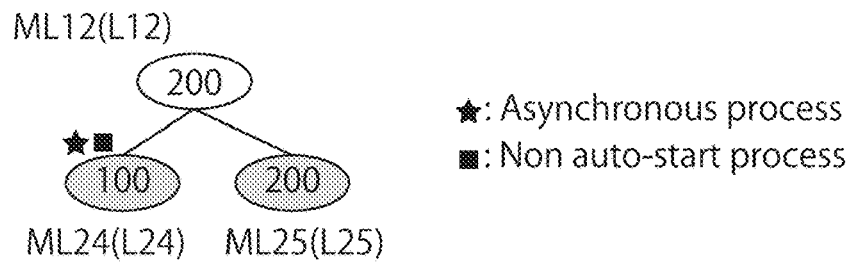
FIG. 71 is a schematic diagram showing a part of a data structure of the process network model and the process network used to explain the process executed in the process execution system according to the example.

Referring to FIG. 71, process master node ML12 has process master node ML24 and ML25. The process master node ML24 is used to generate an instruction confirmation process node L24. The process master node ML25 is used to generate the document transmission process initiation process node L25.

Figure 72:
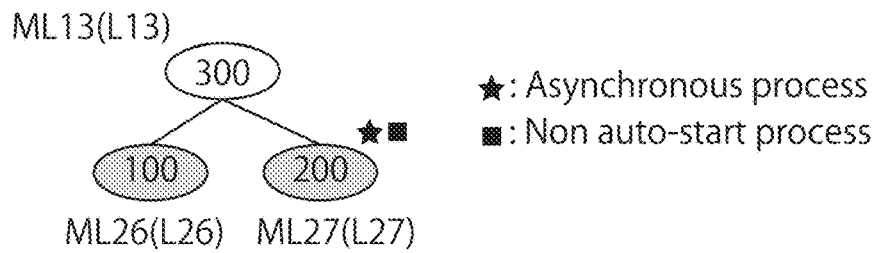
FIG. 72 is a schematic diagram showing part of a data structure of the process network model and the process network used to explain the process executed in the process execution system according to the example.

Referring to FIG. 72, the process master node ML13 has process master nodes ML26 and ML27. The process master node ML26 is used to generate the office document generation process node L26. The process master node ML27 is used to generate the office document transmission process node L27.

Figure 73:
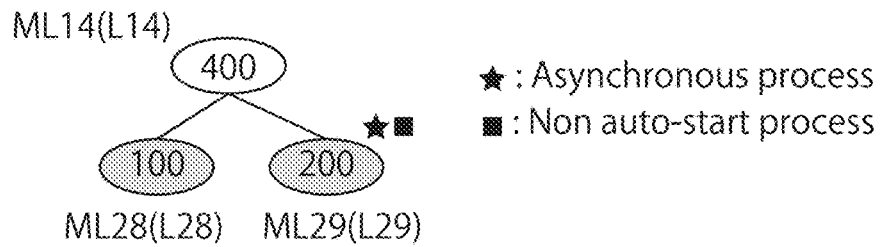
FIG. 73 is a schematic diagram showing part of a data structure of the process network model and the process network used to explain the process executed in the process execution system according to the example.

Referring to FIG. 73, the process master node ML14 has process master nodes ML28 and ML29. The process master node ML28 is used to generate the invoice generation process node L28. The process master node ML29 is used to generate an invoice sending process node L29.

The following provides a detailed explanation of each process node.

Referring to FIG. 70, the inquiry process node L11 has the inquiry mail generation process node L21, the inquiry mail sending process node L22, and the document generation process initiation process node L23 as children.

The process node L21 represents the inquiry mail generation process. In the inquiry mail generation process, an email is generated to inquire whether the applicant has the intention to pay the patent annuity. The generation of inquiry mails is performed by executing the inquiry mail generation flow registered in Power Automate. The execution of the inquiry mail generation flow is performed by sending an execution request for the flow to the API of Power Automate. The inquiry mail generation flow includes generating the subject and body of the inquiry mail, setting the recipient, and attaching necessary files.

The action information D253 of the process node L21 includes an API address for executing the inquiry mail generation flow registered in Power Automate. The action information D253 of the process node L21 includes context data such as case numbers as API data. The process network execution unit 270 sends an execution request for the inquiry mail generation flow to the API address included in the action information D253 of the process node L21, and also sends the API data included in the action information D253. The inquiry mail generation flow uses the context data included in the transmitted API data to retrieve necessary information from the storage unit 220 functioning as a database server, and dynamically changes the recipient, subject, content of the body, and content of attachments, and the like of the email.

The process node L22 represents an inquiry mail sending process. In the inquiry mail sending process, a request to send the inquiry mail is made to the person in charge. The request to send the inquiry mail is made by executing the inquiry mail sending request flow registered in Power Automate. The execution of the inquiry mail sending request flow is performed by sending an execution request for the flow to the API of Power Automate. The inquiry mail sending request flow involves registering the inquiry mail sending task in Planner, which is a task management service of MICROSOFT 365 (registered trademark), and assigning a person in charge to the registered task. When a task is assigned to a person in charge, the person in charge is notified.

The action information D253 of the process node L22 includes an API address for executing the inquiry mail sending request flow registered in Power Automate. The action information D253 of the process node L22 includes context data such as case numbers as API data. The process network execution unit 270 sends an execution request for the inquiry mail sending request flow to the API address included in the action information D253 of the process node L22, and also sends the API data included in the action information D253. The inquiry mail sending request flow uses the context data included in the sent API data to retrieve necessary information from the storage unit 220 functioning as a database server, and dynamically changes the content of the message set for the inquiry mail sending task and the person in charge assigned to the task.

When the inquiry mail sending task is assigned to the person in charge, the said person in charge is notified. The person in charge who received the notification will send the inquiry mail generated by the aforementioned inquiry mail generation flow, based on the content set in the inquiry mail sending task. Once the person in charge completes sending the inquiry mail, they will complete the inquiry mail sending task registered in Planner. When the inquiry mail sending task is completed, the inquiry mail sending process completion flow registered in Power Automate is triggered. The inquiry mail sending process completion flow sends a process state change request to the API of the process network state management unit 260 to change the process state D23 of the process node L22 to the completed state.

The process node L23 represents a document generation process initiation process. In the document generation process initiation process, transition the process state D23 of the process node L26, which represents the office document generation process, to the executable state, and transition the process state D23 of the process node L28, which represents the invoice generation process, to the executable state. The initiation of the document generation process is performed by executing the document generation process initiation flow registered in Power Automate. The execution of the document generation process initiation flow is performed by sending an execution request for the flow to the API of Power Automate. The document generation process initiation flow sends a process state change request to the API of the process network state management unit 260 to change the process state D23 of the process node L26 to the executable state, and also sends a process state change request to change the process state D23 of the process node L28 to the executable state.

The action information D253 of process node L23 includes an API address for executing the document generation process initiation flow registered in Power Automate. Moreover, the action information D253 of the process node L23 includes context data such as case numbers as API data. The process network execution unit 270 sends an execution request for the document generation process initiation flow to the API address included in the action information D253 of the process node L23, and also sends the API data included in the action information D253. The document generation process initiation flow uses the context data included in the transmitted API data to obtain the information (such as process node identifier D21) necessary to identify the process nodes L26 and L28 to be transitioned to the executable state from the storage unit 220 functioning as a database server.

Referring to FIG. 71, the instruction receiving process node L12 has the instruction confirmation process node L24 and the document transmission process initiation process node L25 as children.

The process node L24 represents an instruction confirmation process. In the instruction confirmation process, a request for confirmation of the instruction mail is made to the person in charge of the task. The request for confirmation of the instruction mail is performed by executing the instruction mail confirmation request flow registered in Power Automate. The execution of the instruction mail confirmation request flow is performed by sending an execution request for the flow to the API of Power Automate. The instruction mail confirmation flow uses the approval request service of MICROSOFT 365 (registered trademark) to send an approval request for confirming instruction mails to the person in charge.

The action information D253 of process node L24 includes an API address for executing the instruction mail confirmation flow registered in Power Automate. The action information D253 of the process node L24 includes context data such as case numbers as API data. The process network execution unit 270 sends an execution request for the instruction mail confirmation flow to the API address included in the action information D253 of the process node L24, and also sends the API data included in the action information D253. The instruction mail confirmation flow uses the context data included in the sent API data to retrieve necessary information from the storage unit 220 functioning as a database server, dynamically changing the content of the message set for the approval request for instruction mail confirmation request and the person in charge to whom the approval request is sent.

A process node L24 representing an instruction confirmation process transitions to the executable state by receiving an instruction mail from the applicant in response to the inquiry mail sent at process node L22. Specifically, upon receiving an instruction mail from the applicant in response to the inquiry mail, an instruction confirmation process initiation flow registered in Power Automate is triggered by the receipt of the email. The instruction confirmation process initiation flow sends a process state change request to the API of the process network state management unit 260 to change the process state D23 of the process node L24 to the executable state.

As mentioned above, when the process node L24 representing the instruction confirmation process is executed, an approval request for the instruction mail confirmation request is sent to the person in charge. The person in charge who received the approval request for the instruction mail confirmation request will confirm the instruction mail from the applicant for the inquiry mail generated by the aforementioned inquiry mail generation flow, based on the content set in the approval request. Once the person in charge checks the instruction mail, they complete the approval request for the instruction mail confirmation request. When the approval request for the instruction mail confirmation request is completed, the instruction confirmation process completion flow registered in Power Automate is triggered by the completion of the approval request. The instruction confirmation process completion flow sends a process state change request to the API of the process network state management unit 160 to change the process state D23 of the process node L24 to the completed state.

Process node L25 represents a document transmission process initiation process. In the document transmission process initiation process, transition the process state D23 of the process node L27, which represents the office document transmission process, to the executable state, and transition the process state D23 of the process node L29, which represents the invoice sending process, to the executable state. The initiation of the document transmission process is performed by executing the document transmission process initiation flow registered in Power Automate. The execution of the document transmission process initiation flow is performed by sending an execution request for the flow to the API of Power Automate. The document transmission process initiation flow sends a process state change request to the API of the process network state management unit 260 to change the process state D23 of the process node L27 to the executable state, and also sends a process state change request to change the process state D23 of the process node L29 to the executable state.

The action information D253 of process node L25 includes an API address for executing the document transmission process initiation flow registered in Power Automate. The action information D253 of the process node L25 includes context data such as case numbers as API data. The process network execution unit 270 sends an execution request for an inquiry mail sending request flow to the API address included in the action information D253 of the process node L25, and also sends the API data included in the action information D253. The document transmission process initiation flow uses the context data included in the transmitted API data to obtain the information (such as process node identifier D21) necessary for identifying the process node L27 and L29 to be transitioned to the executable state from the storage unit 220 functioning as a database server.

Referring to FIG. 72, office procedure process node L13 has office document generation process node L26 and office document transmission process node L27 as children.

Process node L26 represents the office document generation process. In the office document generation process, an annuity payment form to be submitted to the patent office is generated. The generation of the annuity payment form is performed by executing the annuity payment form generation flow registered in Power Automate. The execution of the annuity payment form generation flow is performed by sending an execution request for the flow to the API of Power Automate. The annuity payment form generation flow generates the annuity payment form by outputting the information for each field into an HTML file based on the format of the annuity payment form.

The action information D253 of the process node L26 includes an API address for executing the annuity payment form generation flow registered in Power Automate. The action information D253 of the process node L26 includes context data such as case numbers as API data. The process network execution unit 270 sends an execution request for the annuity payment form generation flow to the API address included in the action information D253 of the process node L26, and also sends the API data included in the action information D253. The annuity payment form generation flow uses the context data included in the transmitted API data to retrieve necessary information (application number, patent applicant, number of claims, payment year, patent fee, and the like) from the storage unit 220 functioning as a database server, dynamically changing the information such as each field of the annuity payment form.

Process node L27 represents the office document transmission process. In the office document transmission process, a request for office document transmission is made to the person in charge of the task. Requests for office document transmission are made by executing the office document transmission request flow registered in Power Automate. The execution of the office document transmission request flow is executed by sending an execution request for the flow to the API of Power Automate. The office document transmission request flow involves registering the office document transmission task in Planner, a task management service of MICROSOFT 365 (registered trademark), and assigning a person in charge to the registered task. When a task is assigned to the person in charge, the person in charge is notified.

The action information D253 of process node L27 includes an API address for executing the office document transmission request flow registered in Power Automate. Moreover, the action information D253 of the process node L27 includes context data such as case numbers as API data. The process network execution unit 270 sends an execution request for the office document transmission flow to the API address included in the action information D253 of the process node L27, and also sends the API data included in the action information D253. The office document transmission request flow uses the context data included in the transmitted API data to retrieve the necessary information from the storage unit 220 functioning as a database server, and dynamically changes the content of the message set for the office document transmission task and the person in charge assigned to the task.

When the office action submission task is assigned to the person in charge, the said person in charge is notified. The person in charge who received the notification will submit the annuity payment form generated by the aforementioned office document generation flow to the Patent Office, based on the content set in the office document transmission task. Once the person in charge completes the submission of the office documents, they will complete the office document transmission task. When the office document transmission task is completed, the office document transmission process completion flow registered in Power Automate is triggered by the completion of the task. The office document transmission process completion flow sends a process state change request to the API of the process network state management unit 260 to change the process state D23 of process node L27 to the completed state.

Referring to FIG. 73, the billing process node L14 has the invoice generation process node L28 and the invoice sending process node L29 as children.

The process node L28 represents an invoice generation process. In the invoice generation process, an invoice is generated to bill the applicant for the fee of the annuity payment service. The generation of an invoice is performed by executing an invoice generation flow registered in Power Automate. The execution of the invoice generation flow is performed by sending an execution request for the flow to the API of Power Automate. The invoice generation flow triggers the billing details input flow in Power Automate for desktop. Power Automate for desktop operates on a client PC. The billing details input flow in Power Automate for desktop inputs billing details into the on-premises accounting system.

The action information D253 of the process node L28 includes an API address for executing the invoice generation flow registered in Power Automate. Additionally, the action information D253 of the process node L28 includes context data such as case numbers as API data. The process network execution unit 270 sends an execution request for the invoice generation flow to the API address included in the action information D253 of the process node L28, and also sends the API data included in the action information D253. The invoice generation flow dynamically changes the billing content by using the context data included in the transmitted API data to retrieve the necessary information from the storage unit 220 functioning as a database server.

Process node L29 represents the invoice sending process. In the invoice sending process, an invoice sending request is made to the person in charge of the task. The request for sending an invoice is made by executing the invoice sending request flow registered in Power Automate. The execution of the invoice sending request flow is performed by sending an execution request for the flow to the API of Power Automate. The invoice sending request flow involves registering an invoice sending task in Planner, a task management service of MICROSOFT 365 (registered trademark), and assigning a person in charge to the registered task. When the task is assigned to the person in charge, the person in charge is notified.

The action information D253 of process node L29 includes an API address for executing the invoice sending request flow registered in Power Automate. The action information D253 of the process node L29 includes context data such as case numbers as API data. The process network execution unit 270 sends an execution request for the invoice sending request flow to the API address included in the action information D253 of the process node L29, and also sends the API data included in the action information D253. The invoice sending request flow uses the context data included in the transmitted API data to retrieve necessary information from the storage unit 220 functioning as a database server, and dynamically changes the content of the message set for the invoice sending task and the person in charge assigned to the task.

When the task of sending the invoice is assigned to the person in charge, the person in charge is notified. The person in charge who received the notification will send the invoice generated by the aforementioned invoice generation flow to the applicant based on the content set in the invoice sending task. Once the person in charge completes the sending of an invoice, the person in charge completes the task of sending the invoice. When the invoice sending task is completed, the invoice sending process completion flow registered in Power Automate is triggered by the completion of the task. The invoice sending process completion flow sends a process state change request to the API of the process network state management unit 260 to change the process state D23 of process node L29 to the completed state.

The values of the asynchronous flag masters (asynchronous flags) of the process master nodes ML22, ML24, ML27, and ML29 (process nodes L22, L24, L27, and L29) marked with an asterisk are True, while the values of the asynchronous flag masters (asynchronous flags) of the process master nodes (process nodes) not marked with an asterisk are False. Among the aforementioned process master nodes (process nodes), the values of the auto-start flag master DM255 (auto-start flag D255) for the process master nodes ML24, ML27, and ML29 (process nodes L24, L27, and L29) marked with a square are False, while the values of the auto-start flag master DM255 (auto-start flag D255) for the process master nodes (process nodes) not marked with a star are True.

Referring to FIGS. 74 to 78, the operation of the present example will be described. FIGS. 74 to 78 are sequence diagrams representing a part of the process executed in the process execution system according to the example.

Figure 74:
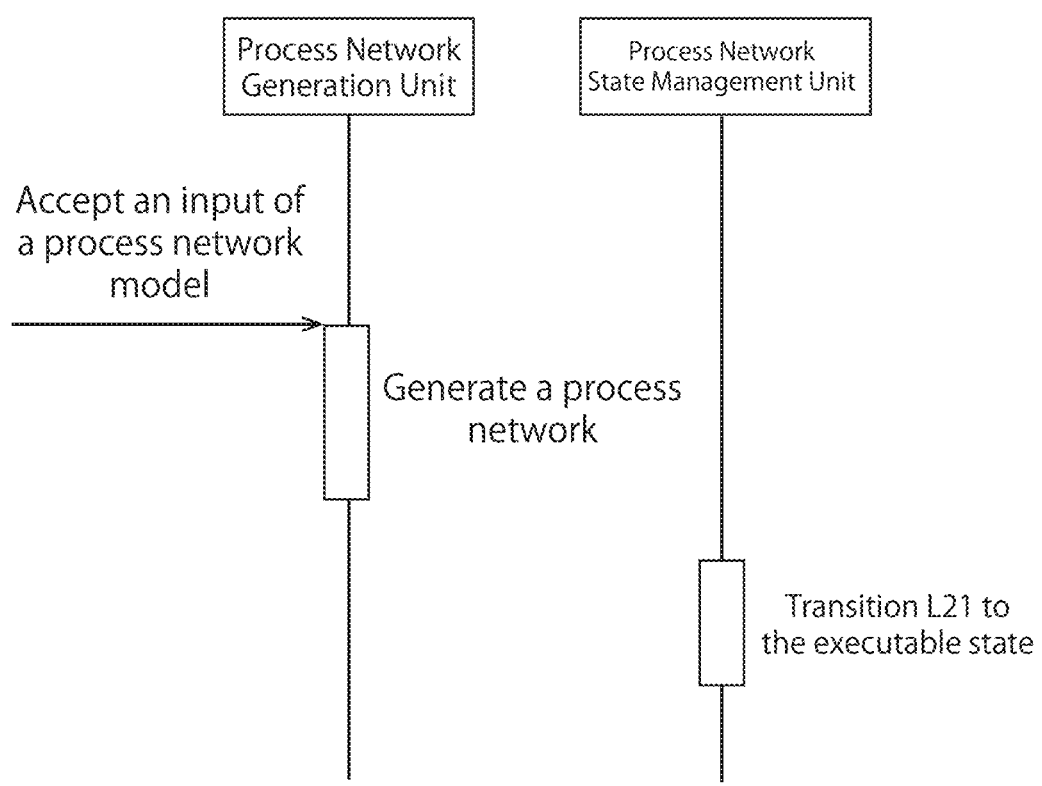
FIG. 74 is a sequence diagram illustrating a part of the process executed in the process execution system according to the example.

Referring to FIG. 74, when the process network generation unit 250 accepts an input of process network model DM2, the process network generation unit 250 generates the corresponding process network D2. The process network model input unit 151 of the process network generation unit 250 accepts context data such as case numbers and the like. The process network generation unit 250, when generating the process network D2 from the process network model DM2 accepted as input by the process network model input unit 151, uses context data to embed context data such as case numbers into the API data included in the action information D253 of the generated process network D2. The process network generation unit 250 stores the generated process network D2 in the storage unit 220. The process network generation unit 250, when storing the generated process network D2 in the storage unit 220, saves the context data accepted as input by the process network model input unit 151 in association with the process network D2 in the storage unit 220.

The process network state management unit 260 executes the state transition process for process nodes to transition the inquiry mail generation process node L21 to the executable state. When the state transition process is applied to process network D2 immediately after it is generated, the inquiry mail generation process node L21 is the first to reach the executable state.

Figure 75:
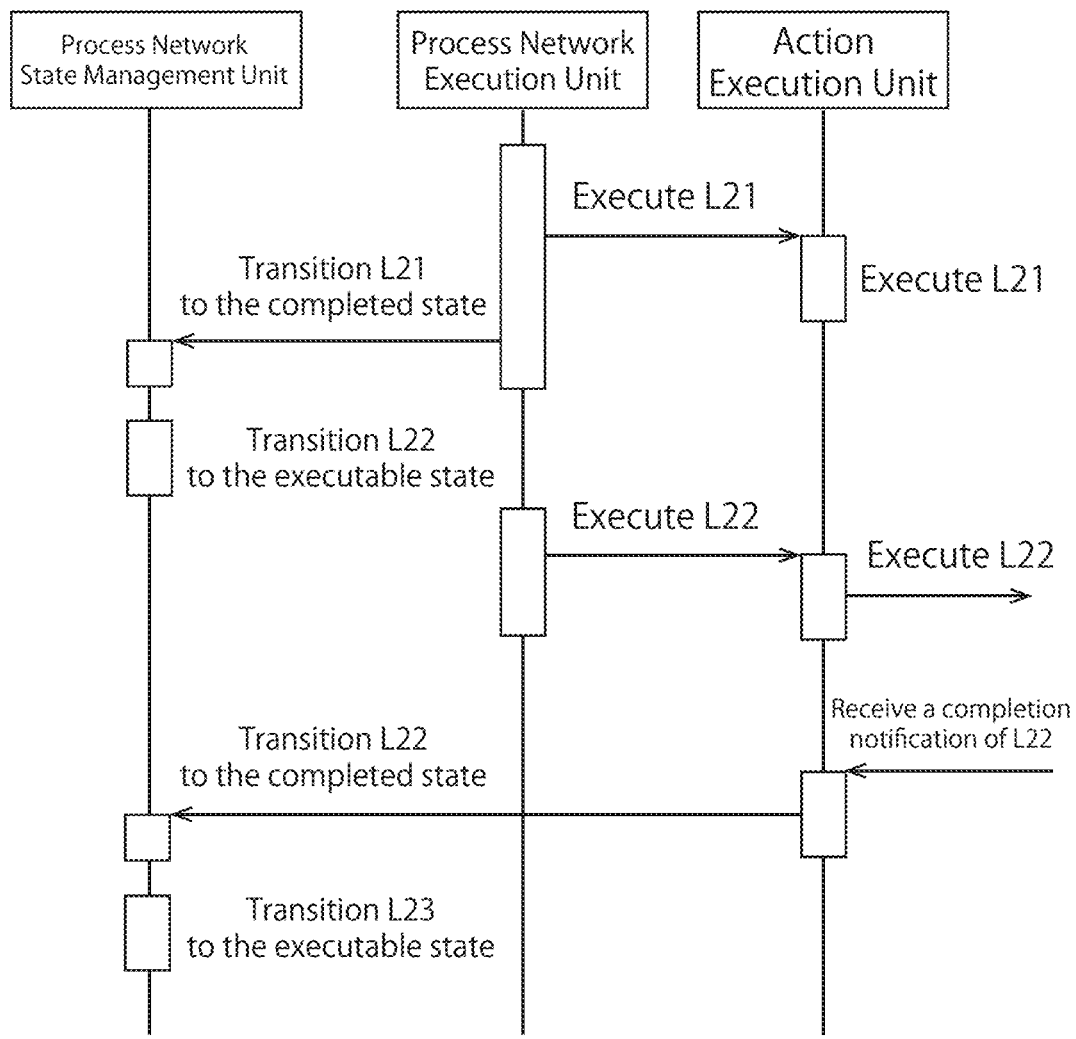
FIG. 75 is a sequence diagram illustrating a part of the process executed in the process execution system according to the example.

Referring to FIG. 75, the process network execution unit 270 executes the inquiry mail generation process node L21 that has reached the executable state. The process network execution unit 270 sends an execution request for the inquiry mail generation flow to the API of Power Automate. The inquiry mail generation flow in Power Automate generates inquiry mails. The process network execution unit 270, after executing the inquiry mail generation process node L21, sends a process state change request to the API of the process network state management unit 260 to transition the process state D23 of the inquiry mail generation process node L21 to the completed state. The process network state management unit 260 transitions the process state D23 of the inquiry mail generation process node L21 to the completed state.

The process network state management unit 260 executes the state transition process for process nodes D20 to transition the inquiry mail sending process node L22 to the executable state.

The process network execution unit 270 executes the inquiry mail sending process node L22 that has reached the executable state. The process network execution unit 270 sends an execution request for the inquiry mail sending request flow to the API of Power Automate. The inquiry mail sending request flow in Power Automate registers an inquiry mail sending task in Planner and assigns a person in charge of the task to the registered task.

The value of the asynchronous flag of the inquiry mail sending process node L22 is True. Therefore, the process network execution unit 270 does not set the process state D23 of the process node L22 to the completed state after executing the inquiry mail sending process node L22 (see FIG. 27).

When the inquiry mail sending task registered in the Planner is completed, the inquiry mail sending process completion flow in Power Automate is triggered. The inquiry mail sending process completion flow sends a process state change request to the API of the process network state management unit 260 to change the process state D23 of the inquiry mail sending process node L22 to the completed state. The process network state management unit 260 transitions the process state D23 of the inquiry mail sending process node L22 to the completed state.

The process network state management unit 260 executes the state transition process for process nodes and transitions the document generation process initiation process node L23 to the executable state.

Figure 76:
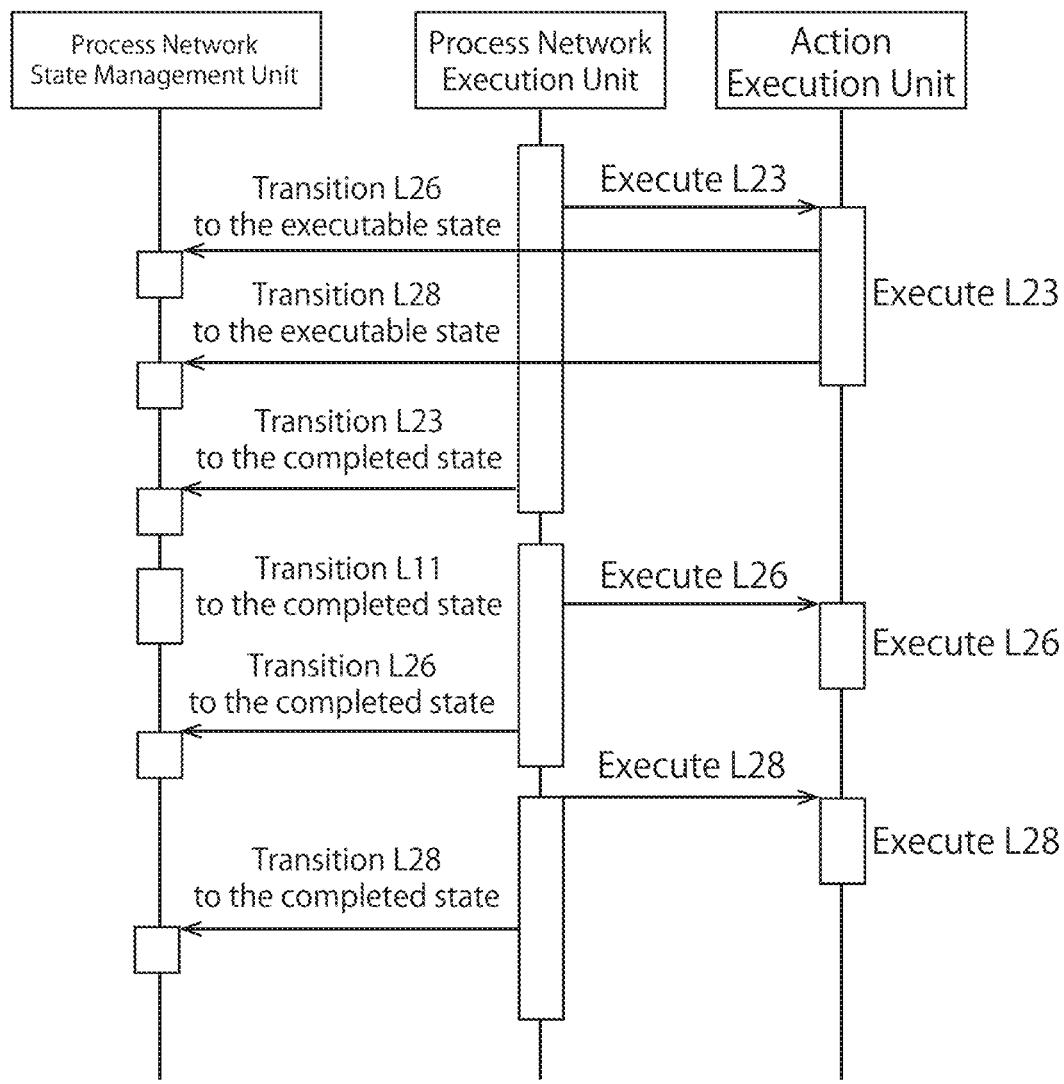
FIG. 76 is a sequence diagram illustrating a part of the process executed in the process execution system according to the example.

Referring to FIG. 76, the process network execution unit 270 executes the document generation process initiation process node L23 that has become the executable state. The process network execution unit 270 sends an execution request for the document generation process initiation flow to the API of Power Automate. The document generation process initiation flow sends a process state change request to the API of the process network state management unit 260 to transition the process state D23 of the office document generation process node L26 to the executable state. The process network state management unit 260 transitions the process state D23 of the office document generation process node L26 to the executable state. The document generation process initiation flow sends a process state change request to the API of the process network state management unit 260 to change the process state D23 of the invoice generation process node L28 to the executable state. The process network state management unit 260 transitions the process state D23 of the invoice generation process node L28 to the executable state.

The process network execution unit 270, after executing the document generation process initiation process node L23, sends a process state change request to the API of the process network state management unit 260 to transition the process state D23 of the document generation process initiation process node L23 to the completed state. The process network state management unit 260 transitions the process state D23 of the document generation process initiation process node L23 to the completed state. When the process state D23 of the document generation process initiation process node L23 transitions to the completed state, all process nodes L21, L22, and L23 under the inquiry process node L11 transition to the completed state, so the process network state management unit 260 executes the state transition process for process nodes to transition the process state D23 of the inquiry process node L11 to the completed state.

The process network execution unit 270 executes the document generation process node L26 that has reached the executable state. The process network execution unit 270 sends an execution request for the office document generation flow to the API of Power Automate. The office document generation flow in Power Automate generates an annuity payment form. The process network execution unit 270, after executing the process node L26 for document generation, sends a process state change request to the API of the process network state management unit 260 to transition the process state D23 of the process node L26 to the completed state. The process network state management unit 260 transitions the process state D23 of the office document generation process node L26 to the completed state.

The process network execution unit 270 executes the invoice generation process node L28 that has reached the executable state. The process network execution unit 270 sends an execution request for the invoice generation flow to the API of Power Automate. The invoice generation flow in Power Automate generates invoices. The process network execution unit 270, after executing the invoice generation process node L28, sends a process state change request to the API of the process network state management unit 260 to transition the process state D23 of the invoice generation process node L28 to the completed state. The process network state management unit 260 transitions the process state D23 of the invoice generation process node L28 to the completed state.

As a result of the execution of the process nodes up to this point, the inquiry process node L11 (and the process nodes L21, L22, and L23 under process node L11), the office document generation process node L26, and the invoice generation process node L28 will be in the completed state.

When the inquiry process node L11 reaches the completed state, the process node that could next become executable due to the state transition process by the process network state management unit 260 is the instruction confirmation process node L24. However, since the auto-start flag of the instruction confirmation process node L24 is False, even if the inquiry process node L11 reaches the completed state, the instruction confirmation process node L24 does not transition to the executable state in the state transition process by the process network state management unit 260.

Similarly, since the auto-start flag of the office document transmission process node L27 is also False, even if the office document generation process node L26 reaches the completed state, the office document transmission process node L27 will not transition to the executable state in the state transition process by the process network state management unit 260. Furthermore, since the auto-start flag of the invoice sending process node L29 is also False, even if the invoice generation process node L28 reaches the completed state, the invoice sending process node L29 will not transition to the executable state in the state transition process by the process network state management unit 260.

Figure 77:
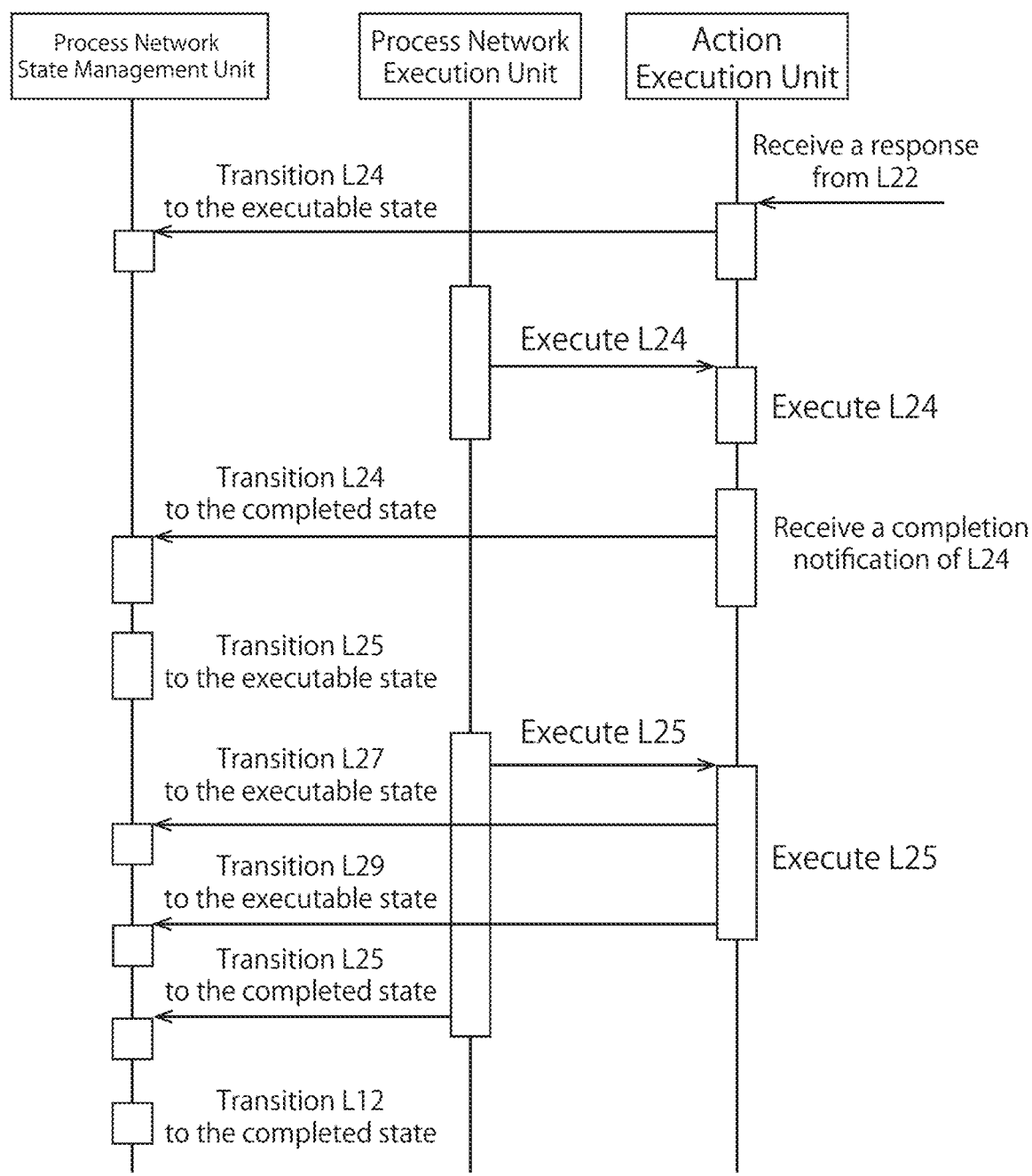
FIG. 77 is a sequence diagram illustrating a part of the process executed in the process execution system according to the example.

Referring to FIG. 77, upon receiving an instruction mail from the applicant in response to the inquiry mail sent in the process represented by the inquiry mail sending process node L22, an instruction confirmation process initiation flow of Power Automate (registered) is triggered. The instruction confirmation process initiation flow sends a process state change request to transition the process state D23 of the instruction confirmation process node L24 to the executable state to the API of the process network state management unit 260.

The process network execution unit 270 executes the instruction confirmation process node L24 that has reached the executable state. The process network execution unit 270 sends an execution request for the instruction confirmation request flow to the API of Power Automate. Power Automate executes the instruction confirmation request flow and sends an approval request for MICROSOFT 365 (registered trademark) to the person in charge. The asynchronous flag of the instruction confirmation process node L24 is True. Therefore, the process network execution unit 270 does not set the process node L24 to the completed state after executing the process node L24 (see FIG. 27).

When the approval request for the instruction confirmation sent at the instruction confirmation process node L24 is approved, the instruction confirmation process completion flow of Power Automate (registered) is initiated. The instruction confirmation process completion flow sends a process state change request to the API of the process network state management unit 260 to change the process state D23 of the instruction confirmation process node L24 to the completed state. The process network state management unit 260 transitions the process state D23 of the instruction confirmation process node L24 to the completed state.

The process network state management unit 260 performs a state transition process for process nodes to transition the process state D23 of the document transmission process initiation process node L25 to the executable state.

The process network execution unit 270 executes the document transmission process initiation process node L25 that has reached the executable state. The process network execution unit 270 sends an execution request for the document transmission process initiation flow to the API of Power Automate. The document transmission process initiation flow sends a process state change request to the API of the process network state management unit 260 to transition the process state D23 of the office document transmission process node L27 to the executable state. The process network state management unit 260 transitions the process state D23 of the office document transmission process node L27 to the executable state. The document transmission process initiation flow sends a process state change request to the API of the process network state management unit 260 to change the process state D23 of the invoice sending process node L29 to the executable state. The process network state management unit 260 transitions the process state D23 of the invoice sending process node L29 to the executable state.

The process network execution unit 270, after executing the document transmission process initiation process node L25, sends a process state change request to the API of the process network state management unit 260 to transition the process state D23 of the document transmission process initiation process node L25 to the completed state. The process network state management unit 260 transitions the process state D23 of the document transmission process initiation process node L25 to the completed state. When the process state D23 of the document transmission process initiation process node L25 reaches the completed state, all process nodes L24 and L25 under the instruction receiving process node L12 will be in the completed state, so the process network state management unit 260 executes the state transition process for the process nodes to change the process state D23 of the instruction receiving process node L12 to the completed state.

Figure 78:
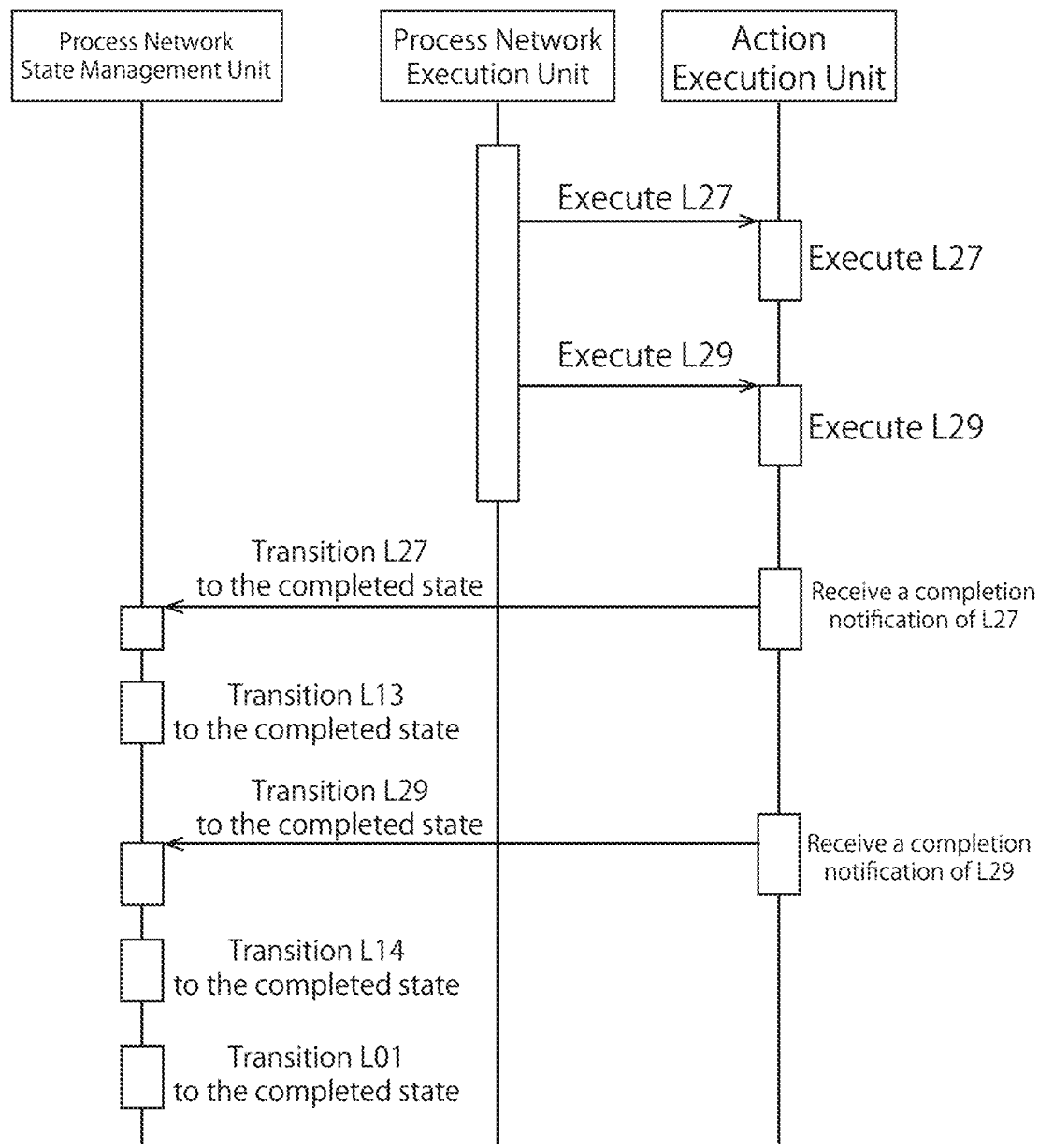
FIG. 78 is a sequence diagram illustrating a part of the process executed in the process execution system according to the example.

Referring to FIG. 78, the process network execution unit 270 executes the office document transmission process node L27 that has reached the executable state. The process network execution unit 270 sends an execution request for the office document transmission request flow to the API of Power Automate. Power Automate executes the office document transmission request flow, registers the office document transmission task in Planner, and assigns a person in charge to the registered task. The asynchronous flag of the office document transmission process node L27 is True. Therefore, the process network execution unit 270 does not set the process node L27 to the completed state after executing the office document transmission process node L27.

The process network execution unit 270 executes the invoice sending process node L29 that has reached the executable state. The process network execution unit 270 sends an execution request for the invoice sending request flow to the API of Power Automate. Power Automate executes the invoice sending request flow, registers the invoice sending task in Planner, and assigns a person in charge to the registered task. The asynchronous flag of the invoice sending process node L29 is True. Therefore, the process network execution unit 270 does not set the process node L29 to the completed state after executing the invoice sending process node L29.

When the office document transmission task registered in Planner is completed, the office document transmission process completion flow in Power Automate is triggered. The office document transmission process completion flow sends a process state change request to transition the process state D23 of the office document transmission process node to the completed state to the API of the process network state management unit 260. The process network state management unit 260 transitions the process state D23 of the office document transmission process node L27 to the completed state. When the office document transmission process node L27 transitions to the completed state, all process nodes L26 and L27 under the office procedure process node L13 transition to the completed state, so the process network state management unit 260 executes a process to transition the process state D23 of the office procedure process node L13 to the completed state.

When the invoice sending task registered in Planner is completed, the invoice sending process completion flow in Power Automate is triggered. The invoice sending process completion flow sends a process state change request to transition the process state D23 of the invoice sending process node L29 to the completed state to the API of the process network state management unit 260. The process network state management unit 260 transitions the process state D23 of the invoice sending process node L29 to the completed state. When the invoice sending process node L29 transitions to the completed state, all process nodes L28 and L29 under the invoice sending process node L14 transition to the completed state, so the process network state management unit 260 executes the process to transition the process state D23 of the invoice process node L14 to the completed state.

As a result of the above process, all process nodes L11, L12, L13, and L14 under the root process node L01 transition to the completed state, so the process network state management unit 260 executes a process to transition the process state D23 of the root process node L01 to the completed state.

As described above, according to the process execution system 200 of the present example, it is possible to execute complex business processes, including those involving asynchronous processes. In particular, the hierarchical process network model has high expressiveness because it can subdivide processes by deepening the hierarchy, and the process execution system 200, which is configured to accept a hierarchical process network model, can execute even complex business processes. Changes in business operations can be handled by modifying the process network model, without the need to change the configuration of the process network generation unit, the process network state management unit, or the process network execution unit. Therefore, the process execution system 200, while having a simple configuration, excels in plasticity and stability, making it a highly adaptable system for rapidly changing business environments.

The configuration of the process execution system described above is explained to illustrate the main features of the aforementioned embodiment, and is not limited to the above-mentioned configuration. Various modifications can be made within the scope of the claims. Nor does it exclude configurations that a general process execution system would typically include.

In the above-described embodiment, the process execution system is configured as a web application operating on a server machine, but it may also be configured as a native application operating on a PC.

The above-described embodiment explains the application of the present invention to business processes, but the present invention is not limited to business processes and can also be applied to processes involving interaction with the real world, such as processes in CPS (Cyber-Physical Systems).

The invention claimed is:

1. A process execution system comprising:
a process network generation unit configured to generate a process network from a process network model, wherein the process network model includes a plurality of process master nodes having process generation information used to generate process definition information defining content of processes, and represents relationships between a plurality of process nodes generated by the process master nodes, and wherein the process network includes the plurality of process nodes having the process definition information;
a process network state management unit configured to, based on a state of the process node included in the process network and predetermined process state transition rules, make a specific process node executable;
a process network execution unit configured to execute a process defined by the process definition information associated with the executable process node included in the process network; and
a transcription unit configured to execute a transcription process for transcribing the process generation information associated with one process master node into one process node corresponding to the one process master node as the process definition information,
wherein the process network generation unit is configured to include a process network model input unit configured to accept an input of the process network model, the process network generation unit being configured to generate the process network from the process network model accepted as input by the process network model input unit,
wherein the process definition information includes information related to actions necessary to execute the process defined by the process definition information,
wherein the process network execution unit is configured to execute the process defined by the process definition information of the executable process node by sending an execution request for an action, based on the information related to actions included in the process definition information, to an action execution system that executes predetermined actions upon request,
wherein the process network state management unit is configured to include a process state change request acceptance unit configured to accept a process state change request for changing a state of a specific process node from systems external to the process execution system and to change the state of the specific process node included in the process network based on the process state change requests accepted by the process state change request acceptance unit,
wherein the process generation information includes at least one piece of transcription process definition information defining the transcription process,
wherein the transcription process definition information includes at least one piece of transcription factor model definition information defining a transcription factor model, the transcription factor model modeling an influence of an environment with which the process execution system is communicable on the transcription process,
wherein the transcription unit is configured to include a transcription request acceptance unit configured to accept an execution request for the transcription process, a transcription factor model evaluation unit configured to evaluate the transcription factor model defined by the transcription factor model definition information, and a transcription process execution unit configured to execute the transcription process defined by the transcription process definition information, and
wherein the transcription process execution unit is configured to control the transcription process based on evaluation results of one or more transcription factor models evaluated by the transcription factor model evaluation unit.

2. The process execution system according to claim 1, wherein:
the process network model input unit is configured to accept an input of a hierarchical process network model representing hierarchical relationships between the process nodes generated by the process master nodes, and
the process network generation unit is configured to generate a hierarchical process network corresponding to the hierarchical process network model accepted as input by the process network model input unit.

3. The process execution system according to claim 1, wherein:
the process network execution unit is configured to, when executing the process defined by the process definition information, send the execution request for the transcription process to the transcription request acceptance unit, thereby executing the process based on the process definition information updated by the transcription unit transcribing the process generation information used to generate the process definition information.

4. The process execution system according to claim 3, wherein:
the transcription factor model evaluation unit is configured to, when evaluating one transcription factor model, use evaluation results of the other transcription factor models as input data for the one transcription factor model.

5. The process execution system according to claim 4, wherein:
the process definition information includes an active flag indicating whether the process having the process definition information is active or inactive,
the process generation information includes an active flag master used to generate the active flag,
the active flag master includes the transcription process definition information configured to determine the active flag based on evaluation results of the transcription factor models, and
the process network state management unit is configured to ignore process nodes as if they did not exist when the active flag included in the process definition information associated with the process nodes indicates that the process is inactive.

6. The process execution system according to claim 5, wherein:
the process network generation unit is configured to include a process network model output unit configured to output the process network model, and
the process network model output unit is configured to output serialized data of the process network model.

7. The process execution system according to claim 6, wherein:
the process network model input unit is configured to accept an input of serialized data of the process network model, and
the process network generation unit is configured to generate the process network using the process network model obtained by deserializing the serialized data of the process network model accepted as input by the process network model input unit.

8. The process execution system according to claim 7, wherein:
the process network model output unit is configured to serialize the process network model based on a rule that the process network model and the serialized data of the process network model have a one-to-one correspondence.

9. The process execution system according to claim 8, wherein:
a data format used by the process network model output unit to output serialized data of the process network model is an array of key-value pairs.

10. The process execution system according to claim 9, wherein:
the data format used by the process network model output unit to output serialized data of the process network model is JSON.

11. The process execution system according to claim 1, further comprising:
a process network model display unit configured to display the process network model.

12. The process execution system according to claim 1, further comprising:
a process network display unit configured to display the process network.

\* \* \* \* \*